US009767284B2

(12) United States Patent
Ghose

(10) Patent No.: US 9,767,284 B2
(45) Date of Patent: Sep. 19, 2017

(54) CONTINUOUS RUN-TIME VALIDATION OF PROGRAM EXECUTION: A PRACTICAL APPROACH

(71) Applicant: The Research Foundation for the State University of New York, Binghamton, NY (US)

(72) Inventor: Kanad Ghose, Vestal, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 0 days.

(21) Appl. No.: 14/743,654

(22) Filed: Jun. 18, 2015

(65) Prior Publication Data
US 2015/0286821 A1 Oct. 8, 2015

Related U.S. Application Data

(63) Continuation of application No. 14/027,362, filed on Sep. 16, 2013, now Pat. No. 9,122,873, and a
(Continued)

(51) Int. Cl.
*G06F 21/56* (2013.01)
*G06F 9/30* (2006.01)
(Continued)

(52) U.S. Cl.
CPC ........ *G06F 21/566* (2013.01); *G06F 9/30079* (2013.01); *G06F 9/3859* (2013.01);
(Continued)

(58) Field of Classification Search
None
See application file for complete search history.

(56) References Cited

U.S. PATENT DOCUMENTS

| 4,247,892 A | 1/1981 | Lawrence |
| 4,514,846 A | 4/1985 | Federico et al. |

(Continued)

FOREIGN PATENT DOCUMENTS

| EP | 2658166 | 10/2013 |
| JP | 2010154098 | 7/2010 |

OTHER PUBLICATIONS

A. Carroll, M. Juarez, J. Polk, and T. Leininger Microsoft Palladium: A business overview, Aug. 2002. Microsoft Press Release.
(Continued)

*Primary Examiner* — Amir Mehrmanesh
(74) *Attorney, Agent, or Firm* — Steven M. Hoffberg, Esq.; Ostrolenk Faber LLP

(57) ABSTRACT

Trustworthy systems require that code be validated as genuine. Most systems implement this requirement prior to execution by matching a cryptographic hash of the binary file against a reference hash value, leaving the code vulnerable to run time compromises, such as code injection, return and jump-oriented programming, and illegal linking of the code to compromised library functions. The Run-time Execution Validator (REV) validates, as the program executes, the control flow path and instructions executed along the control flow path. REV uses a signature cache integrated into the processor pipeline to perform live validation of executions, at basic block boundaries, and ensures that changes to the program state are not made by the instructions within a basic block until the control flow path into the basic block and the instructions within the basic block are both validated.

20 Claims, 1 Drawing Sheet

Out-of-Order Datapath, The components needed by REV are shaded in orange.

Related U.S. Application Data continuation of application No. 14/027,352, filed on Sep. 16, 2013, now Pat. No. 9,063,721.

(60) Provisional application No. 61/701,194, filed on Sep. 14, 2012.

(51) Int. Cl.

| | | |
|---|---|---|
| *G06F 9/38* | (2006.01) | |
| *G06F 11/00* | (2006.01) | |
| *G06F 21/52* | (2013.01) | |
| *G06F 11/14* | (2006.01) | |
| *G06F 21/50* | (2013.01) | |

(52) U.S. Cl.
CPC .......... *G06F 9/3861* (2013.01); *G06F 9/3877* (2013.01); *G06F 11/00* (2013.01); *G06F 21/52* (2013.01); *G06F 11/1407* (2013.01); *G06F 21/50* (2013.01); *G06F 2221/033* (2013.01)

(56) References Cited

U.S. PATENT DOCUMENTS

| | | | |
|---|---|---|---|
| 4,584,639 | A | 4/1986 | Hardy |
| 4,625,081 | A | 11/1986 | Lotito et al. |
| 4,665,520 | A | 5/1987 | Strom et al. |
| 4,674,038 | A | 6/1987 | Brelsford et al. |
| 4,916,605 | A | 4/1990 | Beardsley et al. |
| 4,987,532 | A | 1/1991 | Noguchi |
| 5,165,031 | A | 11/1992 | Pruul et al. |
| 5,170,340 | A | 12/1992 | Prokop et al. |
| 5,175,679 | A | 12/1992 | Allen et al. |
| 5,179,702 | A | 1/1993 | Spix et al. |
| 5,191,651 | A | 3/1993 | Halim et al. |
| 5,222,217 | A | 6/1993 | Blount et al. |
| 5,237,684 | A | 8/1993 | Record et al. |
| 5,261,089 | A | 11/1993 | Coleman et al. |
| 5,276,876 | A | 1/1994 | Coleman et al. |
| 5,305,056 | A | 4/1994 | Salgado et al. |
| 5,305,454 | A | 4/1994 | Record et al. |
| 5,319,773 | A | 6/1994 | Britton et al. |
| 5,319,774 | A | 6/1994 | Ainsworth et al. |
| 5,327,532 | A | 7/1994 | Ainsworth et al. |
| 5,347,632 | A | 9/1994 | Filepp et al. |
| 5,355,484 | A | 10/1994 | Record et al. |
| 5,363,505 | A | 11/1994 | Maslak et al. |
| 5,410,684 | A | 4/1995 | Ainsworth et al. |
| 5,410,700 | A | 4/1995 | Fecteau et al. |
| 5,421,012 | A | 5/1995 | Khoyi et al. |
| 5,446,904 | A | 8/1995 | Belt et al. |
| 5,530,868 | A | 6/1996 | Record et al. |
| 5,551,033 | A | 8/1996 | Foster et al. |
| 5,592,670 | A | 1/1997 | Pletcher |
| 5,606,668 | A | 2/1997 | Shwed |
| 5,608,720 | A | 3/1997 | Biegel et al. |
| 5,613,060 | A | 3/1997 | Britton et al. |
| 5,625,821 | A | 4/1997 | Record et al. |
| 5,758,072 | A | 5/1998 | Filepp et al. |
| 5,765,004 | A | 6/1998 | Foster et al. |
| 5,822,564 | A | 10/1998 | Chilton et al. |
| 5,903,766 | A | 5/1999 | Walker et al. |
| 5,905,855 | A | 5/1999 | Klaiber et al. |
| 5,944,821 | A | 8/1999 | Angelo |
| 6,016,500 | A | 1/2000 | Waldo et al. |
| 6,070,239 | A | 5/2000 | McManis |
| 6,075,938 | A | 6/2000 | Bugnion et al. |
| 6,094,528 | A | 7/2000 | Jordan |
| 6,112,304 | A | 8/2000 | Clawson |
| 6,115,712 | A | 9/2000 | Islam et al. |
| 6,178,504 | B1 | 1/2001 | Fieres et al. |
| 6,186,677 | B1 | 2/2001 | Angel et al. |
| 6,195,676 | B1 | 2/2001 | Spix et al. |
| 6,199,100 | B1 | 3/2001 | Filepp et al. |
| 6,199,198 | B1 | 3/2001 | Graham |
| 6,217,165 | B1 | 4/2001 | Silverbrook |
| 6,223,293 | B1 | 4/2001 | Foster et al. |
| 6,233,565 | B1 | 5/2001 | Lewis et al. |
| 6,243,716 | B1 | 6/2001 | Waldo et al. |
| 6,247,027 | B1 | 6/2001 | Chaudhry et al. |
| 6,275,852 | B1 | 8/2001 | Filepp et al. |
| 6,289,382 | B1 | 9/2001 | Bowman-Amuah |
| 6,301,673 | B1 | 10/2001 | Foster et al. |
| 6,304,915 | B1 | 10/2001 | Nguyen et al. |
| 6,315,200 | B1 | 11/2001 | Silverbrook et al. |
| 6,317,192 | B1 | 11/2001 | Silverbrook et al. |
| 6,317,438 | B1 | 11/2001 | Trebes, Jr. |
| 6,321,366 | B1 | 11/2001 | Tseng et al. |
| 6,332,163 | B1 | 12/2001 | Bowman-Amuah |
| 6,339,832 | B1 | 1/2002 | Bowman-Amuah |
| 6,353,881 | B1 | 3/2002 | Chaudhry et al. |
| 6,356,715 | B1 | 3/2002 | Silverbrook |
| 6,360,193 | B1 | 3/2002 | Stoyen |
| 6,362,868 | B1 | 3/2002 | Silverbrook |
| 6,362,869 | B1 | 3/2002 | Silverbrook |
| 6,378,068 | B1 | 4/2002 | Foster et al. |
| 6,397,379 | B1 | 5/2002 | Yates, Jr. et al. |
| 6,415,054 | B1 | 7/2002 | Silverbrook et al. |
| 6,416,154 | B1 | 7/2002 | Silverbrook |
| 6,421,739 | B1 | 7/2002 | Holiday |
| 6,430,570 | B1 | 8/2002 | Judge et al. |
| 6,430,649 | B1 | 8/2002 | Chaudhry et al. |
| 6,431,669 | B1 | 8/2002 | Silverbrook |
| 6,434,568 | B1 | 8/2002 | Bowman-Amuah |
| 6,434,628 | B1 | 8/2002 | Bowman-Amuah |
| 6,438,594 | B1 | 8/2002 | Bowman-Amuah |
| 6,438,677 | B1 | 8/2002 | Chaudhry et al. |
| 6,442,525 | B1 | 8/2002 | Silverbrook et al. |
| 6,442,663 | B1 | 8/2002 | Sun et al. |
| 6,442,748 | B1 | 8/2002 | Bowman-Amuah |
| 6,453,463 | B1 | 9/2002 | Chaudhry et al. |
| 6,459,495 | B1 | 10/2002 | Silverbrook |
| 6,460,067 | B1 | 10/2002 | Chaudhry et al. |
| 6,463,457 | B1 | 10/2002 | Armentrout et al. |
| 6,463,526 | B1 | 10/2002 | Chaudhry et al. |
| 6,463,582 | B1 | 10/2002 | Lethin et al. |
| 6,476,863 | B1 | 11/2002 | Silverbrook |
| 6,477,580 | B1 | 11/2002 | Bowman-Amuah |
| 6,477,665 | B1 | 11/2002 | Bowman-Amuah |
| 6,493,730 | B1 | 12/2002 | Lewis et al. |
| 6,496,850 | B1 | 12/2002 | Bowman-Amuah |
| 6,502,102 | B1 | 12/2002 | Haswell et al. |
| 6,502,135 | B1 | 12/2002 | Munger et al. |
| 6,502,213 | B1 | 12/2002 | Bowman-Amuah |
| 6,510,352 | B1 | 1/2003 | Badavas et al. |
| 6,523,027 | B1 | 2/2003 | Underwood |
| 6,523,059 | B1 | 2/2003 | Schmidt |
| 6,529,909 | B1 | 3/2003 | Bowman-Amuah |
| 6,529,948 | B1 | 3/2003 | Bowman-Amuah |
| 6,539,396 | B1 | 3/2003 | Bowman-Amuah |
| 6,542,645 | B1 | 4/2003 | Silverbrook et al. |
| 6,546,397 | B1 | 4/2003 | Rempell |
| 6,547,364 | B2 | 4/2003 | Silverbrook |
| 6,549,949 | B1 | 4/2003 | Bowman-Amuah |
| 6,549,959 | B1 | 4/2003 | Yates et al. |
| 6,550,057 | B1 | 4/2003 | Bowman-Amuah |
| 6,565,181 | B2 | 5/2003 | Silverbrook |
| 6,571,282 | B1 | 5/2003 | Bowman-Amuah |
| 6,578,068 | B1 | 6/2003 | Bowman-Amuah |
| 6,601,192 | B1 | 7/2003 | Bowman-Amuah |
| 6,601,233 | B1 | 7/2003 | Underwood |
| 6,601,234 | B1 | 7/2003 | Bowman-Amuah |
| 6,606,660 | B1 | 8/2003 | Bowman-Amuah |
| 6,606,744 | B1 | 8/2003 | Mikurak |
| 6,609,128 | B1 | 8/2003 | Underwood |
| 6,615,199 | B1 | 9/2003 | Bowman-Amuah |
| 6,615,253 | B1 | 9/2003 | Bowman-Amuah |
| 6,618,117 | B2 | 9/2003 | Silverbrook |
| 6,618,761 | B2 | 9/2003 | Munger et al. |
| 6,625,751 | B1 | 9/2003 | Starovic et al. |
| 6,633,878 | B1 | 10/2003 | Underwood |
| 6,636,216 | B1 | 10/2003 | Silverbrook et al. |
| 6,636,242 | B2 | 10/2003 | Bowman-Amuah |
| 6,640,238 | B1 | 10/2003 | Bowman-Amuah |
| 6,640,244 | B1 | 10/2003 | Bowman-Amuah |

(56) References Cited

U.S. PATENT DOCUMENTS

| | | |
|---|---|---|
| 6,640,249 B1 | 10/2003 | Bowman-Amuah |
| 6,643,650 B1 | 11/2003 | Slaughter et al. |
| 6,644,771 B1 | 11/2003 | Silverbrook |
| 6,658,451 B1 | 12/2003 | Chaudhry et al. |
| 6,665,454 B1 | 12/2003 | Silverbrook et al. |
| 6,671,818 B1 | 12/2003 | Mikurak |
| 6,674,769 B1 | 1/2004 | Viswanath |
| 6,684,398 B2 | 1/2004 | Chaudhry et al. |
| 6,691,250 B1 | 2/2004 | Chandiramani et al. |
| 6,701,514 B1 | 3/2004 | Haswell et al. |
| 6,702,417 B2 | 3/2004 | Silverbrook |
| 6,704,862 B1 | 3/2004 | Chaudhry et al. |
| 6,704,871 B1 | 3/2004 | Kaplan et al. |
| 6,704,873 B1 | 3/2004 | Underwood |
| 6,708,273 B1 | 3/2004 | Ober et al. |
| 6,715,145 B1 | 3/2004 | Bowman-Amuah |
| 6,718,438 B2 | 4/2004 | Lewis et al. |
| 6,718,486 B1 | 4/2004 | Roselli et al. |
| 6,718,535 B1 | 4/2004 | Underwood |
| 6,718,538 B1 | 4/2004 | Mathiske |
| 6,721,944 B2 | 4/2004 | Chaudhry et al. |
| 6,732,363 B1 | 5/2004 | Chaudhry et al. |
| 6,742,015 B1 | 5/2004 | Bowman-Amuah |
| 6,742,123 B1 | 5/2004 | Foote |
| 6,750,901 B1 | 6/2004 | Silverbrook |
| 6,750,944 B2 | 6/2004 | Silverbrook et al. |
| 6,754,855 B1 | 6/2004 | Denninghoff et al. |
| 6,760,736 B2 | 7/2004 | Waldo et al. |
| 6,760,815 B1 | 7/2004 | Traversat et al. |
| 6,760,825 B1 | 7/2004 | Sexton et al. |
| 6,763,440 B1 | 7/2004 | Traversat et al. |
| 6,763,452 B1 | 7/2004 | Hohensee et al. |
| 6,772,296 B1 | 8/2004 | Mathiske |
| 6,779,107 B1 | 8/2004 | Yates |
| 6,786,420 B1 | 9/2004 | Silverbrook |
| 6,788,336 B1 | 9/2004 | Silverbrook |
| 6,788,688 B2 | 9/2004 | Trebes, Jr. |
| 6,788,980 B1 | 9/2004 | Johnson |
| 6,789,077 B1 | 9/2004 | Slaughter et al. |
| 6,789,126 B1 | 9/2004 | Saulpaugh et al. |
| 6,789,181 B1 | 9/2004 | Reese et al. |
| 6,792,466 B1 | 9/2004 | Saulpaugh et al. |
| 6,795,966 B1 | 9/2004 | Lim et al. |
| 6,803,989 B2 | 10/2004 | Silverbrook |
| 6,826,616 B2 | 11/2004 | Larson et al. |
| 6,826,748 B1 | 11/2004 | Hohensee et al. |
| 6,831,681 B1 | 12/2004 | Silverbrook |
| 6,832,367 B1 | 12/2004 | Choi et al. |
| 6,834,310 B2 | 12/2004 | Munger et al. |
| 6,837,427 B2 | 1/2005 | Overhultz et al. |
| 6,839,759 B2 | 1/2005 | Larson et al. |
| 6,842,906 B1 | 1/2005 | Bowman-Amuah |
| 6,850,274 B1 | 2/2005 | Silverbrook et al. |
| 6,850,979 B1 | 2/2005 | Saulpaugh et al. |
| 6,854,115 B1 | 2/2005 | Traversat et al. |
| 6,857,719 B2 | 2/2005 | Silverbrook |
| 6,862,594 B1 | 3/2005 | Saulpaugh et al. |
| 6,865,657 B1 | 3/2005 | Traversat et al. |
| 6,868,447 B1 | 3/2005 | Slaughter et al. |
| 6,874,066 B2 | 3/2005 | Traversat et al. |
| 6,879,341 B1 | 4/2005 | Silverbrook |
| 6,895,460 B2 | 5/2005 | Desoli et al. |
| 6,898,618 B1 | 5/2005 | Slaughter et al. |
| 6,898,791 B1 | 5/2005 | Chandy et al. |
| 6,907,473 B2 | 6/2005 | Schmidt et al. |
| 6,907,546 B1 | 6/2005 | Haswell et al. |
| 6,912,708 B2 | 6/2005 | Wallman et al. |
| 6,917,976 B1 | 7/2005 | Slaughter et al. |
| 6,918,084 B1 | 7/2005 | Slaughter et al. |
| 6,918,542 B2 | 7/2005 | Silverbrook et al. |
| 6,934,755 B1 | 8/2005 | Saulpaugh et al. |
| 6,934,832 B1 | 8/2005 | Van Dyke et al. |
| 6,938,130 B2 | 8/2005 | Jacobson et al. |
| 6,938,164 B1 | 8/2005 | England et al. |
| 6,941,410 B1 | 9/2005 | Traversat et al. |
| 6,941,545 B1 | 9/2005 | Reese et al. |
| 6,948,661 B2 | 9/2005 | Silverbrook et al. |
| 6,950,875 B1 | 9/2005 | Slaughter et al. |
| 6,953,235 B2 | 10/2005 | Silverbrook |
| 6,954,254 B2 | 10/2005 | Silverbrook |
| 6,954,923 B1 | 10/2005 | Yates, Jr. et al. |
| 6,957,237 B1 | 10/2005 | Traversat et al. |
| 6,970,869 B1 | 11/2005 | Slaughter et al. |
| 6,973,493 B1 | 12/2005 | Slaughter et al. |
| 6,973,646 B1 | 12/2005 | Bordawekar et al. |
| 6,978,462 B1 | 12/2005 | Adler et al. |
| 6,986,052 B1 | 1/2006 | Mittal |
| 6,986,562 B2 | 1/2006 | Silverbrook |
| 6,988,025 B2 | 1/2006 | Ransom et al. |
| 6,990,395 B2 | 1/2006 | Ransom et al. |
| 7,003,770 B1 | 2/2006 | Pang et al. |
| 7,007,852 B2 | 3/2006 | Silverbrook et al. |
| 7,010,573 B1 | 3/2006 | Saulpaugh et al. |
| 7,013,456 B1 | 3/2006 | Van Dyke et al. |
| 7,016,966 B1 | 3/2006 | Saulpaugh et al. |
| 7,020,532 B2 | 3/2006 | Johnson et al. |
| 7,020,697 B1 | 3/2006 | Goodman et al. |
| 7,021,535 B2 | 4/2006 | Overhultz et al. |
| 7,028,306 B2 | 4/2006 | Boloker et al. |
| 7,044,589 B2 | 5/2006 | Silverbrook |
| 7,047,394 B1 | 5/2006 | Van Dyke et al. |
| 7,050,143 B1 | 5/2006 | Silverbrook et al. |
| 7,051,192 B2 | 5/2006 | Chaudhry et al. |
| 7,052,103 B2 | 5/2006 | Silverbrook |
| 7,055,927 B2 | 6/2006 | Silverbrook |
| 7,065,549 B2 | 6/2006 | Sun et al. |
| 7,065,574 B1 | 6/2006 | Saulpaugh et al. |
| 7,065,633 B1 | 6/2006 | Yates, Jr. et al. |
| 7,069,421 B1 | 6/2006 | Yates, Jr. et al. |
| 7,072,967 B1 | 7/2006 | Saulpaugh et al. |
| 7,073,713 B2 | 7/2006 | Silverbrook et al. |
| 7,080,078 B1 | 7/2006 | Slaughter et al. |
| 7,083,108 B2 | 8/2006 | Silverbrook et al. |
| 7,084,951 B2 | 8/2006 | Silverbrook |
| 7,089,374 B2 | 8/2006 | Tremblay et al. |
| 7,092,011 B2 | 8/2006 | Silverbrook et al. |
| 7,093,004 B2 | 8/2006 | Bernardin et al. |
| 7,093,086 B1 | 8/2006 | van Rietschote |
| 7,093,989 B2 | 8/2006 | Walmsley et al. |
| 7,096,137 B2 | 8/2006 | Shipton et al. |
| 7,097,104 B2 | 8/2006 | Silverbrook et al. |
| 7,100,195 B1 | 8/2006 | Underwood |
| 7,100,834 B2 | 9/2006 | Silverbrook et al. |
| 7,110,139 B2 | 9/2006 | Silverbrook |
| 7,111,290 B1 | 9/2006 | Yates, Jr. et al. |
| 7,119,836 B2 | 10/2006 | Silverbrook |
| 7,121,639 B2 | 10/2006 | Plunkett |
| 7,124,101 B1 | 10/2006 | Mikurak |
| 7,128,386 B2 | 10/2006 | Silverbrook |
| 7,130,807 B1 | 10/2006 | Mikurak |
| 7,131,026 B2 | 10/2006 | Denninghoff et al. |
| 7,137,016 B2 | 11/2006 | Nalawadi et al. |
| 7,137,110 B1 | 11/2006 | Reese et al. |
| 7,140,726 B2 | 11/2006 | Silverbrook |
| 7,146,305 B2 | 12/2006 | van der Made |
| 7,152,939 B2 | 12/2006 | Silverbrook |
| 7,152,942 B2 | 12/2006 | Walmsley et al. |
| 7,155,395 B2 | 12/2006 | Silverbrook |
| 7,159,211 B2 | 1/2007 | Jalan et al. |
| 7,163,273 B2 | 1/2007 | Silverbrook |
| 7,163,345 B2 | 1/2007 | Walmsley et al. |
| 7,165,824 B2 | 1/2007 | Walmsley et al. |
| 7,168,076 B2 | 1/2007 | Chaudhry et al. |
| 7,171,323 B2 | 1/2007 | Shipton et al. |
| 7,181,572 B2 | 2/2007 | Walmsley |
| 7,181,613 B2 | 2/2007 | Boebert et al. |
| 7,185,319 B2 | 2/2007 | Kaler et al. |
| 7,185,323 B2 | 2/2007 | Nair et al. |
| 7,187,404 B2 | 3/2007 | Silverbrook et al. |
| 7,188,180 B2 | 3/2007 | Larson et al. |
| 7,188,251 B1 | 3/2007 | Slaughter et al. |
| 7,188,282 B2 | 3/2007 | Walmsley |
| 7,188,928 B2 | 3/2007 | Walmsley et al. |
| 7,191,440 B2 | 3/2007 | Cota-Robles et al. |

(56) References Cited

U.S. PATENT DOCUMENTS

| | | |
|---|---|---|
| 7,191,441 B2 | 3/2007 | Abbott et al. |
| 7,193,482 B2 | 3/2007 | Silverbrook |
| 7,200,705 B2 | 4/2007 | Santos et al. |
| 7,200,848 B1 | 4/2007 | Slaughter et al. |
| 7,201,319 B2 | 4/2007 | Silverbrook et al. |
| 7,203,477 B2 | 4/2007 | Coppinger et al. |
| 7,203,485 B2 | 4/2007 | Coppinger et al. |
| 7,206,805 B1 | 4/2007 | McLaughlin, Jr. |
| 7,206,903 B1 | 4/2007 | Moir et al. |
| 7,213,047 B2 | 5/2007 | Yeager et |
| 7,213,246 B1 | 5/2007 | van Rietschote et al. |
| 7,228,404 B1 | 6/2007 | Patel et al. |
| 7,233,421 B2 | 6/2007 | Silverbrook |
| 7,234,076 B2 | 6/2007 | Daynes et al. |
| 7,234,645 B2 | 6/2007 | Silverbrook et al. |
| 7,234,801 B2 | 6/2007 | Silverbrook |
| 7,237,140 B2 | 6/2007 | Nakamura et al. |
| 7,243,193 B2 | 7/2007 | Walmsley |
| 7,243,267 B2 | 7/2007 | Klemm et al. |
| 7,243,356 B1 | 7/2007 | Saulpaugh et al. |
| 7,249,280 B2 | 7/2007 | Lamport et al. |
| 7,252,353 B2 | 8/2007 | Silverbrook et al. |
| 7,254,390 B2 | 8/2007 | Coppinger et al. |
| 7,254,608 B2 | 8/2007 | Yeager et al. |
| 7,254,806 B1 | 8/2007 | Yates, Jr. et al. |
| 7,255,414 B2 | 8/2007 | Silverbrook |
| 7,260,543 B1 | 8/2007 | Saulpaugh et al. |
| 7,266,661 B2 | 9/2007 | Walmsley |
| 7,267,417 B2 | 9/2007 | Silverbrook et al. |
| 7,269,693 B2 | 9/2007 | Tremblay et al. |
| 7,269,694 B2 | 9/2007 | Tremblay et al. |
| 7,275,183 B2 | 9/2007 | Santos et al. |
| 7,275,246 B1 | 9/2007 | Yates, Jr. et al. |
| 7,275,800 B2 | 10/2007 | Silverbrook |
| 7,275,805 B2 | 10/2007 | Jackson Pulver et al. |
| 7,278,034 B2 | 10/2007 | Shipton |
| 7,278,697 B2 | 10/2007 | Plunkett |
| 7,278,723 B2 | 10/2007 | Silverbrook |
| 7,281,330 B2 | 10/2007 | Silverbrook et al. |
| 7,281,777 B2 | 10/2007 | Silverbrook et al. |
| 7,281,786 B2 | 10/2007 | Silverbrook |
| 7,283,162 B2 | 10/2007 | Silverbrook et al. |
| 7,286,815 B2 | 10/2007 | Coppinger et al. |
| 7,287,702 B2 | 10/2007 | Silverbrook et al. |
| 7,289,142 B2 | 10/2007 | Silverbrook |
| 7,289,156 B2 | 10/2007 | Silverbrook et al. |
| 7,289,964 B1 | 10/2007 | Bowman-Amuah |
| 7,290,852 B2 | 11/2007 | Jackson Pulver et al. |
| 7,293,267 B1 | 11/2007 | Fresko |
| 7,302,592 B2 | 11/2007 | Shipton et al. |
| 7,302,609 B2 | 11/2007 | Matena et al. |
| 7,307,526 B2 | 12/2007 | Rajapakse et al. |
| 7,311,257 B2 | 12/2007 | Silverbrook |
| 7,312,845 B2 | 12/2007 | Silverbrook |
| 7,314,261 B2 | 1/2008 | Jackson Pulver et al. |
| 7,320,142 B1 | 1/2008 | Kasper et al. |
| 7,325,897 B2 | 2/2008 | Silverbrook |
| 7,328,195 B2 | 2/2008 | Willis |
| 7,328,243 B2 | 2/2008 | Yeager et al. |
| 7,328,956 B2 | 2/2008 | Silverbrook et al. |
| 7,330,844 B2 | 2/2008 | Stoyen |
| 7,334,154 B2 | 2/2008 | Lorch et al. |
| 7,337,291 B2 | 2/2008 | Abadi et al. |
| 7,356,679 B1 | 4/2008 | Le et al. |
| 7,362,971 B2 | 4/2008 | Silverbrook et al. |
| 7,363,288 B2 | 4/2008 | Santos et al. |
| 7,366,880 B2 | 4/2008 | Chaudhry et al. |
| 7,370,064 B2 | 5/2008 | Yousefi'zadeh |
| 7,370,091 B1 | 5/2008 | Slaughter et al. |
| 7,370,360 B2 | 5/2008 | van der Made |
| 7,373,083 B2 | 5/2008 | Silverbrook et al. |
| 7,373,451 B2 | 5/2008 | Lam et al. |
| 7,374,096 B2 | 5/2008 | Overhultz et al. |
| 7,374,266 B2 | 5/2008 | Walmsley et al. |
| 7,376,755 B2 | 5/2008 | Pandya |
| 7,377,608 B2 | 5/2008 | Walmsley et al. |
| 7,377,609 B2 | 5/2008 | Walmsley et al. |
| 7,377,706 B2 | 5/2008 | Silverbrook et al. |
| 7,380,039 B2 | 5/2008 | Miloushev et al. |
| 7,380,051 B2 | 5/2008 | Birrell et al. |
| 7,382,264 B2 | 6/2008 | Rajapakse et al. |
| 7,389,383 B2 | 6/2008 | Tremblay et al. |
| 7,390,071 B2 | 6/2008 | Walmsley et al. |
| 7,391,435 B2 | 6/2008 | Silverbrook |
| 7,395,333 B1 | 7/2008 | Saulpaugh et al. |
| 7,395,536 B2 | 7/2008 | Verbeke et al. |
| 7,398,349 B2 | 7/2008 | Birrell et al. |
| 7,398,533 B1 | 7/2008 | Slaughter et al. |
| 7,399,043 B2 | 7/2008 | Walmsley et al. |
| 7,409,584 B2 | 8/2008 | Denninghoff et al. |
| 7,409,719 B2 | 8/2008 | Armstrong et al. |
| 7,412,518 B1 | 8/2008 | Duigou et al. |
| 7,412,520 B2 | 8/2008 | Sun |
| 7,415,723 B2 | 8/2008 | Pandya |
| 7,418,504 B2 | 8/2008 | Larson et al. |
| 7,421,698 B2 | 9/2008 | Fresko |
| 7,426,721 B1 | 9/2008 | Saulpaugh et al. |
| 7,427,117 B2 | 9/2008 | Jackson Pulver et al. |
| 7,430,670 B1 | 9/2008 | Horning et al. |
| 7,437,606 B2 | 10/2008 | Janakiraman et al. |
| 7,437,614 B2 | 10/2008 | Haswell et al. |
| 7,443,434 B2 | 10/2008 | Silverbrook |
| 7,444,601 B2 | 10/2008 | Proudler et al. |
| 7,444,644 B1 | 10/2008 | Slaughter et al. |
| 7,448,079 B2 | 11/2008 | Tremain |
| 7,448,707 B2 | 11/2008 | Jackson Pulver et al. |
| 7,452,048 B2 | 11/2008 | Silverbrook |
| 7,453,492 B2 | 11/2008 | Silverbrook |
| 7,456,861 B2 | 11/2008 | Silverbrook |
| 7,458,082 B1 | 11/2008 | Slaughter et al. |
| 7,460,152 B2 | 12/2008 | Silverbrook et al. |
| 7,461,931 B2 | 12/2008 | Silverbrook |
| 7,467,198 B2 | 12/2008 | Goodman et al. |
| 7,467,202 B2 | 12/2008 | Savchuk |
| 7,467,333 B2 | 12/2008 | Keeton et al. |
| 7,475,825 B2 | 1/2009 | Silverbrook et al. |
| 7,478,278 B2 | 1/2009 | Archer et al. |
| 7,480,761 B2 | 1/2009 | Birrell et al. |
| 7,483,050 B2 | 1/2009 | Silverbrook et al. |
| 7,483,053 B2 | 1/2009 | Silverbrook |
| 7,484,208 B1 | 1/2009 | Nelson |
| 7,484,831 B2 | 2/2009 | Walmsley et al. |
| 7,487,264 B2 | 2/2009 | Pandya |
| 7,490,151 B2 | 2/2009 | Munger et al. |
| 7,490,250 B2 | 2/2009 | Cromer et al. |
| 7,490,352 B2 | 2/2009 | Kramer et al. |
| 7,492,490 B2 | 2/2009 | Silverbrook |
| 7,505,068 B2 | 3/2009 | Silverbrook |
| 7,511,744 B2 | 3/2009 | Silverbrook et al. |
| 7,512,769 B1 | 3/2009 | Lowell et al. |
| 7,516,365 B2 | 4/2009 | Lev |
| 7,516,366 B2 | 4/2009 | Lev et al. |
| 7,517,036 B2 | 4/2009 | Walmsley et al. |
| 7,517,071 B2 | 4/2009 | Silverbrook |
| 7,523,111 B2 | 4/2009 | Walmsley |
| 7,524,045 B2 | 4/2009 | Silverbrook et al. |
| 7,524,047 B2 | 4/2009 | Silverbrook |
| 7,527,209 B2 | 5/2009 | Silverbrook |
| 7,529,897 B1 | 5/2009 | Waldspurger et al. |
| 7,533,141 B2 | 5/2009 | Nadgir et al. |
| 7,533,229 B1 | 5/2009 | van Rietschote |
| 7,536,462 B2 | 5/2009 | Pandya |
| 7,539,602 B2 | 5/2009 | Willis |
| 7,546,600 B2 | 6/2009 | Turner et al. |
| 7,548,946 B1 | 6/2009 | Saulpaugh et al. |
| 7,549,167 B1 | 6/2009 | Huang et al. |
| 7,549,579 B2 | 6/2009 | Overhultz et al. |
| 7,549,715 B2 | 6/2009 | Walmsley et al. |
| 7,549,718 B2 | 6/2009 | Silverbrook et al. |
| 7,552,312 B2 | 6/2009 | Archer et al. |
| 7,552,434 B2 | 6/2009 | Turner et al. |
| 7,557,941 B2 | 7/2009 | Walmsley |
| 7,559,472 B2 | 7/2009 | Silverbrook et al. |
| 7,562,369 B1 | 7/2009 | Salamone et al. |

(56) References Cited

U.S. PATENT DOCUMENTS

| | | |
|---|---|---|
| 7,568,025 B2 | 7/2009 | Vasudeva |
| 7,571,312 B2 | 8/2009 | Scarlata et al. |
| 7,574,588 B2 | 8/2009 | Chaudhry et al. |
| 7,574,692 B2 | 8/2009 | Herscu |
| 7,575,313 B2 | 8/2009 | Silverbrook |
| 7,577,834 B1 | 8/2009 | Traversat et al. |
| 7,581,826 B2 | 9/2009 | Silverbrook |
| 7,590,869 B2 | 9/2009 | Hashimoto |
| 7,590,972 B2 | 9/2009 | Axelrod et al. |
| 7,592,829 B2 | 9/2009 | Walmsley et al. |
| 7,594,168 B2 | 9/2009 | Rempell |
| 7,596,790 B2 | 9/2009 | Moakley |
| 7,600,843 B2 | 10/2009 | Silverbrook et al. |
| 7,602,423 B2 | 10/2009 | Silverbrook |
| 7,603,392 B2 | 10/2009 | Ben-Yehuda et al. |
| 7,603,440 B1 | 10/2009 | Grabowski et al. |
| 7,603,707 B2 | 10/2009 | Seifert et al. |
| 7,607,129 B2 | 10/2009 | Rosu et al. |
| 7,607,757 B2 | 10/2009 | Silverbrook et al. |
| 7,610,510 B2 | 10/2009 | Agarwal et al. |
| 7,613,749 B2 | 11/2009 | Flynn, Jr. et al. |
| 7,613,929 B2 | 11/2009 | Cohen et al. |
| 7,620,821 B1 | 11/2009 | Grohoski et al. |
| 7,621,607 B2 | 11/2009 | Silverbrook |
| 7,624,383 B2 | 11/2009 | Barr et al. |
| 7,627,693 B2 | 12/2009 | Pandya |
| 7,629,999 B2 | 12/2009 | Silverbrook |
| 7,631,107 B2 | 12/2009 | Pandya |
| 7,631,190 B2 | 12/2009 | Walmsley |
| 7,631,966 B2 | 12/2009 | Silverbrook et al. |
| 7,636,940 B2 | 12/2009 | Yim |
| 7,653,833 B1 | 1/2010 | Miller et al. |
| 7,654,626 B2 | 2/2010 | Silverbrook et al. |
| 7,657,419 B2 | 2/2010 | van der Made |
| 7,660,998 B2 | 2/2010 | Walmsley |
| 7,663,502 B2 | 2/2010 | Breed |
| 7,665,834 B2 | 2/2010 | Silverbrook |
| 7,669,040 B2 | 2/2010 | Dice |
| 7,669,081 B2 | 2/2010 | Lett et al. |
| 7,676,456 B2 | 3/2010 | Suganuma et al. |
| 7,680,919 B2 | 3/2010 | Nelson |
| 7,681,075 B2 | 3/2010 | Havemose et al. |
| 7,685,251 B2 | 3/2010 | Houlihan et al. |
| 7,685,254 B2 | 3/2010 | Pandya |
| 7,689,676 B2 | 3/2010 | Vinberg et al. |
| 7,689,859 B2 | 3/2010 | Westenberg |
| 7,694,139 B2 | 4/2010 | Nachenberg et al. |
| 7,698,465 B2 | 4/2010 | Lamport |
| 7,701,506 B2 | 4/2010 | Silverbrook |
| 7,702,660 B2 | 4/2010 | Chan et al. |
| 7,707,583 B2 | 4/2010 | Schmidt et al. |
| 7,707,621 B2 | 4/2010 | Walmsley |
| 7,716,077 B1 | 5/2010 | Mikurak |
| 7,716,492 B1 | 5/2010 | Saulpaugh et al. |
| 7,721,138 B1 | 5/2010 | Lyadvinsky et al. |
| 7,721,139 B2 | 5/2010 | Castro et al. |
| 7,722,172 B2 | 5/2010 | Silverbrook |
| 7,725,703 B2 | 5/2010 | Hunter et al. |
| 7,730,299 B2 | 6/2010 | Boebert et al. |
| 7,730,312 B2 | 6/2010 | Everett et al. |
| 7,730,364 B2 | 6/2010 | Chang et al. |
| 7,734,607 B2 | 6/2010 | Grinstein et al. |
| 7,734,859 B2 | 6/2010 | Daniel et al. |
| 7,734,921 B2 | 6/2010 | Lotspiech |
| 7,735,944 B2 | 6/2010 | Silverbrook et al. |
| 7,739,517 B2 | 6/2010 | Sahita et al. |
| 7,743,126 B2 | 6/2010 | Russell |
| 7,743,389 B2 | 6/2010 | Mahalingam et al. |
| 7,747,154 B2 | 6/2010 | Silverbrook |
| 7,747,730 B1 | 6/2010 | Harlow |
| 7,747,814 B2 | 6/2010 | Green |
| 7,747,887 B2 | 6/2010 | Shipton et al. |
| 7,750,971 B2 | 7/2010 | Silverbrook |
| 7,752,459 B2 | 7/2010 | Cowan et al. |
| 7,757,086 B2 | 7/2010 | Walmsley |
| 7,758,143 B2 | 7/2010 | Silverbrook et al. |
| 7,760,743 B2 | 7/2010 | Shokri et al. |
| 7,770,008 B2 | 8/2010 | Walmsley |
| 7,779,270 B2 | 8/2010 | Horning et al. |
| 7,779,298 B2 | 8/2010 | Challenger et al. |
| 7,779,394 B2 | 8/2010 | Homing et al. |
| 7,783,779 B1 | 8/2010 | Scales et al. |
| 7,783,886 B2 | 8/2010 | Walmsley |
| 7,783,914 B1 | 8/2010 | Havemose |
| 7,789,501 B2 | 9/2010 | Silverbrook |
| 7,793,853 B2 | 9/2010 | Silverbrook et al. |
| 7,805,626 B2 | 9/2010 | Shipton |
| 7,805,761 B2 | 9/2010 | Ray et al. |
| 7,808,610 B2 | 10/2010 | Silverbrook |
| 7,810,081 B2 | 10/2010 | Dickenson et al. |
| 7,814,142 B2 | 10/2010 | Mamou et al. |
| 7,814,295 B2 | 10/2010 | Inglett et al. |
| 7,814,470 B2 | 10/2010 | Mamou et al. |
| 7,817,981 B2 | 10/2010 | Coppinger et al. |
| 7,818,510 B2 | 10/2010 | Tremblay et al. |
| 7,818,519 B2 | 10/2010 | Plunkett |
| 7,822,410 B2 | 10/2010 | Coppinger et al. |
| 7,822,979 B2 | 10/2010 | Mittal |
| 7,823,135 B2 | 10/2010 | Horning et al. |
| 7,826,088 B2 | 11/2010 | Silverbrook |
| 7,831,787 B1 | 11/2010 | Yueh |
| 7,831,827 B2 | 11/2010 | Walmsley |
| 7,832,842 B2 | 11/2010 | Jackson Pulver et al. |
| 7,836,215 B2 | 11/2010 | Fuente |
| 7,836,303 B2 | 11/2010 | Levy et al. |
| 7,837,115 B2 | 11/2010 | Silverbrook et al. |
| 7,839,803 B1 | 11/2010 | Snelgrove et al. |
| 7,840,787 B2 | 11/2010 | De Pauw et al. |
| 7,844,954 B2 | 11/2010 | Venkitachalam et al. |
| 7,849,450 B1 | 12/2010 | Rydh et al. |
| 7,849,624 B2 | 12/2010 | Holt et al. |
| 7,865,608 B1 | 1/2011 | Schuba et al. |
| 7,865,872 B2 | 1/2011 | Chamieh et al. |
| 7,865,893 B1 | 1/2011 | Omelyanchuk et al. |
| 7,866,778 B2 | 1/2011 | Silverbrook et al. |
| 7,870,217 B2 | 1/2011 | Pandya |
| 7,870,424 B2 | 1/2011 | Okabe |
| 7,873,869 B2 | 1/2011 | Darrington et al. |
| 7,877,436 B2 | 1/2011 | Arimilli et al. |
| 7,882,216 B2 | 2/2011 | Houlihan et al. |
| 7,890,689 B2 | 2/2011 | Lam et al. |
| 7,899,788 B2 | 3/2011 | Chandhok et al. |
| 7,899,915 B2 | 3/2011 | Reisman |
| 7,900,003 B2 | 3/2011 | Ben-Yehuda et al. |
| 7,904,664 B2 | 3/2011 | Tremblay et al. |
| 7,904,746 B2 | 3/2011 | Nakamura et al. |
| 7,908,255 B2 | 3/2011 | Detlefs et al. |
| 7,908,653 B2 | 3/2011 | Brickell et al. |
| 7,917,469 B2 | 3/2011 | Bernhard et al. |
| 7,917,596 B2 | 3/2011 | Chan et al. |
| 7,921,211 B2 | 4/2011 | Larson et al. |
| 7,921,686 B2 | 4/2011 | Bagepalli et al. |
| 7,924,313 B2 | 4/2011 | Silverbrook et al. |
| 7,925,791 B2 | 4/2011 | Ellis et al. |
| 7,925,850 B1 | 4/2011 | Waldspurger et al. |
| 7,930,733 B1 | 4/2011 | Iftode et al. |
| 7,931,200 B2 | 4/2011 | Silverbrook et al. |
| 7,933,990 B2 | 4/2011 | Munger et al. |
| 7,934,020 B1 | 4/2011 | Xu et al. |
| 7,934,035 B2 | 4/2011 | Miloushev et al. |
| 7,936,395 B2 | 5/2011 | Silverbrook |
| 7,937,547 B2 | 5/2011 | Liu et al. |
| 7,937,618 B2 | 5/2011 | Dorai et al. |
| 7,941,402 B2 | 5/2011 | Smits |
| 7,941,647 B2 | 5/2011 | Yates, Jr. et al. |
| 7,941,664 B2 | 5/2011 | Wheeler et al. |
| 7,941,698 B1 | 5/2011 | Aggarwal et al. |
| 7,941,799 B2 | 5/2011 | Easton et al. |
| 7,942,332 B2 | 5/2011 | Silverbrook et al. |
| 7,944,920 B2 | 5/2011 | Pandya |
| 7,945,654 B2 | 5/2011 | Larson et al. |
| 7,953,588 B2 | 5/2011 | Altman et al. |
| 7,957,009 B2 | 6/2011 | Silverbrook |
| 7,957,991 B2 | 6/2011 | Mikurak |

(56) References Cited

U.S. PATENT DOCUMENTS

| | | |
|---|---|---|
| 7,958,558 B1 | 6/2011 | Leake et al. |
| 7,962,137 B2 | 6/2011 | Coppinger et al. |
| 7,962,545 B2 | 6/2011 | Knauerhase et al. |
| 7,962,620 B2 | 6/2011 | Safari et al. |
| 7,962,703 B1 | 6/2011 | Shah et al. |
| 7,962,798 B2 | 6/2011 | Locasto et al. |
| 7,962,909 B1 | 6/2011 | Klaiber |
| 7,965,425 B2 | 6/2011 | Silverbrook |
| 7,966,519 B1 | 6/2011 | Aggarwal et al. |
| 7,966,614 B2 | 6/2011 | Chodroff et al. |
| 7,970,736 B2 | 6/2011 | Ben-Yehuda et al. |
| 7,971,015 B2 | 6/2011 | Waldspurger et al. |
| 7,975,138 B2 | 7/2011 | Andrade |
| 7,975,165 B2 | 7/2011 | Shneorson et al. |
| 7,975,176 B2 | 7/2011 | Bak et al. |
| 7,979,846 B2 | 7/2011 | Grechanik et al. |
| 7,984,304 B1 | 7/2011 | Waldspurger et al. |
| 7,984,965 B2 | 7/2011 | Silverbrook et al. |
| 7,987,274 B2 | 7/2011 | Larson et al. |
| 7,987,491 B2 | 7/2011 | Reisman |
| 8,001,232 B1 | 8/2011 | Saulpaugh et al. |
| 8,001,342 B2 | 8/2011 | Armstrong et al. |
| 8,001,505 B2 | 8/2011 | Bist et al. |
| 8,005,966 B2 | 8/2011 | Pandya |
| 8,006,079 B2 | 8/2011 | Goodson et al. |
| 8,010,495 B1 | 8/2011 | Kuznetzov et al. |
| 8,011,010 B2 | 8/2011 | Michael et al. |
| 8,011,747 B2 | 9/2011 | Walmsley et al. |
| 8,016,400 B2 | 9/2011 | Silverbrook |
| 8,019,964 B2 | 9/2011 | Greiner et al. |
| 8,020,099 B1 | 9/2011 | Lu |
| 8,020,979 B2 | 9/2011 | Silverbrook |
| 8,028,071 B1 | 9/2011 | Mahalingam et al. |
| 8,032,409 B1 | 10/2011 | Mikurak |
| 8,037,112 B2 | 10/2011 | Nath et al. |
| 8,037,202 B2 | 10/2011 | Yeager et al. |
| 8,037,278 B2 | 10/2011 | Greiner et al. |
| 8,037,350 B1 | 10/2011 | Aggarwal et al. |
| 8,038,239 B2 | 10/2011 | Walmsley et al. |
| 8,041,760 B2 | 10/2011 | Mamou et al. |
| 8,041,922 B2 | 10/2011 | Greiner et al. |
| 8,041,923 B2 | 10/2011 | Greiner et al. |
| 8,046,579 B2 | 10/2011 | Kresina |
| 8,051,181 B2 | 11/2011 | Larson et al. |
| 8,055,886 B2 | 11/2011 | Tashiro et al. |
| 8,055,940 B2 | 11/2011 | Ellis et al. |
| 8,060,553 B2 | 11/2011 | Mamou et al. |
| 8,061,828 B2 | 11/2011 | Silverbrook |
| 8,065,240 B2 | 11/2011 | Jung et al. |
| 8,065,504 B2 | 11/2011 | Yates, Jr. et al. |
| 8,065,722 B2 | 11/2011 | Barford et al. |
| 8,068,151 B2 | 11/2011 | Silverbrook et al. |
| 8,069,218 B1 | 11/2011 | Tormasov et al. |
| 8,069,374 B2 | 11/2011 | Panigrahy et al. |
| 8,074,055 B1 | 12/2011 | Yates, Jr. et al. |
| 8,077,207 B2 | 12/2011 | Silverbrook |
| 8,078,854 B2 | 12/2011 | Vick et al. |
| 8,078,910 B1 | 12/2011 | Backensto et al. |
| 8,082,405 B2 | 12/2011 | Greiner et al. |
| 8,082,468 B1 | 12/2011 | Backensto et al. |
| 8,082,481 B2 | 12/2011 | Casper et al. |
| 8,082,491 B1 | 12/2011 | Abdelaziz et al. |
| 8,086,811 B2 | 12/2011 | Gainey, Jr. et al. |
| 8,090,452 B2 | 1/2012 | Johnson et al. |
| 8,098,285 B2 | 1/2012 | Silverbrook |
| 8,102,071 B2 | 1/2012 | Catlin |
| 8,103,674 B2 | 1/2012 | de Moura et al. |
| 8,103,851 B2 | 1/2012 | Greiner et al. |
| 8,108,455 B2 | 1/2012 | Yeager et al. |
| 8,108,662 B2 | 1/2012 | Darrington et al. |
| 8,108,722 B1 | 1/2012 | Havemose et al. |
| 8,108,855 B2 | 1/2012 | Dias et al. |
| 8,112,423 B2 | 2/2012 | Bernhard et al. |
| 8,117,372 B2 | 2/2012 | Daniel et al. |
| 8,117,417 B2 | 2/2012 | Greiner et al. |
| 8,117,496 B2 | 2/2012 | Bashir et al. |
| 8,117,554 B1 | 2/2012 | Grechishkin et al. |
| 8,121,828 B2 | 2/2012 | Yates, Jr. et al. |
| 8,122,434 B2 | 2/2012 | Kostadinov et al. |
| 8,127,060 B2 | 2/2012 | Doll et al. |
| 8,127,121 B2 | 2/2012 | Yates, Jr. et al. |
| 8,127,412 B2 | 3/2012 | Gleichauf et al. |
| 8,131,845 B1 | 3/2012 | Vasudeva |
| 8,131,851 B2 | 3/2012 | Harlow |
| 8,135,796 B1 | 3/2012 | Slaughter et al. |
| 8,140,565 B2 | 3/2012 | D'Angelo et al. |
| 8,140,905 B2 | 3/2012 | Beaty et al. |
| 8,140,907 B2 | 3/2012 | Beaty et al. |
| 8,145,945 B2 | 3/2012 | Lee |
| 8,151,083 B2 | 4/2012 | Greiner et al. |
| 8,156,373 B2 | 4/2012 | Zheng et al. |
| 8,161,172 B2 | 4/2012 | Reisman |
| 8,161,321 B2 | 4/2012 | Zheng et al. |
| 8,161,479 B2 | 4/2012 | Sedukhin et al. |
| 8,165,286 B2 | 4/2012 | Ciet et al. |
| 8,166,477 B1 | 4/2012 | Tormasov |
| 8,166,693 B2 | 5/2012 | Hughes et al. |
| 8,171,301 B2 | 5/2012 | Seguin et al. |
| 8,171,338 B2 | 5/2012 | Agesen et al. |
| 8,171,554 B2 | 5/2012 | Elovici et al. |
| 8,176,364 B1 | 5/2012 | Havemose |
| 8,181,150 B2 | 5/2012 | Szpak et al. |
| 8,181,182 B1 | 5/2012 | Martin |
| 8,181,239 B2 | 5/2012 | Pandya |
| 8,185,502 B2 | 5/2012 | Irisawa et al. |
| 8,190,574 B2 | 5/2012 | Barnes et al. |
| 8,195,722 B1 | 6/2012 | Havemose et al. |
| 8,195,739 B2 | 6/2012 | Bernardin et al. |
| 8,195,774 B2 | 6/2012 | Lambeth et al. |
| 8,195,984 B2 | 6/2012 | Alberi et al. |
| 8,196,139 B2 | 6/2012 | Easton et al. |
| 8,196,205 B2 | 6/2012 | Gribble et al. |
| 8,200,771 B2 | 6/2012 | Ganesh et al. |
| 8,201,169 B2 | 6/2012 | Venkitachalam et al. |
| 8,204,082 B2 | 6/2012 | Jungck et al. |
| 8,205,120 B2 | 6/2012 | Heidasch et al. |
| 8,205,194 B2 | 6/2012 | Fries et al. |
| 8,209,524 B2 | 6/2012 | Ferren et al. |
| 8,209,680 B1 | 6/2012 | Le et al. |
| 8,214,191 B2 | 7/2012 | Ferren et al. |
| 8,214,367 B2 | 7/2012 | Baratto et al. |
| 8,214,622 B2 | 7/2012 | Blandy et al. |
| 8,214,686 B2 | 7/2012 | Ueda |
| 8,214,829 B2 | 7/2012 | Neogi et al. |
| 8,219,063 B2 | 7/2012 | Rogel et al. |
| 8,219,947 B2 | 7/2012 | Bist et al. |
| 8,225,314 B2 | 7/2012 | Martins et al. |
| 8,233,882 B2 | 7/2012 | Rogel |
| 8,239,340 B2 | 8/2012 | Hanson |
| 8,239,633 B2 | 8/2012 | Wood et al. |
| 8,239,646 B2 | 8/2012 | Colbert et al. |
| 8,239,649 B2 | 8/2012 | Gainey, Jr. et al. |
| 8,244,954 B2 | 8/2012 | Ganesh et al. |
| 8,245,013 B2 | 8/2012 | Ganesh et al. |
| 8,245,083 B2 | 8/2012 | Van Der Merwe et al. |
| 8,250,405 B2 | 8/2012 | Elnozahy |
| 8,255,651 B2 | 8/2012 | Liu et al. |
| 8,260,904 B2 | 9/2012 | Nelson |
| 8,261,233 B2 | 9/2012 | Szpak et al. |
| 8,266,125 B2 | 9/2012 | Wester et al. |
| 8,266,275 B2 | 9/2012 | Xu et al. |
| 8,266,276 B1 | 9/2012 | Vasudeva |
| 8,266,404 B2 | 9/2012 | Waldspurger et al. |
| 8,266,607 B2 | 9/2012 | Burka et al. |
| 8,271,336 B2 | 9/2012 | Mikurak |
| 8,271,950 B2 | 9/2012 | Bharadwaj |
| 8,271,990 B2 | 9/2012 | De et al. |
| 8,274,665 B2 | 9/2012 | Silverbrook |
| 8,276,127 B2 | 9/2012 | Rydh et al. |
| 8,280,944 B2 | 10/2012 | Laadan et al. |
| 8,280,974 B2 | 10/2012 | Herington |
| 8,281,317 B1 | 10/2012 | Backensto et al. |
| 8,281,318 B2 | 10/2012 | Chanda et al. |
| 8,285,999 B1 | 10/2012 | Ghose et al. |

(56) References Cited

U.S. PATENT DOCUMENTS

| | | |
|---|---|---|
| 8,286,174 B1 | 10/2012 | Schmidt et al. |
| 8,295,834 B2 | 10/2012 | Coppinger et al. |
| 8,295,835 B2 | 10/2012 | Coppinger et al. |
| 8,296,419 B1 | 10/2012 | Khanna et al. |
| 8,296,551 B2 | 10/2012 | Bugnion |
| 8,296,759 B1 | 10/2012 | Hutchins et al. |
| 8,301,672 B2 | 10/2012 | Jiva et al. |
| 8,301,700 B1 | 10/2012 | Havemose |
| 8,302,094 B2 | 10/2012 | Rogel et al. |
| 8,307,187 B2 | 11/2012 | Chawla et al. |
| 8,312,224 B2 | 11/2012 | Elnozahy |
| 8,315,991 B2 | 11/2012 | Mandagere et al. |
| 8,321,558 B1 | 11/2012 | Sirota et al. |
| 8,321,643 B1 | 11/2012 | Vaghani et al. |
| 8,321,948 B2 | 11/2012 | Robinson et al. |
| 8,326,449 B2 | 12/2012 | Hartz et al. |
| 8,327,350 B2 | 12/2012 | Chess et al. |
| 8,328,101 B2 | 12/2012 | Silverbrook et al. |
| 8,332,632 B2 | 12/2012 | Iftode et al. |
| 8,332,649 B2 | 12/2012 | Yokota et al. |
| 8,332,689 B2 | 12/2012 | Timashev et al. |
| 8,332,824 B2 | 12/2012 | Shemenzon et al. |
| 8,335,906 B2 | 12/2012 | Greiner et al. |
| 8,341,749 B2 | 12/2012 | Rogel |
| 8,346,726 B2 | 1/2013 | Liu et al. |
| 8,346,891 B2 | 1/2013 | Safari et al. |
| 8,347,072 B2 | 1/2013 | Mittal |
| 8,347,140 B1 | 1/2013 | Backensto et al. |
| 8,347,288 B1 | 1/2013 | Brandwine |
| 8,352,801 B2 | 1/2013 | Van Der Merwe et al. |
| 8,356,314 B2 | 1/2013 | Sprunk |
| 8,370,493 B2 | 2/2013 | Sirota et al. |
| 8,370,530 B2 | 2/2013 | Tripathi et al. |
| 8,370,609 B1 | 2/2013 | Favor et al. |
| 8,370,802 B2 | 2/2013 | Pacifici et al. |
| 8,370,811 B2 | 2/2013 | Grechanik et al. |
| 8,370,814 B2 | 2/2013 | Grechanik et al. |
| 8,370,837 B2 | 2/2013 | Emelianov et al. |
| 8,370,838 B1 | 2/2013 | Omelyanchuk et al. |
| 8,375,188 B1 | 2/2013 | Shah et al. |
| 8,381,028 B2 | 2/2013 | Elnozahy |
| 8,381,032 B2 | 2/2013 | Burn et al. |
| 8,381,224 B2 | 2/2013 | Huetter et al. |
| 8,386,428 B2 | 2/2013 | Kuznetzov et al. |
| 8,386,594 B2 | 2/2013 | Underwood et al. |
| 8,386,838 B1 | 2/2013 | Byan |
| 8,386,853 B2 | 2/2013 | Alberi et al. |
| 8,387,022 B2 | 2/2013 | Horning et al. |
| 8,392,838 B2 | 3/2013 | Chawla et al. |
| 8,397,032 B2 | 3/2013 | Elnozahy |
| 8,397,088 B1 | 3/2013 | Ghose |
| 8,401,940 B1 | 3/2013 | Havemose |
| 8,401,941 B1 | 3/2013 | Havemose |
| 8,402,305 B1 | 3/2013 | Havemose |
| 8,402,318 B2 | 3/2013 | Nieh et al. |
| 8,402,464 B2 | 3/2013 | Dice et al. |
| 8,407,428 B2 | 3/2013 | Cheriton et al. |
| 8,407,455 B2 | 3/2013 | Christie et al. |
| 8,407,518 B2 | 3/2013 | Nelson et al. |
| 8,413,145 B2 | 4/2013 | Chou et al. |
| 8,417,885 B2 | 4/2013 | Chou et al. |
| 8,417,916 B2 | 4/2013 | Greiner et al. |
| 8,423,959 B1 | 4/2013 | Petras |
| 8,423,961 B2 | 4/2013 | Byers et al. |
| 8,424,005 B2 | 4/2013 | Strom et al. |
| 8,429,362 B1 | 4/2013 | Natanzon et al. |
| 8,433,682 B2 | 4/2013 | Ngo |
| 8,433,951 B1 | 4/2013 | Havemose et al. |
| 8,434,093 B2 | 4/2013 | Larimore et al. |
| 8,438,256 B2 | 5/2013 | Rogel et al. |
| 8,438,360 B2 | 5/2013 | Youngworth |
| 8,438,609 B2 | 5/2013 | Cohen et al. |
| 8,442,955 B2 | 5/2013 | Al Kiswany et al. |
| 8,443,069 B2 | 5/2013 | Bagepalli et al. |
| 8,443,367 B1 | 5/2013 | Taylor et al. |
| 8,446,224 B2 | 5/2013 | Cortadella et al. |
| 8,448,022 B1 | 5/2013 | Scott |
| 8,453,120 B2 | 5/2013 | Ceze et al. |
| 8,458,341 B2 | 6/2013 | Larson et al. |
| 8,458,517 B1 | 6/2013 | Vermeulen et al. |
| 8,458,696 B2 | 6/2013 | Park et al. |
| 8,463,825 B1 | 6/2013 | Harty et al. |
| 8,464,256 B1 | 6/2013 | Havemose |
| 8,468,310 B2 | 6/2013 | Colbert et al. |
| 8,468,521 B2 | 6/2013 | Pawlowski |
| 8,473,594 B2 | 6/2013 | Astete et al. |
| 8,473,627 B2 | 6/2013 | Astete et al. |
| 8,473,900 B2 | 6/2013 | Frost |
| 8,484,732 B1 | 7/2013 | Chen et al. |
| 8,489,699 B2 | 7/2013 | Goggin et al. |
| 8,489,853 B2 | 7/2013 | Greiner et al. |
| 8,489,939 B2 | 7/2013 | Hiltunen et al. |
| 8,495,326 B2 | 7/2013 | Gainey, Jr. et al. |
| 8,495,633 B2 | 7/2013 | Easton et al. |
| 8,495,708 B2 | 7/2013 | Cohen et al. |
| 8,498,966 B1 | 7/2013 | Waghole |
| 8,499,297 B2 | 7/2013 | Chen et al. |
| 8,504,670 B2 | 8/2013 | Wu et al. |
| 8,504,696 B2 | 8/2013 | Larson et al. |
| 8,504,697 B2 | 8/2013 | Larson et al. |
| 8,504,791 B2 | 8/2013 | Cheriton et al. |
| 8,510,596 B1 | 8/2013 | Gupta et al. |
| 8,510,827 B1 | 8/2013 | Leake et al. |
| 8,516,117 B2 | 8/2013 | Munger et al. |
| 8,516,131 B2 | 8/2013 | Larson et al. |
| 8,520,002 B2 | 8/2013 | Stambaugh |
| 8,521,888 B2 | 8/2013 | Larson et al. |
| 8,527,462 B1 | 9/2013 | Talius et al. |
| 8,527,640 B2 | 9/2013 | Reisman |
| 8,527,809 B1 | 9/2013 | Backensto et al. |
| 8,527,990 B1 | 9/2013 | Marathe et al. |
| 8,533,382 B2 | 9/2013 | Scales et al. |
| 8,533,390 B2 | 9/2013 | Dong et al. |
| 8,533,663 B2 | 9/2013 | Moir et al. |
| 8,533,713 B2 | 9/2013 | Dong |
| 8,539,066 B1 | 9/2013 | Vasudeva |
| 8,539,137 B1 | 9/2013 | Protassov et al. |
| 8,539,262 B2 | 9/2013 | Huang et al. |
| 8,539,434 B2 | 9/2013 | Vertes |
| 8,539,488 B1 | 9/2013 | Havemose |
| 8,548,146 B2 | 10/2013 | Soo et al. |
| 8,548,790 B2 | 10/2013 | Tylutki |
| 8,549,210 B2 | 10/2013 | Hunter et al. |
| 8,549,241 B2 | 10/2013 | Scales et al. |
| 8,549,275 B2 | 10/2013 | Mittal |
| 8,549,313 B2 | 10/2013 | Seguin et al. |
| 8,549,646 B2 | 10/2013 | Stavrou et al. |
| 8,554,899 B2 | 10/2013 | Larson et al. |
| 8,554,900 B2 | 10/2013 | Nelson |
| 8,554,981 B2 | 10/2013 | Schmidt et al. |
| 8,560,366 B2 | 10/2013 | Mikurak |
| 8,560,705 B2 | 10/2013 | Larson et al. |
| 8,560,772 B1 | 10/2013 | Piszczek et al. |
| 8,560,816 B2 | 10/2013 | Moir et al. |
| 8,561,045 B2 | 10/2013 | Porras et al. |
| 8,561,046 B2 | 10/2013 | Song et al. |
| 8,566,640 B2 | 10/2013 | Timashev et al. |
| 8,572,247 B2 | 10/2013 | Larson et al. |
| 8,572,613 B1 | 10/2013 | Brandwine |
| 8,572,735 B2 | 10/2013 | Ghosh et al. |
| 8,572,876 B2 | 11/2013 | Shekarri et al. |
| 8,576,881 B2 | 11/2013 | Jungck et al. |
| 8,577,845 B2 | 11/2013 | Nguyen et al. |
| 8,578,000 B2 | 11/2013 | Van Wie et al. |
| 8,584,101 B2 | 11/2013 | Moon et al. |
| 8,584,127 B2 | 11/2013 | Yoshida |
| 8,588,179 B2 | 11/2013 | Fujino |
| 8,589,406 B2 | 11/2013 | Lillibridge |
| 8,595,191 B2 | 11/2013 | Prahlad et al. |
| 8,601,086 B2 | 12/2013 | Pandya |
| 8,601,483 B2 | 12/2013 | He et al. |
| 8,601,498 B2 | 12/2013 | Laurich et al. |
| 8,607,039 B2 | 12/2013 | Filali-Adib et al. |
| 8,607,242 B2 | 12/2013 | Clarke |

(56) References Cited

U.S. PATENT DOCUMENTS

| | | |
|---|---|---|
| 8,612,802 B1 | 12/2013 | Havemose |
| 8,621,180 B2 | 12/2013 | Greiner et al. |
| 8,621,183 B2 | 12/2013 | Hohmuth et al. |
| 8,621,275 B1 | 12/2013 | Havemose |
| 8,621,283 B2 | 12/2013 | Van Der Merwe et al. |
| 8,621,496 B2 | 12/2013 | Madampath |
| 8,622,839 B1 | 1/2014 | McKenzie et al. |
| 8,627,000 B2 | 1/2014 | Green et al. |
| 8,627,053 B2 | 1/2014 | Mittal |
| 8,627,143 B2 | 1/2014 | Ranganathan et al. |
| 8,631,066 B2 | 1/2014 | Lim et al. |
| 8,631,216 B2 | 1/2014 | Greiner et al. |
| 8,631,248 B2 | 1/2014 | Cowan et al. |
| 8,631,411 B1 | 1/2014 | Ghose |
| 8,631,456 B2 | 1/2014 | Reisman |
| 8,639,599 B1 | 1/2014 | Havemose |
| 8,645,240 B1 | 2/2014 | Havemose |
| 8,645,754 B1 | 2/2014 | Backensto et al. |
| 8,645,958 B2 | 2/2014 | Huetter et al. |
| 8,656,077 B2 | 2/2014 | Miloushev et al. |
| 8,656,412 B2 | 2/2014 | Kashyap |
| 8,661,457 B2 | 2/2014 | Kashyap |
| 8,667,066 B1 | 3/2014 | Havemose |
| 8,671,085 B2 | 3/2014 | Dhamankar et al. |
| 8,677,352 B2 | 3/2014 | Hiltgen et al. |
| 8,682,795 B2 | 3/2014 | Lenkov et al. |
| 8,683,004 B2 | 3/2014 | Bauer |
| 8,694,821 B2 | 4/2014 | Griffith et al. |
| 8,694,828 B2 | 4/2014 | Nelson et al. |
| 8,706,992 B2 | 4/2014 | Liu et al. |
| 8,713,268 B2 | 4/2014 | Dillow et al. |
| 8,713,273 B2 | 4/2014 | Waldspurger et al. |
| 8,713,293 B2 | 4/2014 | Tashiro et al. |
| 8,713,362 B2 | 4/2014 | Griffith et al. |
| 8,719,520 B1 | 5/2014 | Piszczek et al. |
| 8,719,849 B1 | 5/2014 | Madampath |
| 8,725,782 B2 | 5/2014 | Starks et al. |
| 8,726,078 B1 | 5/2014 | Havemose |
| 8,726,251 B2 | 5/2014 | Kalogeropulos et al. |
| 8,732,023 B2 | 5/2014 | Mikurak |
| 8,739,164 B2 | 5/2014 | Chung et al. |
| 8,745,098 B1 | 6/2014 | Havemose et al. |
| 8,745,442 B1 | 6/2014 | Havemose |
| 8,745,601 B1 | 6/2014 | Carlson et al. |
| 8,752,048 B1 | 6/2014 | Backensto et al. |
| 8,752,049 B1 | 6/2014 | Backensto et al. |
| 8,769,127 B2 | 7/2014 | Selimis et al. |
| 8,775,871 B1 | 7/2014 | Backensto et al. |
| 8,776,038 B2 | 7/2014 | Larimore et al. |
| 8,782,365 B1 | 7/2014 | Mooring et al. |
| 8,782,434 B1 | 7/2014 | Ghose |
| 8,782,435 B1 | 7/2014 | Ghose |
| 8,782,632 B1 | 7/2014 | Chigurapati et al. |
| 8,788,792 B2 | 7/2014 | Yates, Jr. et al. |
| 8,789,034 B1 | 7/2014 | Emelyanov et al. |
| 8,799,119 B1 | 8/2014 | Havemose |
| 8,805,788 B2 | 8/2014 | Gross, IV et al. |
| 8,806,266 B1 | 8/2014 | Qu et al. |
| 8,818,886 B1 | 8/2014 | Havemose |
| 8,825,830 B2 | 9/2014 | Newton et al. |
| 8,826,070 B1 | 9/2014 | Havemose et al. |
| 8,826,273 B1 | 9/2014 | Chen |
| 8,832,682 B2 | 9/2014 | Xu et al. |
| 8,839,426 B1 | 9/2014 | Brueckner et al. |
| 8,843,643 B2 | 9/2014 | Larson et al. |
| 8,850,009 B2 | 9/2014 | Larson et al. |
| 8,850,583 B1 | 9/2014 | Nelson et al. |
| 8,856,473 B2 | 10/2014 | van Riel |
| 8,856,767 B2 | 10/2014 | Jalan et al. |
| 8,862,538 B2 | 10/2014 | Patil et al. |
| 8,862,861 B2 | 10/2014 | Olson et al. |
| 8,868,506 B1 | 10/2014 | Bhargava et al. |
| 8,868,705 B2 | 10/2014 | Larson et al. |
| 8,869,139 B2 | 10/2014 | Le et al. |
| 8,875,160 B2 | 10/2014 | Hunt et al. |
| 8,880,473 B1 | 11/2014 | Havemose et al. |
| 8,880,866 B2 | 11/2014 | Doerr et al. |
| 8,881,171 B1 | 11/2014 | Backensto et al. |
| 8,893,129 B1 | 11/2014 | Havemose |
| 8,893,147 B2 | 11/2014 | Yin et al. |
| 8,902,340 B2 | 12/2014 | Silverbrook |
| 8,903,705 B2 | 12/2014 | Douceur et al. |
| 8,904,189 B1 | 12/2014 | Ghose |
| 8,904,516 B2 | 12/2014 | Larson et al. |
| 8,908,051 B2 | 12/2014 | Silverbrook |
| 8,908,069 B2 | 12/2014 | Silverbrook |
| 8,913,137 B2 | 12/2014 | Silverbrook |
| 8,918,879 B1 | 12/2014 | Li et al. |
| 8,922,791 B2 | 12/2014 | Silverbrook |
| 8,928,897 B2 | 1/2015 | Silverbrook |
| 8,930,705 B1 | 1/2015 | Ghose et al. |
| 8,936,196 B2 | 1/2015 | Silverbrook et al. |
| 8,937,727 B2 | 1/2015 | Silverbrook |
| 8,943,201 B2 | 1/2015 | Larson et al. |
| 8,943,501 B1 | 1/2015 | Havemose |
| 8,945,605 B2 | 2/2015 | Boucher et al. |
| 8,947,592 B2 | 2/2015 | Silverbrook |
| 8,947,679 B2 | 2/2015 | Silverbrook |
| 8,949,585 B2 | 2/2015 | Hiltgen et al. |
| 8,953,178 B2 | 2/2015 | Silverbrook |
| 8,955,111 B2 | 2/2015 | Glew et al. |
| 8,966,312 B1 | 2/2015 | Gupta et al. |
| 8,966,315 B2 | 2/2015 | Burn et al. |
| 8,977,736 B2 | 3/2015 | Nelson |
| 8,996,912 B1 | 3/2015 | Havemose et al. |
| 9,003,229 B1 | 4/2015 | Havemose |
| 9,009,212 B2 | 4/2015 | Sankararaman |
| 9,026,849 B2 | 5/2015 | Patterson et al. |
| 9,027,003 B2 | 5/2015 | Weissman et al. |
| 9,027,022 B2 | 5/2015 | Huetter et al. |
| 9,027,115 B2 | 5/2015 | Larson et al. |
| 9,032,170 B2 | 5/2015 | Vaghani et al. |
| 9,032,249 B1 | 5/2015 | Havemose |
| 9,037,713 B2 | 5/2015 | Larson et al. |
| 9,037,883 B2 | 5/2015 | Huang et al. |
| 9,038,163 B2 | 5/2015 | Larson et al. |
| 9,043,640 B1 | 5/2015 | Havemose |
| 9,047,178 B2 | 6/2015 | Talagala et al. |
| 9,058,599 B1 | 6/2015 | Havemose |
| 9,058,600 B1 | 6/2015 | Havemose |
| 9,063,721 B2 | 6/2015 | Ghose |
| 9,063,821 B1 | 6/2015 | Emelyanov et al. |
| 9,064,099 B2 | 6/2015 | Horning et al. |
| 9,065,706 B2 | 6/2015 | Koinuma et al. |
| 9,069,782 B2 | 6/2015 | Yang et al. |
| 9,071,526 B2 | 6/2015 | Avdanin et al. |
| 9,077,694 B2 | 7/2015 | Larson et al. |
| 9,077,695 B2 | 7/2015 | Larson et al. |
| 9,081,602 B1 | 7/2015 | Omelyanchuk et al. |
| 9,086,969 B2 | 7/2015 | Bekiroglu et al. |
| 9,092,837 B2 | 7/2015 | Bala et al. |
| 9,094,399 B2 | 7/2015 | Larson et al. |
| 9,094,449 B2 | 7/2015 | Brueckner et al. |
| 9,098,347 B2 | 8/2015 | Hiltgen et al. |
| 9,098,700 B2 | 8/2015 | Sethumadhavan et al. |
| 9,100,371 B2 | 8/2015 | Bagepalli et al. |
| 9,100,375 B2 | 8/2015 | Larson et al. |
| 9,104,624 B2 | 8/2015 | Timashev et al. |
| 9,110,722 B2 | 8/2015 | Adams et al. |
| 9,116,812 B2 | 8/2015 | Joshi et al. |
| 9,116,847 B2 | 8/2015 | Liu et al. |
| 9,117,087 B2 | 8/2015 | Tan et al. |
| 9,122,765 B1 | 9/2015 | Chen |
| 9,122,873 B2 | 9/2015 | Ghose |
| 9,135,063 B1 | 9/2015 | Ghose |
| 9,135,667 B2 | 9/2015 | Drees et al. |
| 9,137,397 B2 | 9/2015 | Silverbrook |
| 9,141,502 B2 | 9/2015 | Havemose |
| 9,141,786 B2 | 9/2015 | Edery et al. |
| 9,146,764 B1 | 9/2015 | Wagner |
| 9,146,819 B2 | 9/2015 | Banikazemi et al. |
| 9,148,530 B2 | 9/2015 | Silverbrook |
| 9,152,508 B1 | 10/2015 | Barnes et al. |
| 9,152,610 B2 | 10/2015 | Drees et al. |

(56) References Cited

U.S. PATENT DOCUMENTS

| | | |
|---|---|---|
| 9,154,433 B2 | 10/2015 | Koponen et al. |
| 9,158,626 B1 | 10/2015 | Havemose et al. |
| 9,158,810 B2 | 10/2015 | Aingaran et al. |
| 9,164,566 B2 | 10/2015 | Ghose |
| 9,164,843 B1 | 10/2015 | Havemose |
| 9,164,847 B1 | 10/2015 | Havemose et al. |
| 9,178,833 B2 | 11/2015 | Koponen et al. |
| 9,179,020 B2 | 11/2015 | Silverbrook |
| 9,183,089 B1 | 11/2015 | Havemose |
| 9,185,125 B2 | 11/2015 | Varsanyi et al. |
| 9,185,246 B2 | 11/2015 | Silverbrook |
| 9,189,233 B2 | 11/2015 | Sasanka et al. |
| 9,189,265 B2 | 11/2015 | Hiltgen et al. |
| 9,189,621 B2 | 11/2015 | Touboul |
| 9,195,519 B2 | 11/2015 | Tan et al. |
| 9,201,737 B1 | 12/2015 | Backensto et al. |
| 9,207,934 B2 | 12/2015 | Larimore et al. |
| 9,208,030 B1 | 12/2015 | Mooring et al. |
| 9,218,278 B2 | 12/2015 | Talagala et al. |
| 9,219,747 B2 | 12/2015 | Amoroso et al. |
| 9,219,755 B2 | 12/2015 | Touboul |
| 9,219,832 B2 | 12/2015 | Silverbrook |
| 9,223,967 B2 | 12/2015 | Ghose |
| 9,229,758 B2 | 1/2016 | Ammons et al. |
| 9,230,122 B2 | 1/2016 | Ghose |
| 9,231,882 B2 | 1/2016 | Fulton et al. |
| 9,237,244 B2 | 1/2016 | Silverbrook |
| 9,239,765 B2 | 1/2016 | Block et al. |
| 9,246,833 B2 | 1/2016 | Koponen et al. |
| 9,251,004 B1 | 2/2016 | Havemose |
| 9,251,098 B2 | 2/2016 | Haid et al. |
| 9,253,109 B2 | 2/2016 | Koponen et al. |
| 9,256,496 B1 | 2/2016 | Havemose |
| 9,262,194 B2 | 2/2016 | Sudhakar |
| 9,268,602 B2 | 2/2016 | Prahlad et al. |
| 9,268,702 B2 | 2/2016 | Bilas et al. |
| 9,280,393 B2 | 3/2016 | Bird et al. |
| 9,282,166 B2 | 3/2016 | Markley et al. |
| 9,286,109 B1 | 3/2016 | Backensto et al. |
| 9,286,703 B2 | 3/2016 | Brumer et al. |
| 9,292,330 B2 | 3/2016 | Bonilla et al. |
| 9,294,282 B1 | 3/2016 | Potlapally et al. |
| 9,304,869 B1 | 4/2016 | Backensto et al. |
| 9,311,140 B2 | 4/2016 | Raghu et al. |
| 9,311,313 B2 | 4/2016 | Le et al. |
| 9,317,315 B2 | 4/2016 | Mehta |
| 9,317,326 B2 | 4/2016 | Ramanathan et al. |
| 9,323,550 B2 | 4/2016 | Lim et al. |
| 9,323,556 B2 | 4/2016 | Wagner |
| 9,323,623 B1 | 4/2016 | Havemose |
| 9,323,921 B2 | 4/2016 | Hunt et al. |
| 9,329,894 B2 | 5/2016 | Raghu |
| 9,336,040 B2 | 5/2016 | Dong et al. |
| 9,336,099 B1 | 5/2016 | Havemose |
| 9,348,652 B2 | 5/2016 | Raghu |
| 9,354,921 B2 | 5/2016 | Nelson |
| 9,354,927 B2 | 5/2016 | Hiltgen et al. |
| 9,354,977 B1 | 5/2016 | Backensto et al. |
| 9,355,161 B1 | 5/2016 | Havemose |
| 9,356,962 B2 | 5/2016 | Ilieva et al. |
| 9,372,732 B2 | 6/2016 | Adams et al. |
| 9,374,346 B2 | 6/2016 | Larson et al. |
| 9,378,059 B2 | 6/2016 | Huetter et al. |
| 9,384,347 B1 | 7/2016 | Havemose |
| 9,386,000 B2 | 7/2016 | Larson et al. |
| 9,389,893 B2 | 7/2016 | Raghu |
| 9,389,933 B2 | 7/2016 | Baumann et al. |
| 9,389,959 B1 | 7/2016 | Backensto et al. |
| 9,391,801 B2 | 7/2016 | Raghu |
| 2002/0002706 A1 | 1/2002 | Sprunk |
| 2002/0003884 A1 | 1/2002 | Sprunk |
| 2002/0019844 A1 | 2/2002 | Kurowski et al. |
| 2002/0030712 A1 | 3/2002 | Silverbrook |
| 2002/0030713 A1 | 3/2002 | Silverbrook |
| 2002/0032903 A1 | 3/2002 | Sprunk |
| 2002/0033854 A1 | 3/2002 | Silverbrook |
| 2002/0065776 A1 | 5/2002 | Calder et al. |
| 2002/0065869 A1 | 5/2002 | Calder et al. |
| 2002/0065874 A1 | 5/2002 | Chien et al. |
| 2002/0065876 A1 | 5/2002 | Chien et al. |
| 2002/0065912 A1 | 5/2002 | Catchpole et al. |
| 2002/0065945 A1 | 5/2002 | Calder et al. |
| 2002/0066021 A1 | 5/2002 | Chien et al. |
| 2002/0066022 A1 | 5/2002 | Calder et al. |
| 2002/0069369 A1 | 6/2002 | Tremain |
| 2002/0071104 A1 | 6/2002 | Silverbrook |
| 2002/0073101 A1 | 6/2002 | Stoyen |
| 2002/0073283 A1 | 6/2002 | Lewis et al. |
| 2002/0080335 A1 | 6/2002 | Silverbrook |
| 2002/0092003 A1 | 7/2002 | Calder et al. |
| 2002/0092015 A1 | 7/2002 | Sprunk et al. |
| 2002/0093980 A1 | 7/2002 | Trebes |
| 2002/0094084 A1 | 7/2002 | Wasilewski et al. |
| 2002/0095665 A1 | 7/2002 | Chaudhry et al. |
| 2002/0147969 A1 | 10/2002 | Lethin et al. |
| 2002/0161884 A1 | 10/2002 | Munger et al. |
| 2002/0161925 A1 | 10/2002 | Munger et al. |
| 2002/0188653 A1 | 12/2002 | Sun |
| 2002/0194388 A1 | 12/2002 | Boloker et al. |
| 2003/0005102 A1 | 1/2003 | Russell |
| 2003/0018826 A1 | 1/2003 | Chaudhry et al. |
| 2003/0028861 A1 | 2/2003 | Wallman et al. |
| 2003/0037142 A1 | 2/2003 | Munger et al. |
| 2003/0058277 A1 | 3/2003 | Bowman-Amuah |
| 2003/0068185 A1 | 4/2003 | Silverbrook |
| 2003/0079116 A1 | 4/2003 | Chaudlhry et al. |
| 2003/0092972 A1 | 5/2003 | Mantilla et al. |
| 2003/0097278 A1 | 5/2003 | Mantilla et al. |
| 2003/0112419 A1 | 6/2003 | Silverbrook |
| 2003/0117496 A1 | 6/2003 | Silverbrook |
| 2003/0149962 A1 | 8/2003 | Willis et al. |
| 2003/0154061 A1 | 8/2003 | Willis |
| 2003/0154284 A1 | 8/2003 | Bernardin et al. |
| 2003/0158960 A1 | 8/2003 | Engberg |
| 2003/0167307 A1 | 9/2003 | Filepp et al. |
| 2003/0167342 A1 | 9/2003 | Munger et al. |
| 2003/0167421 A1 | 9/2003 | Klemm |
| 2003/0182572 A1 | 9/2003 | Cowan et al. |
| 2003/0187911 A1 | 10/2003 | Abd-El-Malek et al. |
| 2003/0188141 A1 | 10/2003 | Chaudhry et al. |
| 2003/0191795 A1 | 10/2003 | Bernardin et al. |
| 2003/0208500 A1 | 11/2003 | Daynes et al. |
| 2003/0208673 A1 | 11/2003 | Chaudhry et al. |
| 2003/0212987 A1 | 11/2003 | Demuth et al. |
| 2003/0229900 A1 | 12/2003 | Reisman |
| 2004/0004129 A1 | 1/2004 | Silverbrook |
| 2004/0004651 A1 | 1/2004 | Silverbrook |
| 2004/0004698 A1 | 1/2004 | Silverbrook et al. |
| 2004/0007121 A1 | 1/2004 | Graves et al. |
| 2004/0008261 A1 | 1/2004 | Silverbrook |
| 2004/0008262 A1 | 1/2004 | Silverbrook et al. |
| 2004/0008327 A1 | 1/2004 | Silverbrook |
| 2004/0010545 A1 | 1/2004 | Pandya |
| 2004/0010612 A1 | 1/2004 | Pandya |
| 2004/0015627 A1 | 1/2004 | Desoli et al. |
| 2004/0030739 A1 | 2/2004 | Yousefi'zadeh |
| 2004/0030757 A1 | 2/2004 | Pandya |
| 2004/0030770 A1 | 2/2004 | Pandya |
| 2004/0030806 A1 | 2/2004 | Pandya |
| 2004/0031058 A1 | 2/2004 | Reisman |
| 2004/0037299 A1 | 2/2004 | Pandya |
| 2004/0037319 A1 | 2/2004 | Pandya |
| 2004/0041018 A1 | 3/2004 | Silverbrook et al. |
| 2004/0051753 A1 | 3/2004 | Silverbrook |
| 2004/0055004 A1 | 3/2004 | Sun et al. |
| 2004/0056105 A1 | 3/2004 | Silverbrook et al. |
| 2004/0061734 A1 | 4/2004 | Silverbrook |
| 2004/0064351 A1 | 4/2004 | Mikurak |
| 2004/0065738 A1 | 4/2004 | Silverbrook et al. |
| 2004/0075747 A1 | 4/2004 | Silverbrook |
| 2004/0075821 A1 | 4/2004 | Silverbrook |
| 2004/0080620 A1 | 4/2004 | Silverbrook |
| 2004/0088347 A1 | 5/2004 | Yeager et al. |
| 2004/0088348 A1 | 5/2004 | Yeager et al. |

(56) References Cited

U.S. PATENT DOCUMENTS

| | | |
|---|---|---|
| 2004/0088369 A1 | 5/2004 | Yeager et al. |
| 2004/0088646 A1 | 5/2004 | Yeager et al. |
| 2004/0090553 A1 | 5/2004 | Silverbrook |
| 2004/0098154 A1 | 5/2004 | McCarthy |
| 2004/0098447 A1 | 5/2004 | Verbeke et al. |
| 2004/0098485 A1 | 5/2004 | Larson et al. |
| 2004/0103205 A1 | 5/2004 | Larson et al. |
| 2004/0107025 A1 | 6/2004 | Ransom et al. |
| 2004/0107285 A1 | 6/2004 | Larson et al. |
| 2004/0107286 A1 | 6/2004 | Larson et al. |
| 2004/0119827 A1 | 6/2004 | Silverbrook et al. |
| 2004/0125209 A1 | 7/2004 | Silverbrook et al. |
| 2004/0125212 A1 | 7/2004 | Silverbrook et al. |
| 2004/0128670 A1 | 7/2004 | Robinson et al. |
| 2004/0129789 A1 | 7/2004 | Silverbrook et al. |
| 2004/0133640 A1 | 7/2004 | Yeager et al. |
| 2004/0138787 A1 | 7/2004 | Ransom et al. |
| 2004/0141061 A1 | 7/2004 | Silverbrook |
| 2004/0143710 A1 | 7/2004 | Walmsley |
| 2004/0148307 A1 | 7/2004 | Rempell |
| 2004/0153558 A1 | 8/2004 | Gunduc et al. |
| 2004/0158549 A1 | 8/2004 | Matena et al. |
| 2004/0162951 A1 | 8/2004 | Jacobson et al. |
| 2004/0162989 A1 | 8/2004 | Kirovski |
| 2004/0165588 A1 | 8/2004 | Pandya |
| 2004/0168030 A1 | 8/2004 | Traversat et al. |
| 2004/0172626 A1 | 9/2004 | Jalan et al. |
| 2004/0174570 A1 | 9/2004 | Plunkett et al. |
| 2004/0179072 A1 | 9/2004 | Silverbrook |
| 2004/0181303 A1 | 9/2004 | Walmsley |
| 2004/0183843 A1 | 9/2004 | Walmsley et al. |
| 2004/0183914 A1 | 9/2004 | Silverbrook |
| 2004/0187115 A1 | 9/2004 | Tremblay et al. |
| 2004/0187116 A1 | 9/2004 | Tremblay et al. |
| 2004/0187123 A1 | 9/2004 | Tremblay et al. |
| 2004/0189355 A1 | 9/2004 | Walmsley |
| 2004/0189731 A1 | 9/2004 | Robert Walmsley et al. |
| 2004/0193880 A1 | 9/2004 | Walmsley |
| 2004/0196320 A1 | 10/2004 | Walmsley et al. |
| 2004/0196513 A1 | 10/2004 | Silverbrook |
| 2004/0199786 A1 | 10/2004 | Walmsley et al. |
| 2004/0201647 A1 | 10/2004 | Jackson Pulver et al. |
| 2004/0201939 A1 | 10/2004 | Shipton et al. |
| 2004/0205377 A1 | 10/2004 | Nakamura et al. |
| 2004/0205414 A1 | 10/2004 | Roselli et al. |
| 2004/0210320 A1 | 10/2004 | Pandya |
| 2004/0212652 A1 | 10/2004 | Silverbrook |
| 2004/0213482 A1 | 10/2004 | Silverbrook |
| 2004/0213613 A1 | 10/2004 | Silverbrook |
| 2004/0218048 A1 | 11/2004 | Silverbrook |
| 2004/0218049 A1 | 11/2004 | Silverbrook |
| 2004/0218934 A1 | 11/2004 | Silverbrook |
| 2004/0221194 A1 | 11/2004 | Denninghoff et al. |
| 2004/0221287 A1 | 11/2004 | Walmsley |
| 2004/0223010 A1 | 11/2004 | Plunkett |
| 2004/0225881 A1 | 11/2004 | Walmsley et al. |
| 2004/0227205 A1 | 11/2004 | Walmsley |
| 2004/0230960 A1 | 11/2004 | Nair et al. |
| 2004/0243978 A1 | 12/2004 | Walmsley |
| 2004/0243986 A1 | 12/2004 | Nishiyama |
| 2004/0246503 A1 | 12/2004 | Silverbrook |
| 2004/0249757 A1 | 12/2004 | Walmsley et al. |
| 2004/0254648 A1 | 12/2004 | Johnson et al. |
| 2004/0254962 A1 | 12/2004 | Kodama et al. |
| 2004/0254964 A1 | 12/2004 | Kodama et al. |
| 2004/0267691 A1 | 12/2004 | Vasudeva |
| 2005/0005200 A1 | 1/2005 | Matena et al. |
| 2005/0015781 A1 | 1/2005 | Brown et al. |
| 2005/0027870 A1 | 2/2005 | Trebes |
| 2005/0050545 A1 | 3/2005 | Moakley |
| 2005/0055399 A1 | 3/2005 | Savchuk |
| 2005/0055588 A1 | 3/2005 | Nalawadi et al. |
| 2005/0064849 A1 | 3/2005 | Coppinger et al. |
| 2005/0064857 A1 | 3/2005 | Coppinger et al. |
| 2005/0064868 A1 | 3/2005 | Coppinger et al. |
| 2005/0076331 A1 | 4/2005 | Das et al. |
| 2005/0086211 A1 | 4/2005 | Mayer |
| 2005/0086451 A1 | 4/2005 | Yates, Jr. et al. |
| 2005/0086520 A1 | 4/2005 | Dharmapurikar et al. |
| 2005/0086650 A1 | 4/2005 | Yates, Jr. et al. |
| 2005/0090258 A1 | 4/2005 | Coppinger et al. |
| 2005/0091545 A1 | 4/2005 | Soppera |
| 2005/0092849 A1 | 5/2005 | Silverbrook |
| 2005/0093909 A1 | 5/2005 | Silverbrook |
| 2005/0094166 A1 | 5/2005 | Silverbrook |
| 2005/0099445 A1 | 5/2005 | Silverbrook |
| 2005/0108518 A1 | 5/2005 | Pandya |
| 2005/0113092 A1 | 5/2005 | Coppinger et al. |
| 2005/0122399 A1 | 6/2005 | Silverbrook et al. |
| 2005/0125513 A1 | 6/2005 | Sin-Ling Lam et al. |
| 2005/0127181 A1 | 6/2005 | Silverbrook |
| 2005/0145701 A1 | 7/2005 | Silverbrook et al. |
| 2005/0146583 A1 | 7/2005 | Silverbrook |
| 2005/0146613 A1 | 7/2005 | Silverbrook et al. |
| 2005/0146614 A1 | 7/2005 | Silverbrook |
| 2005/0151777 A1 | 7/2005 | Silverbrook |
| 2005/0151819 A1 | 7/2005 | Silverbrook |
| 2005/0152596 A1 | 7/2005 | Walmsley |
| 2005/0156736 A1 | 7/2005 | Rajapakse et al. |
| 2005/0158043 A1 | 7/2005 | Silverbrook |
| 2005/0160316 A1 | 7/2005 | Shipton |
| 2005/0160423 A1 | 7/2005 | Bantz et al. |
| 2005/0162455 A1 | 7/2005 | Silverbrook |
| 2005/0162456 A1 | 7/2005 | Silverbrook |
| 2005/0166040 A1 | 7/2005 | Walmsley |
| 2005/0172018 A1 | 8/2005 | Devine et al. |
| 2005/0177633 A1 | 8/2005 | Plunkett |
| 2005/0177635 A1 | 8/2005 | Schmidt et al. |
| 2005/0179781 A1 | 8/2005 | Silverbrook |
| 2005/0182985 A1 | 8/2005 | Shipton et al. |
| 2005/0183072 A1 | 8/2005 | Horning et al. |
| 2005/0185198 A1 | 8/2005 | Silverbrook |
| 2005/0185461 A1 | 8/2005 | Silverbrook et al. |
| 2005/0188218 A1 | 8/2005 | Walmsley et al. |
| 2005/0193269 A1 | 9/2005 | Haswell et al. |
| 2005/0198303 A1 | 9/2005 | Knauerhase et al. |
| 2005/0204348 A1 | 9/2005 | Horning et al. |
| 2005/0209930 A1 | 9/2005 | Coppinger et al. |
| 2005/0210179 A1 | 9/2005 | Walmsley et al. |
| 2005/0210275 A1 | 9/2005 | Homing et al. |
| 2005/0213761 A1 | 9/2005 | Walmsley et al. |
| 2005/0218236 A1 | 10/2005 | Silverbrook et al. |
| 2005/0222931 A1 | 10/2005 | Mamou et al. |
| 2005/0223109 A1 | 10/2005 | Mamou et al. |
| 2005/0228808 A1 | 10/2005 | Mamou et al. |
| 2005/0232046 A1 | 10/2005 | Mamou et al. |
| 2005/0234969 A1 | 10/2005 | Mamou et al. |
| 2005/0235274 A1 | 10/2005 | Mamou et al. |
| 2005/0240354 A1 | 10/2005 | Mamou et al. |
| 2005/0240592 A1 | 10/2005 | Mamou et al. |
| 2005/0246708 A1 | 11/2005 | Turner et al. |
| 2005/0247793 A1 | 11/2005 | Silverbrook et al. |
| 2005/0251803 A1 | 11/2005 | Turner et al. |
| 2005/0256843 A1 | 11/2005 | Santos et al. |
| 2005/0257080 A1 | 11/2005 | Santos et al. |
| 2005/0257090 A1 | 11/2005 | Santos et al. |
| 2005/0258248 A1 | 11/2005 | Silverbrook et al. |
| 2005/0262188 A1 | 11/2005 | Mamou et al. |
| 2005/0262189 A1 | 11/2005 | Mamou et al. |
| 2005/0262190 A1 | 11/2005 | Mamou et al. |
| 2005/0262191 A1 | 11/2005 | Mamou et al. |
| 2005/0262192 A1 | 11/2005 | Mamou et al. |
| 2005/0262193 A1 | 11/2005 | Mamou et al. |
| 2005/0262194 A1 | 11/2005 | Mamou et al. |
| 2005/0262301 A1 | 11/2005 | Jacobson et al. |
| 2005/0268071 A1 | 12/2005 | Blandy et al. |
| 2005/0268290 A1 | 12/2005 | Cognigni et al. |
| 2005/0275815 A1 | 12/2005 | Silverbrook |
| 2005/0283644 A1 | 12/2005 | Lorch et al. |
| 2005/0283659 A1 | 12/2005 | Lamport et al. |
| 2005/0289246 A1 | 12/2005 | Easton et al. |
| 2006/0007261 A1 | 1/2006 | Silverbrook |
| 2006/0010195 A1 | 1/2006 | Mamou et al. |
| 2006/0012652 A1 | 1/2006 | Silverbrook |

(56) References Cited

U.S. PATENT DOCUMENTS

| | | |
|---|---|---|
| 2006/0015749 A1 | 1/2006 | Mittal |
| 2006/0020790 A1 | 1/2006 | Sprunk |
| 2006/0021029 A1 | 1/2006 | Brickell et al. |
| 2006/0028516 A1 | 2/2006 | Silverbrook |
| 2006/0036426 A1 | 2/2006 | Barr et al. |
| 2006/0040667 A9 | 2/2006 | Coppinger et al. |
| 2006/0041786 A1 | 2/2006 | Janakiraman et al. |
| 2006/0050286 A1 | 3/2006 | Silverbrook et al. |
| 2006/0052962 A1 | 3/2006 | Shipton et al. |
| 2006/0053439 A1 | 3/2006 | Sprunk |
| 2006/0055782 A1 | 3/2006 | Silverbrook et al. |
| 2006/0056728 A1 | 3/2006 | Silverbrook et al. |
| 2006/0059253 A1 | 3/2006 | Goodman et al. |
| 2006/0061795 A1 | 3/2006 | Walmsley |
| 2006/0067592 A1 | 3/2006 | Walmsley et al. |
| 2006/0069717 A1 | 3/2006 | Mamou et al. |
| 2006/0071951 A1 | 4/2006 | Walmsley et al. |
| 2006/0071981 A1 | 4/2006 | Plunkett |
| 2006/0072030 A1 | 4/2006 | Silverbrook |
| 2006/0072952 A1 | 4/2006 | Walmsley et al. |
| 2006/0074994 A1 | 4/2006 | Smits |
| 2006/0076423 A1 | 4/2006 | Silverbrook et al. |
| 2006/0077248 A1 | 4/2006 | Silverbrook |
| 2006/0082609 A1 | 4/2006 | Walmsley et al. |
| 2006/0087525 A1 | 4/2006 | Jackson Pulver et al. |
| 2006/0092205 A1 | 5/2006 | Jackson Pulver et al. |
| 2006/0092222 A1 | 5/2006 | Jackson Pulver et al. |
| 2006/0095276 A1 | 5/2006 | Axelrod et al. |
| 2006/0098042 A1 | 5/2006 | Silverbrook et al. |
| 2006/0098044 A1 | 5/2006 | Jackson Pulver et al. |
| 2006/0110011 A1 | 5/2006 | Cohen et al. |
| 2006/0110199 A1 | 5/2006 | Walmsley et al. |
| 2006/0112278 A1 | 5/2006 | Cohen et al. |
| 2006/0112279 A1 | 5/2006 | Cohen et al. |
| 2006/0112280 A1 | 5/2006 | Cohen et al. |
| 2006/0122939 A1 | 6/2006 | Cohen et al. |
| 2006/0123010 A1 | 6/2006 | Landry et al. |
| 2006/0125854 A1 | 6/2006 | Jackson Pulver et al. |
| 2006/0125855 A1 | 6/2006 | Silverbrook et al. |
| 2006/0125857 A1 | 6/2006 | Silverbrook et al. |
| 2006/0125858 A1 | 6/2006 | Silverbrook et al. |
| 2006/0125859 A1 | 6/2006 | Walmsley et al. |
| 2006/0125861 A1 | 6/2006 | Silverbrook et al. |
| 2006/0125863 A1 | 6/2006 | Silverbrook et al. |
| 2006/0125876 A1 | 6/2006 | Walmsley et al. |
| 2006/0129806 A1 | 6/2006 | Walmsley |
| 2006/0132512 A1 | 6/2006 | Walmsley et al. |
| 2006/0132516 A1 | 6/2006 | Walmsley et al. |
| 2006/0132518 A1 | 6/2006 | Jackson Pulver et al. |
| 2006/0132521 A1 | 6/2006 | Walmsley et al. |
| 2006/0132525 A1 | 6/2006 | Walmsley et al. |
| 2006/0132822 A1 | 6/2006 | Walmsley |
| 2006/0136570 A1 | 6/2006 | Pandya |
| 2006/0136720 A1 | 6/2006 | Armstrong et al. |
| 2006/0136725 A1 | 6/2006 | Walmsley |
| 2006/0136781 A1 | 6/2006 | Lamport |
| 2006/0139380 A1 | 6/2006 | Walmsley et al. |
| 2006/0139386 A1 | 6/2006 | Silverbrook et al. |
| 2006/0139387 A1 | 6/2006 | Silverbrook et al. |
| 2006/0139388 A1 | 6/2006 | Silverbrook et al. |
| 2006/0139681 A1 | 6/2006 | Walmsley |
| 2006/0143350 A1 | 6/2006 | Miloushev et al. |
| 2006/0143454 A1 | 6/2006 | Walmsley |
| 2006/0143517 A1 | 6/2006 | Douceur et al. |
| 2006/0146101 A1 | 7/2006 | Silverbrook |
| 2006/0149945 A1 | 7/2006 | Chaudhry et al. |
| 2006/0149946 A1 | 7/2006 | Chaudhry et al. |
| 2006/0155930 A1 | 7/2006 | Birrell et al. |
| 2006/0155931 A1 | 7/2006 | Birrell et al. |
| 2006/0158519 A1 | 7/2006 | Silverbrook |
| 2006/0164451 A1 | 7/2006 | Pulver et al. |
| 2006/0164452 A1 | 7/2006 | Walmsley et al. |
| 2006/0164453 A1 | 7/2006 | Silverbrook et al. |
| 2006/0164454 A1 | 7/2006 | Walmsley et al. |
| 2006/0164455 A1 | 7/2006 | Silverbrook et al. |
| 2006/0164462 A1 | 7/2006 | Silverbrook et al. |
| 2006/0178918 A1 | 8/2006 | Mikurak |
| 2006/0181558 A1 | 8/2006 | Walmsley et al. |
| 2006/0184935 A1 | 8/2006 | Abels et al. |
| 2006/0184936 A1 | 8/2006 | Abels et al. |
| 2006/0184937 A1 | 8/2006 | Abels et al. |
| 2006/0187251 A1 | 8/2006 | Pulver et al. |
| 2006/0195508 A1 | 8/2006 | Bernardin et al. |
| 2006/0200632 A1 | 9/2006 | Tremblay et al. |
| 2006/0212146 A1 | 9/2006 | Johnson et al. |
| 2006/0212750 A1 | 9/2006 | Denninghoff et al. |
| 2006/0214012 A1 | 9/2006 | Silverbrook et al. |
| 2006/0218563 A1 | 9/2006 | Grinstein et al. |
| 2006/0225065 A1 | 10/2006 | Chandhok et al. |
| 2006/0230216 A1 | 10/2006 | Fuente |
| 2006/0230407 A1 | 10/2006 | Rosu et al. |
| 2006/0231627 A1 | 10/2006 | Silverbrook et al. |
| 2006/0233367 A1 | 10/2006 | Birrell et al. |
| 2006/0241921 A1 | 10/2006 | Willis |
| 2006/0256944 A1 | 11/2006 | Silverbrook |
| 2006/0259818 A1 | 11/2006 | Howell et al. |
| 2006/0265508 A1 | 11/2006 | Angel et al. |
| 2006/0274112 A1 | 12/2006 | Jackson Pulver et al. |
| 2006/0274114 A1 | 12/2006 | Silverbrook et al. |
| 2006/0282681 A1 | 12/2006 | Scheidt et al. |
| 2006/0294312 A1 | 12/2006 | Walmsley |
| 2007/0005919 A1 | 1/2007 | van Riel |
| 2007/0006150 A9 | 1/2007 | Walmsley |
| 2007/0011023 A1 | 1/2007 | Silverbrook |
| 2007/0011650 A1 | 1/2007 | Hage et al. |
| 2007/0019016 A1 | 1/2007 | Silverbrook et al. |
| 2007/0035566 A1 | 2/2007 | Silverbrook |
| 2007/0040856 A1 | 2/2007 | Silverbrook |
| 2007/0046955 A1 | 3/2007 | Silverbrook |
| 2007/0050367 A1 | 3/2007 | Suganuma et al. |
| 2007/0050686 A1 | 3/2007 | Keeton et al. |
| 2007/0055753 A1 | 3/2007 | Robb |
| 2007/0067590 A1 | 3/2007 | Savagaonkar et al. |
| 2007/0067630 A1 | 3/2007 | Lenkov et al. |
| 2007/0074258 A1 | 3/2007 | Wood et al. |
| 2007/0083491 A1 | 4/2007 | Walmsley et al. |
| 2007/0088939 A1 | 4/2007 | Baumberger et al. |
| 2007/0099683 A1 | 5/2007 | Panther Trice et al. |
| 2007/0100834 A1 | 5/2007 | Landry et al. |
| 2007/0120673 A1 | 5/2007 | Rajapakse et al. |
| 2007/0128899 A1 | 6/2007 | Mayer |
| 2007/0136579 A1 | 6/2007 | Levy et al. |
| 2007/0174750 A1 | 7/2007 | Borin |
| 2007/0174910 A1 | 7/2007 | Zachman et al. |
| 2007/0174915 A1 | 7/2007 | Gribble et al. |
| 2007/0180509 A1 | 8/2007 | Swartz et al. |
| 2007/0200890 A1 | 8/2007 | Silverbrook |
| 2007/0201845 A1 | 8/2007 | Silverbrook et al. |
| 2007/0201846 A1 | 8/2007 | Silverbrook et al. |
| 2007/0206611 A1 | 9/2007 | Shokri et al. |
| 2007/0211285 A1 | 9/2007 | Shipton |
| 2007/0226359 A1 | 9/2007 | Gunduc et al. |
| 2007/0233880 A1 | 10/2007 | Nieh et al. |
| 2007/0234070 A1 | 10/2007 | Horning et al. |
| 2007/0234302 A1 | 10/2007 | Suzuki et al. |
| 2007/0234337 A1 | 10/2007 | Suzuki et al. |
| 2007/0234342 A1 | 10/2007 | Flynn et al. |
| 2007/0234356 A1 | 10/2007 | Martins et al. |
| 2007/0239804 A1 | 10/2007 | Armstrong et al. |
| 2007/0240171 A1 | 10/2007 | Biro et al. |
| 2007/0244937 A1 | 10/2007 | Flynn et al. |
| 2007/0244962 A1 | 10/2007 | Laadan et al. |
| 2007/0245334 A1 | 10/2007 | Nieh et al. |
| 2007/0249320 A1 | 10/2007 | Coppinger et al. |
| 2007/0254638 A1 | 11/2007 | Coppinger et al. |
| 2007/0260733 A1 | 11/2007 | Havemose et al. |
| 2007/0266368 A1 | 11/2007 | Szpak et al. |
| 2007/0271445 A1 | 11/2007 | Tremblay et al. |
| 2007/0271830 A1 | 11/2007 | Holt et al. |
| 2007/0276879 A1 | 11/2007 | Rothman et al. |
| 2007/0282926 A1 | 12/2007 | Ben-Yehuda et al. |
| 2007/0282951 A1 | 12/2007 | Selimis et al. |
| 2007/0283353 A1 | 12/2007 | Tremblay et al. |
| 2007/0288247 A1 | 12/2007 | Mackay |

(56) References Cited

U.S. PATENT DOCUMENTS

| | | |
|---|---|---|
| 2008/0005792 A1 | 1/2008 | Larson et al. |
| 2008/0016249 A1 | 1/2008 | Ellis et al. |
| 2008/0022276 A1 | 1/2008 | Coppinger et al. |
| 2008/0022874 A1 | 1/2008 | Silverbrook |
| 2008/0024642 A1 | 1/2008 | Silverbrook et al. |
| 2008/0034201 A1 | 2/2008 | Munger et al. |
| 2008/0034350 A1* | 2/2008 | Conti ............... G06F 21/54 717/124 |
| 2008/0040279 A1 | 2/2008 | Coppinger et al. |
| 2008/0040477 A1 | 2/2008 | Johnson et al. |
| 2008/0040783 A1 | 2/2008 | Larson et al. |
| 2008/0040791 A1 | 2/2008 | Munger et al. |
| 2008/0040792 A1 | 2/2008 | Larson et al. |
| 2008/0046598 A1 | 2/2008 | Johnson et al. |
| 2008/0046699 A1 | 2/2008 | Pauw et al. |
| 2008/0052386 A1 | 2/2008 | Johnson et al. |
| 2008/0052695 A1 | 2/2008 | Dickenson et al. |
| 2008/0059214 A1 | 3/2008 | Vinberg et al. |
| 2008/0060077 A1 | 3/2008 | Cowan et al. |
| 2008/0062232 A1 | 3/2008 | Silverbrook |
| 2008/0085107 A1 | 4/2008 | Silverbrook |
| 2008/0087736 A1 | 4/2008 | Silverbrook |
| 2008/0104531 A1 | 5/2008 | Stambaugh |
| 2008/0104532 A1 | 5/2008 | Stambaugh |
| 2008/0109756 A1 | 5/2008 | Stambaugh |
| 2008/0109757 A1 | 5/2008 | Stambaugh |
| 2008/0109758 A1 | 5/2008 | Stambaugh |
| 2008/0109759 A1 | 5/2008 | Stambaugh |
| 2008/0109760 A1 | 5/2008 | Stambaugh |
| 2008/0109761 A1 | 5/2008 | Stambaugh |
| 2008/0111818 A1 | 5/2008 | Stambaugh |
| 2008/0120350 A1 | 5/2008 | Grabowski et al. |
| 2008/0120620 A1 | 5/2008 | Lett et al. |
| 2008/0126502 A1 | 5/2008 | Holt |
| 2008/0126505 A1 | 5/2008 | Holt |
| 2008/0126506 A1 | 5/2008 | Holt |
| 2008/0129725 A1 | 6/2008 | Stambaugh |
| 2008/0133688 A1 | 6/2008 | Holt |
| 2008/0133692 A1 | 6/2008 | Holt |
| 2008/0133694 A1 | 6/2008 | Holt |
| 2008/0133869 A1 | 6/2008 | Holt |
| 2008/0134161 A1 | 6/2008 | Chamieh et al. |
| 2008/0140801 A1 | 6/2008 | Holt |
| 2008/0140982 A1 | 6/2008 | Holt |
| 2008/0141065 A1 | 6/2008 | Okabe |
| 2008/0148262 A1 | 6/2008 | Dice |
| 2008/0150963 A1 | 6/2008 | Stambaugh |
| 2008/0155169 A1 | 6/2008 | Hiltgen et al. |
| 2008/0155208 A1 | 6/2008 | Hiltgen et al. |
| 2008/0155223 A1 | 6/2008 | Hiltgen et al. |
| 2008/0162889 A1 | 7/2008 | Cascaval et al. |
| 2008/0165253 A9 | 7/2008 | Silverbrook |
| 2008/0165254 A1 | 7/2008 | Silverbrook et al. |
| 2008/0172632 A1 | 7/2008 | Stambaugh |
| 2008/0177994 A1 | 7/2008 | Mayer |
| 2008/0183882 A1 | 7/2008 | Flynn et al. |
| 2008/0184229 A1 | 7/2008 | Rosu et al. |
| 2008/0189432 A1 | 8/2008 | Abali et al. |
| 2008/0189468 A1 | 8/2008 | Schmidt et al. |
| 2008/0189700 A1 | 8/2008 | Schmidt et al. |
| 2008/0189769 A1 | 8/2008 | Casado et al. |
| 2008/0195840 A1 | 8/2008 | Archer et al. |
| 2008/0196026 A1 | 8/2008 | Azagury et al. |
| 2008/0201602 A1 | 8/2008 | Agarwal et al. |
| 2008/0215796 A1 | 9/2008 | Lam et al. |
| 2008/0215920 A1 | 9/2008 | Mayer et al. |
| 2008/0216073 A1 | 9/2008 | Yates et al. |
| 2008/0216168 A1 | 9/2008 | Larson et al. |
| 2008/0222415 A1 | 9/2008 | Munger et al. |
| 2008/0222604 A1 | 9/2008 | Murphy |
| 2008/0234998 A1 | 9/2008 | Cohen et al. |
| 2008/0234999 A1 | 9/2008 | Cohen et al. |
| 2008/0235000 A1 | 9/2008 | Cohen et al. |
| 2008/0235001 A1 | 9/2008 | Cohen et al. |
| 2008/0235002 A1 | 9/2008 | Cohen et al. |
| 2008/0235711 A1 | 9/2008 | Cohen et al. |
| 2008/0235756 A1 | 9/2008 | Cohen et al. |
| 2008/0235764 A1 | 9/2008 | Cohen et al. |
| 2008/0243935 A1 | 10/2008 | Castro et al. |
| 2008/0244535 A1 | 10/2008 | Nelson et al. |
| 2008/0244544 A1 | 10/2008 | Neelakantam et al. |
| 2008/0244747 A1 | 10/2008 | Gleichauf et al. |
| 2008/0250051 A1 | 10/2008 | Grechanik et al. |
| 2008/0250265 A1 | 10/2008 | Chang et al. |
| 2008/0253395 A1 | 10/2008 | Pandya |
| 2008/0259711 A1 | 10/2008 | Shipton et al. |
| 2008/0263114 A1 | 10/2008 | Nath et al. |
| 2008/0263658 A1 | 10/2008 | Michael et al. |
| 2008/0270199 A1 | 10/2008 | Chess et al. |
| 2008/0270838 A1 | 10/2008 | Dorai et al. |
| 2008/0288558 A1 | 11/2008 | De Pauw et al. |
| 2008/0288747 A1 | 11/2008 | Inglett et al. |
| 2008/0294937 A1 | 11/2008 | Ueda |
| 2008/0295114 A1 | 11/2008 | Argade et al. |
| 2008/0307258 A1 | 12/2008 | Challenger et al. |
| 2008/0307414 A1 | 12/2008 | Alpern et al. |
| 2008/0313345 A1 | 12/2008 | Bernardin et al. |
| 2008/0313364 A1 | 12/2008 | Flynn et al. |
| 2008/0320122 A1 | 12/2008 | Houlihan et al. |
| 2008/0320123 A1 | 12/2008 | Houlihan et al. |
| 2008/0320269 A1 | 12/2008 | Houlihan et al. |
| 2008/0320594 A1 | 12/2008 | Jiang |
| 2009/0006445 A1 | 1/2009 | Shemenzon et al. |
| 2009/0006621 A1 | 1/2009 | Ellis et al. |
| 2009/0006710 A1 | 1/2009 | Daniel et al. |
| 2009/0006888 A1 | 1/2009 | Bernhard et al. |
| 2009/0007063 A1 | 1/2009 | Szpak et al. |
| 2009/0007105 A1 | 1/2009 | Fries et al. |
| 2009/0007106 A1 | 1/2009 | Araujo, Jr. et al. |
| 2009/0007111 A1 | 1/2009 | Nelson et al. |
| 2009/0019262 A1 | 1/2009 | Tashiro et al. |
| 2009/0019538 A1 | 1/2009 | Pandya |
| 2009/0024851 A1 | 1/2009 | Andrade |
| 2009/0031307 A1 | 1/2009 | Chodroff et al. |
| 2009/0031309 A1 | 1/2009 | Lev |
| 2009/0031310 A1 | 1/2009 | Lev et al. |
| 2009/0036125 A1 | 2/2009 | Coppinger et al. |
| 2009/0037329 A1 | 2/2009 | Coppinger et al. |
| 2009/0037330 A1 | 2/2009 | Coppinger et al. |
| 2009/0037585 A1 | 2/2009 | Miloushev et al. |
| 2009/0037672 A1 | 2/2009 | Colbert et al. |
| 2009/0037680 A1 | 2/2009 | Colbert et al. |
| 2009/0042552 A1 | 2/2009 | Coppinger et al. |
| 2009/0043700 A1 | 2/2009 | Coppinger et al. |
| 2009/0044186 A1 | 2/2009 | Biro |
| 2009/0044265 A1 | 2/2009 | Ghosh et al. |
| 2009/0063665 A1 | 3/2009 | Bagepalli et al. |
| 2009/0064094 A1 | 3/2009 | Burka et al. |
| 2009/0064557 A1 | 3/2009 | Hughes et al. |
| 2009/0077329 A1 | 3/2009 | Wood et al. |
| 2009/0094603 A1 | 4/2009 | Hiltgen et al. |
| 2009/0094673 A1 | 4/2009 | Seguin et al. |
| 2009/0106256 A1 | 4/2009 | Safari et al. |
| 2009/0106424 A1 | 4/2009 | Safari et al. |
| 2009/0112616 A1 | 4/2009 | Jung et al. |
| 2009/0112617 A1 | 4/2009 | Jung et al. |
| 2009/0112620 A1 | 4/2009 | Jung et al. |
| 2009/0112621 A1 | 4/2009 | Jung et al. |
| 2009/0113109 A1 | 4/2009 | Nelson et al. |
| 2009/0113420 A1 | 4/2009 | Pawlowski |
| 2009/0113423 A1 | 4/2009 | Hiltgen et al. |
| 2009/0113528 A1 | 4/2009 | Ananda et al. |
| 2009/0118593 A1 | 5/2009 | Jung et al. |
| 2009/0119154 A1 | 5/2009 | Jung et al. |
| 2009/0119493 A1 | 5/2009 | Venkitachalam et al. |
| 2009/0119684 A1 | 5/2009 | Mahalingam et al. |
| 2009/0125904 A1 | 5/2009 | Nelson |
| 2009/0132275 A1 | 5/2009 | Jung et al. |
| 2009/0135215 A1 | 5/2009 | Silverbrook et al. |
| 2009/0135232 A1 | 5/2009 | Silverbrook et al. |
| 2009/0138945 A1 | 5/2009 | Savchuk |
| 2009/0150883 A1 | 6/2009 | Tripathi et al. |
| 2009/0150885 A1 | 6/2009 | Safari et al. |
| 2009/0157882 A1 | 6/2009 | Kashyap |

(56) References Cited

U.S. PATENT DOCUMENTS

| | | |
|---|---|---|
| 2009/0158260 A1 | 6/2009 | Moon et al. |
| 2009/0164031 A1 | 6/2009 | Johnson et al. |
| 2009/0164501 A1 | 6/2009 | de Moura et al. |
| 2009/0164848 A1 | 6/2009 | Heidasch et al. |
| 2009/0164981 A1 | 6/2009 | Heidasch et al. |
| 2009/0165139 A1 | 6/2009 | Yerazunis et al. |
| 2009/0182964 A1 | 7/2009 | Greiner et al. |
| 2009/0182966 A1 | 7/2009 | Greiner et al. |
| 2009/0182971 A1 | 7/2009 | Greiner et al. |
| 2009/0182972 A1 | 7/2009 | Greiner et al. |
| 2009/0182973 A1 | 7/2009 | Greiner et al. |
| 2009/0182974 A1 | 7/2009 | Greiner et al. |
| 2009/0182975 A1 | 7/2009 | Greiner et al. |
| 2009/0185014 A1 | 7/2009 | Silverbrook |
| 2009/0187724 A1 | 7/2009 | Greiner et al. |
| 2009/0187728 A1 | 7/2009 | Greiner et al. |
| 2009/0187732 A1 | 7/2009 | Greiner et al. |
| 2009/0193214 A1 | 7/2009 | Greiner et al. |
| 2009/0198762 A1 | 8/2009 | Arimilli et al. |
| 2009/0198949 A1 | 8/2009 | Kuligowski et al. |
| 2009/0204785 A1 | 8/2009 | Yates, Jr. et al. |
| 2009/0204964 A1 | 8/2009 | Foley et al. |
| 2009/0204966 A1 | 8/2009 | Johnson et al. |
| 2009/0207255 A1 | 8/2009 | Silverbrook |
| 2009/0208910 A1 | 8/2009 | Brueckner et al. |
| 2009/0210769 A1 | 8/2009 | Casper et al. |
| 2009/0213150 A1 | 8/2009 | Silverbrook |
| 2009/0216910 A1 | 8/2009 | Duchesneau |
| 2009/0216984 A1 | 8/2009 | Gainey, Jr. et al. |
| 2009/0217021 A1 | 8/2009 | Goodson et al. |
| 2009/0217050 A1 | 8/2009 | Amiel et al. |
| 2009/0222496 A1 | 9/2009 | Liu et al. |
| 2009/0222558 A1 | 9/2009 | Xu et al. |
| 2009/0228889 A1 | 9/2009 | Yoshida |
| 2009/0230686 A1 | 9/2009 | Catlin |
| 2009/0242636 A1 | 10/2009 | Silverbrook |
| 2009/0244215 A1 | 10/2009 | Silverbrook et al. |
| 2009/0244292 A1 | 10/2009 | Silverbrook et al. |
| 2009/0248611 A1 | 10/2009 | Xu et al. |
| 2009/0249049 A1 | 10/2009 | Weissman et al. |
| 2009/0249357 A1 | 10/2009 | Chanda et al. |
| 2009/0249488 A1 | 10/2009 | Robinson et al. |
| 2009/0251737 A1 | 10/2009 | Silverbrook |
| 2009/0257102 A1 | 10/2009 | Silverbrook |
| 2009/0259612 A1 | 10/2009 | Hanson |
| 2009/0262149 A1 | 10/2009 | Silverbrook |
| 2009/0262741 A1 | 10/2009 | Jungck et al. |
| 2009/0262929 A1 | 10/2009 | Walmsley |
| 2009/0278901 A1 | 11/2009 | Silverbrook |
| 2009/0282101 A1 | 11/2009 | Lim et al. |
| 2009/0282386 A1 | 11/2009 | Moir et al. |
| 2009/0284279 A1 | 11/2009 | Walmsley et al. |
| 2009/0288075 A1 | 11/2009 | Song et al. |
| 2009/0288084 A1 | 11/2009 | Astete et al. |
| 2009/0292858 A1 | 11/2009 | Lambeth et al. |
| 2009/0300528 A1 | 12/2009 | Stambaugh |
| 2009/0307528 A1 | 12/2009 | Byers et al. |
| 2009/0313620 A1 | 12/2009 | Sedukhin et al. |
| 2009/0316581 A1 | 12/2009 | Kashyap et al. |
| 2009/0319672 A1 | 12/2009 | Reisman |
| 2009/0319738 A1 | 12/2009 | Ben-Yehuda et al. |
| 2009/0320073 A1 | 12/2009 | Reisman |
| 2009/0327471 A1 | 12/2009 | Astete et al. |
| 2010/0005258 A1 | 1/2010 | Westenberg |
| 2010/0010968 A1 | 1/2010 | Redlich et al. |
| 2010/0011127 A1 | 1/2010 | Johnson et al. |
| 2010/0011238 A1 | 1/2010 | Nakamura et al. |
| 2010/0011243 A1 | 1/2010 | Locasto et al. |
| 2010/0011446 A1 | 1/2010 | Klucher et al. |
| 2010/0023308 A1 | 1/2010 | Willis et al. |
| 2010/0023703 A1 | 1/2010 | Christie et al. |
| 2010/0023704 A1 | 1/2010 | Christie et al. |
| 2010/0023706 A1 | 1/2010 | Christie et al. |
| 2010/0023707 A1 | 1/2010 | Hohmuth et al. |
| 2010/0030878 A1 | 2/2010 | Grabowski et al. |
| 2010/0031358 A1 | 2/2010 | Elovici et al. |
| 2010/0037096 A1 | 2/2010 | Bum et al. |
| 2010/0037206 A1 | 2/2010 | Larimore et al. |
| 2010/0037235 A1 | 2/2010 | Larimore et al. |
| 2010/0042846 A1 | 2/2010 | Trotter et al. |
| 2010/0047760 A1 | 2/2010 | Best et al. |
| 2010/0063613 A1 | 3/2010 | Popp |
| 2010/0070678 A1 | 3/2010 | Zhang et al. |
| 2010/0070935 A1 | 3/2010 | Bist et al. |
| 2010/0070940 A1 | 3/2010 | Bist et al. |
| 2010/0070978 A1 | 3/2010 | Chawla et al. |
| 2010/0071068 A1 | 3/2010 | Bauschert et al. |
| 2010/0076604 A1 | 3/2010 | Johnson et al. |
| 2010/0077160 A1 | 3/2010 | Liu et al. |
| 2010/0079600 A1 | 4/2010 | Silverbrook |
| 2010/0082922 A1 | 4/2010 | George et al. |
| 2010/0091116 A1 | 4/2010 | Silverbrook et al. |
| 2010/0094948 A1 | 4/2010 | Ganesh et al. |
| 2010/0095074 A1 | 4/2010 | Ganesh et al. |
| 2010/0095075 A1 | 4/2010 | Ganesh et al. |
| 2010/0095100 A1 | 4/2010 | Darrington et al. |
| 2010/0095152 A1 | 4/2010 | Darrington et al. |
| 2010/0103837 A1 | 4/2010 | Jungck et al. |
| 2010/0107113 A1 | 4/2010 | Innes et al. |
| 2010/0107158 A1 | 4/2010 | Chen et al. |
| 2010/0122052 A1 | 5/2010 | Waldspurger et al. |
| 2010/0122073 A1 | 5/2010 | Narayanaswamy et al. |
| 2010/0138830 A1 | 6/2010 | Astete et al. |
| 2010/0138841 A1 | 6/2010 | Dice et al. |
| 2010/0153662 A1 | 6/2010 | Vick et al. |
| 2010/0153674 A1 | 6/2010 | Park et al. |
| 2010/0153690 A1 | 6/2010 | Vick et al. |
| 2010/0153776 A1 | 6/2010 | Vick et al. |
| 2010/0154051 A1 | 6/2010 | Bauer |
| 2010/0161559 A1 | 6/2010 | Patil et al. |
| 2010/0161750 A1 | 6/2010 | Pandya |
| 2010/0162249 A1 | 6/2010 | Shpeisman et al. |
| 2010/0162250 A1 | 6/2010 | Adl-Tabatabai et al. |
| 2010/0169537 A1 | 7/2010 | Nelson |
| 2010/0169894 A1 | 7/2010 | Sheaffer et al. |
| 2010/0170951 A1 | 7/2010 | Silverbrook et al. |
| 2010/0174770 A1 | 7/2010 | Pandya |
| 2010/0174802 A1 | 7/2010 | Chan et al. |
| 2010/0180275 A1 | 7/2010 | Neogi et al. |
| 2010/0185590 A1 | 7/2010 | D'Angelo et al. |
| 2010/0192220 A1 | 7/2010 | Heizmann et al. |
| 2010/0211663 A1 | 8/2010 | Barboy et al. |
| 2010/0211681 A1 | 8/2010 | Chan et al. |
| 2010/0223499 A1 | 9/2010 | Panigrahy et al. |
| 2010/0223616 A1 | 9/2010 | De et al. |
| 2010/0235647 A1 | 9/2010 | Buer |
| 2010/0241673 A1 | 9/2010 | Wu et al. |
| 2010/0241726 A1 | 9/2010 | Wu |
| 2010/0241807 A1 | 9/2010 | Wu et al. |
| 2010/0251018 A1 | 9/2010 | Tamura |
| 2010/0251031 A1 | 9/2010 | Nieh et al. |
| 2010/0251363 A1 | 9/2010 | Todorovic |
| 2010/0268691 A1 | 10/2010 | Grinstein et al. |
| 2010/0274767 A1 | 10/2010 | Irisawa et al. |
| 2010/0274890 A1 | 10/2010 | Patel et al. |
| 2010/0280996 A1 | 11/2010 | Gross et al. |
| 2010/0281195 A1 | 11/2010 | Daniel et al. |
| 2010/0281239 A1 | 11/2010 | Sudhakar et al. |
| 2010/0287280 A1 | 11/2010 | Sivan |
| 2010/0305720 A1 | 12/2010 | Doll et al. |
| 2010/0305721 A1 | 12/2010 | Kostadinov et al. |
| 2010/0306773 A1 | 12/2010 | Lee et al. |
| 2010/0315516 A1 | 12/2010 | Silverbrook et al. |
| 2010/0318991 A1 | 12/2010 | Venkitachalam et al. |
| 2010/0322071 A1 | 12/2010 | Avdanin et al. |
| 2010/0328064 A1 | 12/2010 | Rogel |
| 2010/0330953 A1 | 12/2010 | Rogel et al. |
| 2010/0330961 A1 | 12/2010 | Rogel |
| 2010/0332630 A1 | 12/2010 | Harlow |
| 2010/0332635 A1 | 12/2010 | Rogel et al. |
| 2010/0332889 A1 | 12/2010 | Shneorson et al. |
| 2010/0333088 A1 | 12/2010 | Rogel et al. |
| 2011/0004868 A1 | 1/2011 | Bharadwaj |
| 2011/0004935 A1 | 1/2011 | Moffie et al. |

(56) References Cited

U.S. PATENT DOCUMENTS

| | | |
|---|---|---|
| 2011/0010711 A1 | 1/2011 | Patwardhan |
| 2011/0016453 A1 | 1/2011 | Grechanik et al. |
| 2011/0019647 A1 | 1/2011 | Fujino |
| 2011/0023050 A1 | 1/2011 | Strom et al. |
| 2011/0029970 A1 | 2/2011 | Arasaratnam |
| 2011/0032830 A1 | 2/2011 | Merwe et al. |
| 2011/0035358 A1 | 2/2011 | Naik |
| 2011/0035513 A1 | 2/2011 | Jevans et al. |
| 2011/0035733 A1 | 2/2011 | Horning et al. |
| 2011/0041006 A1 | 2/2011 | Fowler |
| 2011/0047376 A1 | 2/2011 | Mittal |
| 2011/0047618 A1 | 2/2011 | Evans et al. |
| 2011/0061043 A1 | 3/2011 | Rydh et al. |
| 2011/0066786 A1 | 3/2011 | Colbert |
| 2011/0067014 A1 | 3/2011 | Song et al. |
| 2011/0072430 A1 | 3/2011 | Mani |
| 2011/0074850 A1 | 3/2011 | Walmsley et al. |
| 2011/0082996 A1 | 4/2011 | Wester et al. |
| 2011/0087779 A1 | 4/2011 | Martin et al. |
| 2011/0093700 A1 | 4/2011 | Mittal |
| 2011/0096930 A1 | 4/2011 | Walmsley |
| 2011/0113208 A1 | 5/2011 | Jouppi et al. |
| 2011/0122261 A1 | 5/2011 | Silverbrook |
| 2011/0125951 A1 | 5/2011 | Youngworth |
| 2011/0131183 A1 | 6/2011 | Chandhok et al. |
| 2011/0131402 A1 | 6/2011 | Mittal |
| 2011/0153992 A1 | 6/2011 | Srinivas et al. |
| 2011/0156914 A1 | 6/2011 | Sheharri et al. |
| 2011/0161730 A1 | 6/2011 | Van Der Merwe et al. |
| 2011/0161988 A1 | 6/2011 | Kashyap |
| 2011/0162076 A1 | 6/2011 | Song et al. |
| 2011/0167087 A1 | 7/2011 | Larson et al. |
| 2011/0167194 A1 | 7/2011 | Scales et al. |
| 2011/0167195 A1 | 7/2011 | Scales et al. |
| 2011/0167196 A1 | 7/2011 | Scales et al. |
| 2011/0167298 A1 | 7/2011 | Lee |
| 2011/0167416 A1 | 7/2011 | Sager et al. |
| 2011/0173441 A1 | 7/2011 | Bagepalli et al. |
| 2011/0173615 A1 | 7/2011 | Easton et al. |
| 2011/0173698 A1 | 7/2011 | Polyakov et al. |
| 2011/0178983 A1 | 7/2011 | Bernhard et al. |
| 2011/0179399 A1 | 7/2011 | Bekiroglu et al. |
| 2011/0184993 A1 | 7/2011 | Chawla et al. |
| 2011/0185053 A1 | 7/2011 | Larson et al. |
| 2011/0185169 A1 | 7/2011 | Munger et al. |
| 2011/0185292 A1 | 7/2011 | Chawla et al. |
| 2011/0185355 A1 | 7/2011 | Chawla et al. |
| 2011/0197022 A1 | 8/2011 | Green et al. |
| 2011/0197097 A1 | 8/2011 | Beaty et al. |
| 2011/0202927 A1 | 8/2011 | Miloushev et al. |
| 2011/0208908 A1 | 8/2011 | Chou et al. |
| 2011/0209151 A1 | 8/2011 | Chung et al. |
| 2011/0211080 A1 | 9/2011 | Silverbrook |
| 2011/0214050 A1 | 9/2011 | Stambaugh |
| 2011/0218966 A1 | 9/2011 | Barnes et al. |
| 2011/0218968 A1 | 9/2011 | Liu et al. |
| 2011/0219419 A1 | 9/2011 | Reisman |
| 2011/0225419 A1 | 9/2011 | Munger et al. |
| 2011/0231825 A1 | 9/2011 | Grechanik et al. |
| 2011/0238775 A1 | 9/2011 | Wu et al. |
| 2011/0251868 A1 | 10/2011 | Mikurak |
| 2011/0258625 A1 | 10/2011 | Waldspurger et al. |
| 2011/0258692 A1 | 10/2011 | Morrison et al. |
| 2011/0264729 A1 | 10/2011 | Kulgavin |
| 2011/0270998 A1 | 11/2011 | Larson et al. |
| 2011/0271136 A1 | 11/2011 | Abbot et al. |
| 2011/0276962 A1 | 11/2011 | Chambers et al. |
| 2011/0278355 A1 | 11/2011 | Silverbrook et al. |
| 2011/0280387 A1 | 11/2011 | Soo et al. |
| 2011/0283246 A1 | 11/2011 | Bist et al. |
| 2011/0283262 A1 | 11/2011 | Ceze et al. |
| 2011/0289345 A1 | 11/2011 | Agesen et al. |
| 2011/0289507 A1 | 11/2011 | Khan et al. |
| 2011/0296113 A1 | 12/2011 | Elnozahy |
| 2011/0296241 A1 | 12/2011 | Elnozahy |
| 2011/0296245 A1 | 12/2011 | Alberi et al. |
| 2011/0296440 A1 | 12/2011 | Laurich et al. |
| 2011/0307897 A1 | 12/2011 | Atterbury et al. |
| 2011/0310209 A1 | 12/2011 | Silverbrook |
| 2011/0320882 A1 | 12/2011 | Beaty et al. |
| 2012/0005461 A1 | 1/2012 | Moir et al. |
| 2012/0005672 A1 | 1/2012 | Cervantes et al. |
| 2012/0011341 A1 | 1/2012 | Greiner et al. |
| 2012/0011401 A1 | 1/2012 | Ranganathan et al. |
| 2012/0011504 A1 | 1/2012 | Ahmad et al. |
| 2012/0011508 A1 | 1/2012 | Ahmad |
| 2012/0013408 A1 | 1/2012 | Cortadella et al. |
| 2012/0017213 A1 | 1/2012 | Hunt et al. |
| 2012/0023209 A1 | 1/2012 | Fletcher et al. |
| 2012/0023313 A1 | 1/2012 | Tashiro et al. |
| 2012/0030653 A1 | 2/2012 | Porras et al. |
| 2012/0030659 A1 | 2/2012 | Porras et al. |
| 2012/0030661 A1 | 2/2012 | Porras et al. |
| 2012/0042034 A1 | 2/2012 | Goggin et al. |
| 2012/0042086 A1 | 2/2012 | Larson et al. |
| 2012/0054332 A1 | 3/2012 | Sahu et al. |
| 2012/0054345 A1 | 3/2012 | Sahu et al. |
| 2012/0054408 A1 | 3/2012 | Dong et al. |
| 2012/0054409 A1 | 3/2012 | Block et al. |
| 2012/0054412 A1 | 3/2012 | Gainey, Jr. et al. |
| 2012/0060165 A1 | 3/2012 | Clarke |
| 2012/0066676 A1 | 3/2012 | Dong et al. |
| 2012/0069131 A1 | 3/2012 | Abelow |
| 2012/0079368 A1 | 3/2012 | Abdelaziz et al. |
| 2012/0084393 A1 | 4/2012 | Williams et al. |
| 2012/0084520 A1 | 4/2012 | Chou et al. |
| 2012/0084782 A1 | 4/2012 | Chou et al. |
| 2012/0089410 A1 | 4/2012 | Mikurak |
| 2012/0089485 A1 | 4/2012 | Williams et al. |
| 2012/0089694 A1 | 4/2012 | Pandya |
| 2012/0089971 A1 | 4/2012 | Williams et al. |
| 2012/0096134 A1 | 4/2012 | Suit |
| 2012/0096158 A1 | 4/2012 | Astete et al. |
| 2012/0096282 A1 | 4/2012 | Henry et al. |
| 2012/0096541 A1 | 4/2012 | Larson et al. |
| 2012/0102204 A1 | 4/2012 | Larson et al. |
| 2012/0102206 A1 | 4/2012 | Larson et al. |
| 2012/0102369 A1 | 4/2012 | Hiltunen et al. |
| 2012/0110103 A1 | 5/2012 | Larson et al. |
| 2012/0110185 A1 | 5/2012 | Ganesan et al. |
| 2012/0110186 A1 | 5/2012 | Kapur et al. |
| 2012/0113293 A1 | 5/2012 | Silverbrook |
| 2012/0117237 A1 | 5/2012 | Larson et al. |
| 2012/0117382 A1 | 5/2012 | Larson et al. |
| 2012/0117610 A1 | 5/2012 | Pandya |
| 2012/0124285 A1 | 5/2012 | Soran et al. |
| 2012/0137106 A1 | 5/2012 | Greiner et al. |
| 2012/0137119 A1 | 5/2012 | Doerr et al. |
| 2012/0137286 A1 | 5/2012 | Schimpf et al. |
| 2012/0144005 A1 | 6/2012 | Quintard |
| 2012/0144153 A1 | 6/2012 | Greiner et al. |
| 2012/0144167 A1 | 6/2012 | Yates, Jr. et al. |
| 2012/0144232 A1 | 6/2012 | Griffith et al. |
| 2012/0144233 A1 | 6/2012 | Griffith et al. |
| 2012/0151225 A1 | 6/2012 | Huang et al. |
| 2012/0158610 A1 | 6/2012 | Botvinick et al. |
| 2012/0159101 A1 | 6/2012 | Miyoshi |
| 2012/0159462 A1 | 6/2012 | Leibman et al. |
| 2012/0159478 A1 | 6/2012 | Spradlin et al. |
| 2012/0164613 A1 | 6/2012 | Jung et al. |
| 2012/0166758 A1 | 6/2012 | Greiner et al. |
| 2012/0173732 A1 | 7/2012 | Sullivan |
| 2012/0174104 A1 | 7/2012 | Neogi et al. |
| 2012/0179446 A1 | 7/2012 | Tylutki |
| 2012/0185855 A1 | 7/2012 | Cervantes et al. |
| 2012/0191908 A1 | 7/2012 | North et al. |
| 2012/0191942 A1 | 7/2012 | Blandy et al. |
| 2012/0192142 A1 | 7/2012 | Schimpf et al. |
| 2012/0192207 A1 | 7/2012 | Kashyap |
| 2012/0204061 A1 | 8/2012 | Agesen et al. |
| 2012/0204266 A1 | 8/2012 | Yoo |
| 2012/0209822 A1 | 8/2012 | Prabhakar et al. |
| 2012/0210042 A1 | 8/2012 | Lim et al. |
| 2012/0216045 A1 | 8/2012 | Seguin et al. |

(56) References Cited

U.S. PATENT DOCUMENTS

| | | |
|---|---|---|
| 2012/0216198 A1 | 8/2012 | Easton et al. |
| 2012/0218901 A1 | 8/2012 | Jungck et al. |
| 2012/0221803 A1 | 8/2012 | Stabrawa et al. |
| 2012/0222042 A1 | 8/2012 | Chess et al. |
| 2012/0226699 A1 | 9/2012 | Lillibridge |
| 2012/0226795 A1 | 9/2012 | Larson et al. |
| 2012/0226870 A1 | 9/2012 | Elnozahy |
| 2012/0226939 A1 | 9/2012 | Elnozahy |
| 2012/0226947 A1 | 9/2012 | Alberi et al. |
| 2012/0227041 A1 | 9/2012 | Lambeth et al. |
| 2012/0232947 A1 | 9/2012 | McLachlan et al. |
| 2012/0233547 A1 | 9/2012 | McLachlan |
| 2012/0239624 A1 | 9/2012 | Barnes et al. |
| 2012/0239739 A1 | 9/2012 | Manglik et al. |
| 2012/0246513 A9 | 9/2012 | Bum et al. |
| 2012/0246638 A1 | 9/2012 | He et al. |
| 2012/0246727 A1 | 9/2012 | Elovici et al. |
| 2012/0254286 A1 | 10/2012 | Harlow |
| 2012/0254355 A1 | 10/2012 | Kihara |
| 2012/0254862 A1 | 10/2012 | Dong |
| 2012/0254888 A1 | 10/2012 | Kalogeropulos et al. |
| 2012/0259722 A1 | 10/2012 | Mikurak |
| 2012/0260123 A1 | 10/2012 | Madampath |
| 2012/0265959 A1 | 10/2012 | Le et al. |
| 2012/0266018 A1 | 10/2012 | Tanaka |
| 2012/0266132 A1 | 10/2012 | Coppinger et al. |
| 2012/0272240 A1 | 10/2012 | Starks et al. |
| 2012/0278278 A1 | 11/2012 | Wester et al. |
| 2012/0278573 A1 | 11/2012 | Colbert et al. |
| 2012/0278793 A1 | 11/2012 | Jalan et al. |
| 2012/0284477 A1 | 11/2012 | Gainey, Jr. et al. |
| 2012/0284699 A1 | 11/2012 | Van Der Merwe et al. |
| 2012/0284714 A1 | 11/2012 | Venkitachalam et al. |
| 2012/0284716 A1 | 11/2012 | Martins et al. |
| 2012/0290820 A1 | 11/2012 | Olson et al. |
| 2012/0290950 A1 | 11/2012 | Rapaport et al. |
| 2012/0297246 A1 | 11/2012 | Liu et al. |
| 2012/0310888 A1 | 12/2012 | Kuznetzov et al. |
| 2012/0311180 A1 | 12/2012 | Barkey et al. |
| 2012/0311580 A1 | 12/2012 | Emelianov et al. |
| 2012/0324378 A1 | 12/2012 | Stambaugh |
| 2012/0324417 A1 | 12/2012 | Somani et al. |
| 2012/0324447 A1 | 12/2012 | Huetter et al. |
| 2012/0324448 A1 | 12/2012 | Huetter et al. |
| 2012/0324449 A1 | 12/2012 | Huetter et al. |
| 2012/0324453 A1 | 12/2012 | Chandramouli et al. |
| 2012/0331444 A1 | 12/2012 | Szpak et al. |
| 2013/0007090 A1 | 1/2013 | Sankararaman |
| 2013/0007409 A1 | 1/2013 | Ganesh et al. |
| 2013/0007735 A1 | 1/2013 | Bookman et al. |
| 2013/0007744 A1 | 1/2013 | Arasaratnam |
| 2013/0010125 A1 | 1/2013 | Silverbrook |
| 2013/0010128 A1 | 1/2013 | Silverbrook |
| 2013/0010129 A1 | 1/2013 | Silverbrook |
| 2013/0010135 A1 | 1/2013 | Silverbrook |
| 2013/0010136 A1 | 1/2013 | Silverbrook |
| 2013/0010150 A1 | 1/2013 | Silverbrook |
| 2013/0010151 A1 | 1/2013 | Silverbrook |
| 2013/0010159 A1 | 1/2013 | Silverbrook |
| 2013/0010167 A1 | 1/2013 | Silverbrook |
| 2013/0013795 A1 | 1/2013 | Larson et al. |
| 2013/0013839 A1 | 1/2013 | Silverbrook |
| 2013/0013893 A1 | 1/2013 | Silverbrook |
| 2013/0013953 A1 | 1/2013 | Eck et al. |
| 2013/0014226 A1 | 1/2013 | Larson et al. |
| 2013/0014227 A1 | 1/2013 | Larson et al. |
| 2013/0014228 A1 | 1/2013 | Munger et al. |
| 2013/0014259 A1 | 1/2013 | Gribble et al. |
| 2013/0015239 A1 | 1/2013 | Silverbrook |
| 2013/0016232 A1 | 1/2013 | Silverbrook |
| 2013/0016233 A1 | 1/2013 | Silverbrook |
| 2013/0016235 A1 | 1/2013 | Silverbrook |
| 2013/0016236 A1 | 1/2013 | Silverbrook |
| 2013/0016247 A1 | 1/2013 | Silverbrook |
| 2013/0016248 A1 | 1/2013 | Silverbrook |
| 2013/0016266 A1 | 1/2013 | Silverbrook |
| 2013/0019091 A1 | 1/2013 | Munger et al. |
| 2013/0019243 A1 | 1/2013 | Schmidt et al. |
| 2013/0019280 A1 | 1/2013 | Larson et al. |
| 2013/0021443 A1 | 1/2013 | Silverbrook |
| 2013/0021444 A1 | 1/2013 | Silverbrook |
| 2013/0021482 A1 | 1/2013 | Silverbrook |
| 2013/0024645 A1 | 1/2013 | Cheriton et al. |
| 2013/0024660 A1 | 1/2013 | Silverbrook |
| 2013/0024855 A1 | 1/2013 | North |
| 2013/0024937 A1 | 1/2013 | Glew et al. |
| 2013/0024939 A1 | 1/2013 | Glew et al. |
| 2013/0024940 A1 | 1/2013 | Hutchins et al. |
| 2013/0031331 A1 | 1/2013 | Cheriton et al. |
| 2013/0036192 A1 | 2/2013 | Fausak |
| 2013/0036403 A1 | 2/2013 | Geist |
| 2013/0036451 A1 | 2/2013 | Fausak |
| 2013/0042150 A1 | 2/2013 | McNeeney |
| 2013/0042153 A1 | 2/2013 | McNeeney |
| 2013/0046598 A1 | 2/2013 | Roberts |
| 2013/0046722 A1 | 2/2013 | Hanson |
| 2013/0046948 A1 | 2/2013 | Vaghani et al. |
| 2013/0047154 A1 | 2/2013 | Mehta |
| 2013/0054807 A1 | 2/2013 | Sherwood et al. |
| 2013/0054820 A1 | 2/2013 | Reisman |
| 2013/0055009 A1 | 2/2013 | Patterson et al. |
| 2013/0055315 A1 | 2/2013 | Reisman |
| 2013/0060612 A1 | 3/2013 | Hurd |
| 2013/0060947 A1 | 3/2013 | Nelson |
| 2013/0060963 A1 | 3/2013 | Barkey et al. |
| 2013/0061264 A1 | 3/2013 | Reisman |
| 2013/0061273 A1 | 3/2013 | Reisman |
| 2013/0061322 A1 | 3/2013 | Sethumadhavan et al. |
| 2013/0063568 A1 | 3/2013 | Silverbrook |
| 2013/0064241 A1 | 3/2013 | Larson et al. |
| 2013/0067103 A1 | 3/2013 | Larson et al. |
| 2013/0067224 A1 | 3/2013 | Larson et al. |
| 2013/0067277 A1 | 3/2013 | Mummidi |
| 2013/0067526 A1 | 3/2013 | Reisman |
| 2013/0073072 A1 | 3/2013 | Popp |
| 2013/0073738 A1 | 3/2013 | Reisman |
| 2013/0073778 A1 | 3/2013 | Hunter et al. |
| 2013/0073823 A1 | 3/2013 | Hunter et al. |
| 2013/0073905 A1 | 3/2013 | Van Der Merwe et al. |
| 2013/0074065 A1 | 3/2013 | McNeeney et al. |
| 2013/0074129 A1 | 3/2013 | Reisman |
| 2013/0080732 A1 | 3/2013 | Nellans et al. |
| 2013/0081134 A1 | 3/2013 | Glew et al. |
| 2013/0086147 A1 | 4/2013 | Kashyap |
| 2013/0086347 A1 | 4/2013 | Liu et al. |
| 2013/0086367 A1 | 4/2013 | Gschwind et al. |
| 2013/0091275 A1 | 4/2013 | Safari et al. |
| 2013/0091335 A1 | 4/2013 | Mulcahy et al. |
| 2013/0097120 A1 | 4/2013 | Mummidi |
| 2013/0097369 A1 | 4/2013 | Talagala et al. |
| 2013/0097398 A1 | 4/2013 | Waldspurger et al. |
| 2013/0097706 A1 | 4/2013 | Titonis et al. |
| 2013/0103817 A1 | 4/2013 | Koponen et al. |
| 2013/0103818 A1 | 4/2013 | Koponen et al. |
| 2013/0104199 A1 | 4/2013 | Sprunk |
| 2013/0110490 A1 | 5/2013 | Letz et al. |
| 2013/0111018 A1 | 5/2013 | Ammons et al. |
| 2013/0111473 A1 | 5/2013 | Ammons et al. |
| 2013/0117337 A1 | 5/2013 | Dunham |
| 2013/0117359 A1 | 5/2013 | Husain et al. |
| 2013/0121154 A1 | 5/2013 | Guay et al. |
| 2013/0124479 A1 | 5/2013 | Namjoshi et al. |
| 2013/0137430 A1 | 5/2013 | Coppinger et al. |
| 2013/0138695 A1 | 5/2013 | Stanev |
| 2013/0139262 A1 | 5/2013 | Glew et al. |
| 2013/0145002 A1 | 6/2013 | Kannan et al. |
| 2013/0145008 A1 | 6/2013 | Kannan et al. |
| 2013/0151494 A1 | 6/2013 | Dhamankar et al. |
| 2013/0151846 A1 | 6/2013 | Baumann et al. |
| 2013/0151848 A1 | 6/2013 | Baumann et al. |
| 2013/0152199 A1 | 6/2013 | Capalik |
| 2013/0159649 A1 | 6/2013 | Sherwood et al. |
| 2013/0159712 A1 | 6/2013 | Sigworth et al. |
| 2013/0166716 A1 | 6/2013 | Safari et al. |

(56) References Cited

U.S. PATENT DOCUMENTS

| | | |
|---|---|---|
| 2013/0166886 A1 | 6/2013 | Sasanka et al. |
| 2013/0166951 A1 | 6/2013 | Burn et al. |
| 2013/0169830 A1 | 7/2013 | Silverbrook |
| 2013/0170334 A1 | 7/2013 | Koinuma et al. |
| 2013/0179289 A1 | 7/2013 | Calder et al. |
| 2013/0179371 A1 | 7/2013 | Jain et al. |
| 2013/0179574 A1 | 7/2013 | Calder et al. |
| 2013/0179673 A1 | 7/2013 | Innes et al. |
| 2013/0179729 A1 | 7/2013 | Chiu et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185480 A1 | 7/2013 | Newell et al. |
| 2013/0185530 A1 | 7/2013 | Puttaswamy Naga et al. |
| 2013/0185667 A1 | 7/2013 | Harper et al. |
| 2013/0185716 A1 | 7/2013 | Yin et al. |
| 2013/0186953 A1 | 7/2013 | Silverbrook et al. |
| 2013/0198334 A1 | 8/2013 | Ikenaga et al. |
| 2013/0198459 A1 | 8/2013 | Joshi et al. |
| 2013/0198740 A1 | 8/2013 | Arroyo et al. |
| 2013/0198742 A1 | 8/2013 | Kumar et al. |
| 2013/0204917 A1 | 8/2013 | Wang et al. |
| 2013/0204990 A1 | 8/2013 | Skjolsvold et al. |
| 2013/0204991 A1 | 8/2013 | Skjolsvold et al. |
| 2013/0208623 A1 | 8/2013 | Koponen et al. |
| 2013/0211549 A1 | 8/2013 | Thakkar et al. |
| 2013/0212068 A1 | 8/2013 | Talius et al. |
| 2013/0212148 A1 | 8/2013 | Koponen et al. |
| 2013/0212162 A1 | 8/2013 | Somadder |
| 2013/0212205 A1 | 8/2013 | Flockhart et al. |
| 2013/0212235 A1 | 8/2013 | Fulton et al. |
| 2013/0212243 A1 | 8/2013 | Thakkar et al. |
| 2013/0212244 A1 | 8/2013 | Koponen et al. |
| 2013/0212245 A1 | 8/2013 | Koponen et al. |
| 2013/0212246 A1 | 8/2013 | Koponen et al. |
| 2013/0212321 A1 | 8/2013 | Talagala et al. |
| 2013/0212592 A1 | 8/2013 | Strom et al. |
| 2013/0218915 A1 | 8/2013 | Billau et al. |
| 2013/0219037 A1 | 8/2013 | Thakkar et al. |
| 2013/0219078 A1 | 8/2013 | Padmanabhan et al. |
| 2013/0219183 A1 | 8/2013 | Billau et al. |
| 2013/0219280 A1 | 8/2013 | Weinstein et al. |
| 2013/0227236 A1 | 8/2013 | Flynn et al. |
| 2013/0232343 A1 | 9/2013 | Horning et al. |
| 2013/0238559 A1 | 9/2013 | Bushman |
| 2013/0238690 A1 | 9/2013 | Kashyap |
| 2013/0246355 A1 | 9/2013 | Nelson et al. |
| 2013/0246511 A1 | 9/2013 | Brown et al. |
| 2013/0246843 A1 | 9/2013 | Havemose et al. |
| 2013/0247070 A1 | 9/2013 | Larimore et al. |
| 2013/0254369 A1 | 9/2013 | Rogel et al. |
| 2013/0254459 A1 | 9/2013 | Laplace et al. |
| 2013/0262587 A1 | 10/2013 | Munger et al. |
| 2013/0263132 A1 | 10/2013 | Colbert et al. |
| 2013/0263220 A1 | 10/2013 | Larson et al. |
| 2013/0263247 A1 | 10/2013 | Jungck et al. |
| 2013/0268357 A1 | 10/2013 | Heath |
| 2013/0268683 A1 | 10/2013 | Larson et al. |
| 2013/0268932 A1 | 10/2013 | Park et al. |
| 2013/0275391 A1 | 10/2013 | Batwara et al. |
| 2013/0275534 A1 | 10/2013 | Larson et al. |
| 2013/0275612 A1 | 10/2013 | Voss et al. |
| 2013/0275808 A1 | 10/2013 | McNeeney et al. |
| 2013/0275973 A1 | 10/2013 | Greenfield et al. |
| 2013/0276056 A1 | 10/2013 | Epstein |
| 2013/0282994 A1 | 10/2013 | Wires et al. |
| 2013/0290506 A1 | 10/2013 | Astete et al. |
| 2013/0290671 A1 | 10/2013 | Greiner et al. |
| 2013/0290781 A1 | 10/2013 | Chen et al. |
| 2013/0290782 A1 | 10/2013 | Chen et al. |
| 2013/0290960 A1 | 10/2013 | Astete et al. |
| 2013/0297854 A1 | 11/2013 | Gupta et al. |
| 2013/0297855 A1 | 11/2013 | Gupta et al. |
| 2013/0297894 A1 | 11/2013 | Cohen et al. |
| 2013/0298135 A1 | 11/2013 | Hiltunen et al. |
| 2013/0298251 A1 | 11/2013 | Mittal |
| 2013/0304742 A1 | 11/2013 | Roman et al. |
| 2013/0305023 A1 | 11/2013 | Gainey, Jr. et al. |
| 2013/0305242 A1 | 11/2013 | Wang et al. |
| 2013/0305246 A1 | 11/2013 | Goggin et al. |
| 2013/0305247 A1 | 11/2013 | Easton et al. |
| 2013/0306276 A1 | 11/2013 | Duchesneau |
| 2013/0311607 A1 | 11/2013 | Larson et al. |
| 2013/0311767 A1 | 11/2013 | Larson et al. |
| 2013/0311774 A1 | 11/2013 | Larson et al. |
| 2013/0311910 A1 | 11/2013 | Stambaugh |
| 2013/0311992 A1 | 11/2013 | Fuente |
| 2013/0318341 A1 | 11/2013 | Bagepalli et al. |
| 2013/0318521 A1 | 11/2013 | Monaghan et al. |
| 2013/0322335 A1 | 12/2013 | Smith |
| 2013/0325450 A1 | 12/2013 | Levien et al. |
| 2013/0325451 A1 | 12/2013 | Levien et al. |
| 2013/0325452 A1 | 12/2013 | Levien et al. |
| 2013/0325453 A1 | 12/2013 | Levien et al. |
| 2013/0325704 A1 | 12/2013 | Gorman et al. |
| 2013/0325934 A1 | 12/2013 | Fausak et al. |
| 2013/0325998 A1 | 12/2013 | Hormuth et al. |
| 2013/0332610 A1 | 12/2013 | Beveridge |
| 2013/0332660 A1 | 12/2013 | Talagala et al. |
| 2013/0332686 A1 | 12/2013 | Ishizawa et al. |
| 2013/0332719 A1 | 12/2013 | Hormuth et al. |
| 2013/0339479 A1 | 12/2013 | Hormuth et al. |
| 2013/0339714 A1 | 12/2013 | Hormuth et al. |
| 2013/0345971 A1 | 12/2013 | Stamm et al. |
| 2013/0346988 A1 | 12/2013 | Bruno et al. |
| 2014/0006482 A1 | 1/2014 | Raghu et al. |
| 2014/0006580 A1 | 1/2014 | Raghu |
| 2014/0006581 A1 | 1/2014 | Raghu |
| 2014/0007089 A1 | 1/2014 | Bosch et al. |
| 2014/0007178 A1 | 1/2014 | Gillum et al. |
| 2014/0013059 A1 | 1/2014 | Joshi et al. |
| 2014/0013311 A1 | 1/2014 | Garrett et al. |
| 2014/0032767 A1 | 1/2014 | Nelson |
| 2014/0053269 A1 | 2/2014 | Ghosh et al. |
| 2014/0056577 A1 | 2/2014 | Ogawa et al. |
| 2014/0059333 A1 | 2/2014 | Dixon et al. |
| 2014/0059362 A1 | 2/2014 | Huang et al. |
| 2014/0082327 A1 | 3/2014 | Ghose |
| 2014/0082329 A1 | 3/2014 | Ghose |
| 2014/0095821 A1 | 4/2014 | Yang et al. |
| 2014/0108726 A1 | 4/2014 | Laurich et al. |
| 2014/0108786 A1 | 4/2014 | Kreft |
| 2014/0108864 A1 | 4/2014 | Madampath |
| 2014/0115596 A1 | 4/2014 | Khan et al. |
| 2014/0142904 A1 | 5/2014 | Drees et al. |
| 2014/0142905 A1 | 5/2014 | Drees et al. |
| 2014/0146055 A1 | 5/2014 | Bala et al. |
| 2014/0149492 A1 | 5/2014 | Ananthanarayanan et al. |
| 2014/0149494 A1 | 5/2014 | Markley et al. |
| 2014/0149591 A1 | 5/2014 | Bhattacharya et al. |
| 2014/0149983 A1 | 5/2014 | Bonilla et al. |
| 2014/0172728 A1 | 6/2014 | Lenkov et al. |
| 2014/0172944 A1 | 6/2014 | Newton et al. |
| 2014/0172951 A1 | 6/2014 | Varney et al. |
| 2014/0172952 A1 | 6/2014 | Varney et al. |
| 2014/0172956 A1 | 6/2014 | Varney et al. |
| 2014/0172970 A1 | 6/2014 | Newton et al. |
| 2014/0173023 A1 | 6/2014 | Varney et al. |
| 2014/0173029 A1 | 6/2014 | Varney et al. |
| 2014/0173030 A1 | 6/2014 | Varney et al. |
| 2014/0173038 A1 | 6/2014 | Newton et al. |
| 2014/0173039 A1 | 6/2014 | Newton et al. |
| 2014/0173040 A1 | 6/2014 | Newton et al. |
| 2014/0173041 A1 | 6/2014 | Newton et al. |
| 2014/0173042 A1 | 6/2014 | Newton et al. |
| 2014/0173043 A1 | 6/2014 | Varney et al. |
| 2014/0173044 A1 | 6/2014 | Varney et al. |
| 2014/0173045 A1 | 6/2014 | Crowder et al. |
| 2014/0173046 A1 | 6/2014 | Crowder et al. |
| 2014/0173047 A1 | 6/2014 | Crowder et al. |
| 2014/0173048 A1 | 6/2014 | Crowder et al. |
| 2014/0173052 A1 | 6/2014 | Newton et al. |
| 2014/0173053 A1 | 6/2014 | Varney et al. |
| 2014/0173054 A1 | 6/2014 | Varney et al. |

(56) References Cited

U.S. PATENT DOCUMENTS

| | | |
|---|---|---|
| 2014/0173061 A1 | 6/2014 | Lipstone et al. |
| 2014/0173062 A1 | 6/2014 | Lipstone et al. |
| 2014/0173064 A1 | 6/2014 | Newton et al. |
| 2014/0173066 A1 | 6/2014 | Newton et al. |
| 2014/0173067 A1 | 6/2014 | Newton et al. |
| 2014/0173077 A1 | 6/2014 | Newton et al. |
| 2014/0173079 A1 | 6/2014 | Newton et al. |
| 2014/0173087 A1 | 6/2014 | Varney et al. |
| 2014/0173088 A1 | 6/2014 | Varney et al. |
| 2014/0173091 A1 | 6/2014 | Lipstone et al. |
| 2014/0173097 A1 | 6/2014 | Newton et al. |
| 2014/0173115 A1 | 6/2014 | Varney et al. |
| 2014/0173131 A1 | 6/2014 | Newton et al. |
| 2014/0173132 A1 | 6/2014 | Varney et al. |
| 2014/0173135 A1 | 6/2014 | Varney et al. |
| 2014/0181833 A1 | 6/2014 | Bird et al. |
| 2014/0195480 A1 | 7/2014 | Talagala et al. |
| 2014/0195564 A1 | 7/2014 | Talagala et al. |
| 2014/0201503 A1 | 7/2014 | Tashiro et al. |
| 2014/0201757 A1 | 7/2014 | Bird et al. |
| 2014/0201838 A1 | 7/2014 | Varsanyi et al. |
| 2014/0207871 A1 | 7/2014 | Miloushev et al. |
| 2014/0208153 A1 | 7/2014 | Havemose |
| 2014/0222610 A1 | 8/2014 | Mikurak |
| 2014/0222946 A1 | 8/2014 | Lipstone et al. |
| 2014/0222977 A1 | 8/2014 | Varney et al. |
| 2014/0222984 A1 | 8/2014 | Varney et al. |
| 2014/0223002 A1 | 8/2014 | Varney et al. |
| 2014/0223003 A1 | 8/2014 | Varney et al. |
| 2014/0223015 A1 | 8/2014 | Varney et al. |
| 2014/0223016 A1 | 8/2014 | Varney et al. |
| 2014/0223017 A1 | 8/2014 | Lipstone et al. |
| 2014/0223018 A1 | 8/2014 | Varney et al. |
| 2014/0240322 A1 | 8/2014 | Brumer et al. |
| 2014/0245318 A1 | 8/2014 | Adams et al. |
| 2014/0279941 A1 | 9/2014 | Atkisson |
| 2014/0281131 A1 | 9/2014 | Joshi et al. |
| 2014/0304698 A1 | 10/2014 | Chigurapati et al. |
| 2014/0310473 A1 | 10/2014 | Bilas et al. |
| 2014/0310708 A1 | 10/2014 | Lim et al. |
| 2014/0310810 A1 | 10/2014 | Brueckner et al. |
| 2014/0325238 A1 | 10/2014 | Ghose |
| 2014/0325239 A1 | 10/2014 | Ghose |
| 2014/0325267 A1 | 10/2014 | Liu et al. |
| 2014/0331220 A1 | 11/2014 | Barrat et al. |
| 2014/0331228 A1 | 11/2014 | Barrat et al. |
| 2014/0337461 A1 | 11/2014 | Lipstone et al. |
| 2014/0337472 A1 | 11/2014 | Newton et al. |
| 2014/0344315 A1 | 11/2014 | Larimore et al. |
| 2014/0344391 A1 | 11/2014 | Varney et al. |
| 2014/0344399 A1 | 11/2014 | Lipstone et al. |
| 2014/0344400 A1 | 11/2014 | Varney et al. |
| 2014/0344401 A1 | 11/2014 | Varney et al. |
| 2014/0344413 A1 | 11/2014 | Lipstone et al. |
| 2014/0344425 A1 | 11/2014 | Varney et al. |
| 2014/0344452 A1 | 11/2014 | Lipstone et al. |
| 2014/0344453 A1 | 11/2014 | Varney et al. |
| 2014/0351516 A1 | 11/2014 | Larimore et al. |
| 2014/0372717 A1 | 12/2014 | Ciu et al. |
| 2014/0380039 A1 | 12/2014 | Larson et al. |
| 2014/0380405 A1 | 12/2014 | Forsberg et al. |
| 2014/0380425 A1 | 12/2014 | Lockett et al. |
| 2015/0012570 A1 | 1/2015 | Le et al. |
| 2015/0012776 A1 | 1/2015 | Banikazemi et al. |
| 2015/0019827 A1 | 1/2015 | Waldspurger et al. |
| 2015/0026451 A1 | 1/2015 | Doerr et al. |
| 2015/0052517 A1 | 2/2015 | Raghu et al. |
| 2015/0052521 A1 | 2/2015 | Raghu |
| 2015/0052523 A1 | 2/2015 | Raghu |
| 2015/0052524 A1 | 2/2015 | Raghu |
| 2015/0052525 A1 | 2/2015 | Raghu |
| 2015/0058298 A1 | 2/2015 | Earl et al. |
| 2015/0058933 A1 | 2/2015 | Larson et al. |
| 2015/0066844 A1 | 3/2015 | Yin et al. |
| 2015/0074058 A1 | 3/2015 | Zhao et al. |
| 2015/0074670 A1 | 3/2015 | Gerganov |
| 2015/0074743 A1 | 3/2015 | Ilieva et al. |
| 2015/0095648 A1 | 4/2015 | Nix |
| 2015/0113288 A1 | 4/2015 | Mittal |
| 2015/0113289 A1 | 4/2015 | Mittal |
| 2015/0121087 A1 | 4/2015 | Mittal |
| 2015/0121090 A1 | 4/2015 | Mittal |
| 2015/0128262 A1 | 5/2015 | Glew et al. |
| 2015/0149999 A1 | 5/2015 | Ramanathan et al. |
| 2015/0154423 A1 | 6/2015 | Mittal |
| 2015/0154424 A1 | 6/2015 | Mittal |
| 2015/0160964 A1 | 6/2015 | Nelson |
| 2015/0163088 A1 | 6/2015 | Anschutz |
| 2015/0163097 A1 | 6/2015 | Lipstone et al. |
| 2015/0178097 A1 | 6/2015 | Russinovich |
| 2015/0178114 A1 | 6/2015 | Chambers et al. |
| 2015/0180724 A1 | 6/2015 | Varney et al. |
| 2015/0180725 A1 | 6/2015 | Varney et al. |
| 2015/0180971 A1 | 6/2015 | Varney et al. |
| 2015/0207695 A1 | 7/2015 | Varney et al. |
| 2015/0222604 A1 | 8/2015 | Ylonen |
| 2015/0222706 A1 | 8/2015 | Pandya |
| 2015/0237022 A1 | 8/2015 | Larson et al. |
| 2015/0242626 A1 | 8/2015 | Wang et al. |
| 2015/0242648 A1 | 8/2015 | Lemmey et al. |
| 2015/0242972 A1 | 8/2015 | Lemmey et al. |
| 2015/0244680 A1 | 8/2015 | Larson et al. |
| 2015/0269617 A1 | 9/2015 | Mikurak |
| 2015/0278034 A1 | 10/2015 | Barnes et al. |
| 2015/0278126 A1 | 10/2015 | Maniatis et al. |
| 2015/0278491 A1 | 10/2015 | Horning et al. |
| 2015/0286821 A1 | 10/2015 | Ghose |
| 2015/0293791 A1 | 10/2015 | Adams et al. |
| 2015/0309883 A1 | 10/2015 | North |
| 2015/0310210 A1 | 10/2015 | Sia et al. |
| 2015/0317491 A1 | 11/2015 | Yang et al. |
| 2015/0331708 A1 | 11/2015 | Bala et al. |
| 2015/0331720 A1 | 11/2015 | Huetter et al. |
| 2015/0334130 A1 | 11/2015 | Brueckner et al. |
| 2015/0341319 A1 | 11/2015 | Larson et al. |
| 2015/0356207 A1 | 12/2015 | Reitman et al. |
| 2015/0363324 A1 | 12/2015 | Joshi et al. |
| 2015/0378766 A1 | 12/2015 | Beveridge et al. |
| 2015/0378771 A1 | 12/2015 | Tarasuk-Levin et al. |
| 2015/0378785 A1 | 12/2015 | Tarasuk-Levin et al. |
| 2015/0378831 A1 | 12/2015 | Tarasuk-Levin et al. |
| 2015/0378847 A1 | 12/2015 | Tarasuk-Levin et al. |
| 2015/0378940 A1 | 12/2015 | Bradbury et al. |
| 2015/0378942 A1 | 12/2015 | Bradbury et al. |
| 2015/0381589 A1 | 12/2015 | Tarasuk-Levin et al. |
| 2016/0004805 A1 | 1/2016 | Drees et al. |
| 2016/0004869 A1 | 1/2016 | Ismael et al. |
| 2016/0006756 A1 | 1/2016 | Ismael et al. |
| 2016/0012009 A1 | 1/2016 | Banikazemi et al. |
| 2016/0019107 A1 | 1/2016 | North |
| 2016/0021077 A1 | 1/2016 | Larson et al. |
| 2016/0036862 A1 | 2/2016 | Bagepalli et al. |
| 2016/0062789 A1 | 3/2016 | Hiltgen et al. |
| 2016/0077761 A1 | 3/2016 | Stabrawa et al. |
| 2016/0077857 A1 | 3/2016 | Dong et al. |
| 2016/0077966 A1 | 3/2016 | Stabrawa et al. |
| 2016/0077975 A1 | 3/2016 | Stabrawa et al. |
| 2016/0078342 A1 | 3/2016 | Tang |
| 2016/0078585 A1 | 3/2016 | Sheldon et al. |
| 2016/0092251 A1 | 3/2016 | Wagner |
| 2016/0110215 A1 | 4/2016 | Bonilla et al. |
| 2016/0110657 A1 | 4/2016 | Gibiansky et al. |
| 2016/0117501 A1 | 4/2016 | Ghose |
| 2016/0119148 A1 | 4/2016 | Ghose |
| 2016/0132333 A1 | 5/2016 | Dixon et al. |
| 2016/0132334 A1 | 5/2016 | Dixon et al. |
| 2016/0132335 A1 | 5/2016 | Dixon et al. |
| 2016/0132336 A1 | 5/2016 | Dixon et al. |
| 2016/0132337 A1 | 5/2016 | Dixon et al. |
| 2016/0134584 A1 | 5/2016 | Lang et al. |
| 2016/0140052 A1 | 5/2016 | Waldspurger et al. |
| 2016/0147631 A1 | 5/2016 | Magdon-Ismail et al. |
| 2016/0147649 A1 | 5/2016 | Magdon-Ismail et al. |
| 2016/0147665 A1 | 5/2016 | Magdon-Ismail et al. |

(56) References Cited

U.S. PATENT DOCUMENTS

| | | |
|---|---|---|
| 2016/0148403 A1 | 5/2016 | Brumer et al. |
| 2016/0149950 A1 | 5/2016 | Ashley et al. |
| 2016/0150003 A1 | 5/2016 | Magdon-Ismail et al. |
| 2016/0154648 A1 | 6/2016 | Dixon et al. |
| 2016/0170849 A1 | 6/2016 | Cheng et al. |
| 2016/0179721 A1 | 6/2016 | Neiger et al. |
| 2016/0188181 A1 | 6/2016 | Smith |
| 2016/0191298 A1 | 6/2016 | Markley et al. |
| 2016/0191332 A1 | 6/2016 | Markley et al. |
| 2016/0196158 A1 | 7/2016 | Nipane et al. |
| 2016/0196426 A1 | 7/2016 | Hunt et al. |
| 2016/0210177 A1 | 7/2016 | Dixon et al. |
| 2016/0217253 A1 | 7/2016 | Newman et al. |
| 2016/0219115 A1 | 7/2016 | Dong et al. |

OTHER PUBLICATIONS

A. Dinaburg, P. Royal, M. Sharif, and W. Lee. Ether: malware analysis via hardware virtualization extensions. In 15th ACM conference on Computer and communications security, pp. 51-62, 2008.

A. Joshi, S. T. King, G. W. Dunlap, and P. M. Chen. Detecting past and present intrusions through vulnerability-specific predicates. In Proceedings of the twentieth ACM symposium on Operating systems principles, pp. 91-104, 2005.

A. Kivity, Y. Kamay, D. Laor, U. Lublin, and A. Liguori. kvm: the linux virtual machine monitor. In Proc. of the Linux Symposium, pp. 225-230, Jun. 2007.

A. M. Nguyen, N. Schear, H. Jung, A. Godiyal, S. T. King, and H. D. Nguyen. Mavmm: Lightweight and purpose built imm for malware analysis. In Annual Computer Security Applications Conference, pp. 441-450, 2009.

A. Seshadri, M. Luk, N. Qu, and A. Perrig. Secvisor: a tiny hypervisor to provide lifetime kernel code integrity for commodity oses. In Proceedings of Twenty-First ACM SIGOPS symposium on Operating Systems Principles, pp. 335-350, 2007.

Arora et al., Hardware-Assisted Run-Time Monitoring for Secure Program Execution on Embedded Processors, IEEE, 2006.

B. D. Payne, M. Carbone, M. Sharif, and W. Lee. Lares: An architecture for secure active monitoring using virtualization. In IEEE Symposium on Security and Privacy, pp. 233-247, 2008.

B. Gassend, D. Clarke, M. Van Dijk, and S. Devadas. Controlled physical random functions. In Proceedings of the 18th Annual Computer Security Applications Conference, Dec. 2002.

B. Yee. Using secure coprocessors. PhD thesis, Carnegie Mellon University, May 1994.

Bryan Pamo Jonathan M. McCune Adrian Perrig, "Bootstrapping Trust in Commodity Computers", IEEE Symposium on Security and Privacy, May 2010.

Chen and Morris, "Certifying Program Execution with Secure Processors", Proceedings of the 9th conference on Hot Topics in Operating Systems, USENIX, vol. 9, pp. 133-138, 2003.

D. A. S. d. Oliveira and S. F. Wu. Protecting kernel code and data with a virtualization-aware collaborative operating system. In Annual Computer Security Applications Conference, pp. 451-460, 2009.

D. Lezcano. Linux containers. lxc.sourceforge.net/lxc.html, Feb. 27, 2010.

D. Lie, C. A. Thekkath, M. Mitchell, P. Lincoln, D. Boneh, J. C. Mitchell, and M. Horowitz. Architectural support for copy and tamper resistant software. In Proceedings of Conference on Architectural Support for Programming Languages and Operating Systems (ASPLOS), pp. 168-177, 2000.

D. Lie, "Architectural Support for Copy and Tamper Resistant Software," Dissertation, Department of Electrical Engineering and the Committee for Graduate Studies of Stanford University, Oct. 2003.

D. Nurmi, R. Wolski, C. Grzegorczyk, G. Obertelli, S. Soman, L. Youseff, and D. Zagorodnov. The eucalyptus open-source cloud-computing system. In Proceedings of the 9th IEEE/ACM International Symposium on Cluster Computing and the Grid, pp. 124-131, 2009.

D. P. Bovet and M. C. Ph. Understanding the Linux Kernel, Third Edition. O'Reilly Media, 3 edition, Nov. 2005.

Dan Williams and Emin Gun Sirer, "Optimal Parameter Selection for Efficient Memory Integrity Verification Using Merkle Hash trees", Proceedings. Third IEEE International Symposium on Network Computing and Applications, 2004. (NCA 2004).

E. Suh, D. Clarke, B. Gassend, M. van Dijk, and S. Devadas. Hardware mechanisms for memory authentication. Technical Report LCS-TM-460, Massachusetts Institute of Technology, Feb. 2003.

Edward Suh, Dwaine Clarke, Blaise Gassend, Marten van Dijk, Srini Devadas, "AEGIS: Architecture for Tamper-Evident and Tamper-Resistant Processing", Submission to the Proceedings of the 17th International Conference on Supercomputing, Computation Structures Group Memo 461 2003).

Edward Suh, Dwaine Clarke, Blaise Gassend, Marten van Dijk, Srini Devadas, "AEGIS: Architecture for Tamper-Evident and Tamper-Resistant Processing", Submission to the Proceedings of the 17th International Conference on Supercomputing, Computation Structures Group Memo 474 2004).

Elaine Shi, Adrian Perrig, Leendert Van Doom, "BIND: A Fine-grained Attestation Service for Secure Distributed Systems" (2005), IEEE Symposium on Security and Privacy.

G. Edward Suh and Dwaine Clarke and Blaise Gassend and Marten Van Dijk and Srinivas Devadas, "Efficient Memory Integrity Verification and Encryption for Secure Processors", Proceedings of the 36th Annual International Symposium on Microarchitecture (2003), pp. 339-350.

G. Edward Suh and Dwaine Clarke and Blaise Gassend and Marten van Dijk and Srinivas Devadas, "Hardware Mechanisms for Memory Integrity Checking" (2002).

G. W. Dunlap, S. T. King, S. Cinar, M. A. Basrai, and P. M. Chen. Revirt: Enabling intrusion analysis through virtual-machine logging and replay. In in Proceedings of the 2002 Symposium on Operating Systems Design and Implementation (OSDI), pp. 211-224, 2002.

Gang Xu and Cristian Borcea and Liviu Iftode, "Satem: Trusted service code execution across transactions", Proc. IEEE Int. Symp. Reliable Distributed Systems (2006).

Google Corp. Inter-process communication. dev.chromium.org/developers/ design-documents/inter-process-communication, Sep. 27, 2013.

Healey et al., Dynamic Tracking of Information Flow Signatures for Security Checking, University of Illinois—Center for Reliable and High-Performance Computing, 2007.

J. Chow, B. Pfaff, T. Garfinkel, and M. Rosenblum. Shredding your garbage: reducing data lifetime through secure deallocation. In Proceedings of the Usenix Security Symposium, pp. 22-22, 2005.

J. Chow, B. B Pfaff, T. T Garfinkel, K Christopher, and M. Rosenblum. Understanding data lifetime via whole system simulation. In Proceedings of USENIX Security Symposium, pp. 22-22, 2004.

J. Corbet, A. Rubini, and G. Kroah-Hartman. Linux Device Drivers, 3rd Edition. O'Reilly Media, Inc., 2005.

Jonathan M. McCune and Bryan Pamo and Adrian Perrig and Michael K. Reiter and Hiroshi Isozaki, "Flicker: An Execution Infrastructure for TCB Minimization", (2008).

Joseph Zambreno and Alok Choudhary, "SAFE-OPS: An approach to embedded software security", ACM Transactions on Embedded Computing Systems (TECS), vol. 4, Issue 1 (2005).

Joshua N. Edmison, "Hardware Architectures for Software Security", Ph.D Thesis, Virginia Polytechnic Institute and State University (2006).

K. Kourai and S. Chiba. Hyperspector: Virtual distributed monitoring environments for secure intrusion detection. In ACM/USENIX International Conference on Virtual Execution Environments, pp. 197-207, 2005.

M. Balduzzi, J. Zaddach, D. Balzarotti, E. Kirda, and S. Loureiro. A security analysis of amazon's elastic compute cloud service. In ACM Symposium on Applied Computing, pp. 1427-1434, 2012.

(56) References Cited

OTHER PUBLICATIONS

M. I. Gofman, R. Luo, P. Yang, and K. Gopalan. SPARC: A security and privacy aware virtual machine checkpointing mechanism. In Proceedings of the 10th annual ACM Workshop on Privacy in the Electronic Society (WPES), in conjunction with the ACM Conference on Computer and Communications Security (CCS), pp. 115-124, 2011.
Marten Van Dijk and Luis F. G. Sarmenta and Charles W O'donnell and Srinivas Devadas, "Proof of Freshness: Flow to efficiently use on online single secure clock to secure shared untrusted memory", (2006).
Marten Van Dijk and Luis F. G. Sarmenta and Jonathan Rhodes and Srinivas Devadas, "Securing Shared Untrusted Storage by using TPM 1.2 Without Requiring a Trusted OS", (2007).
Michael E. Locasto and Stelios Sidiroglou and Angelos D. Keromytis, "Speculative Virtual Verification: PolicyConstrained Speculative Execution", Proceedings of the 14th New Security Paradigms Workshop (NSPW 2005), pp. 1-19.
Michael E. Locasto, "Micro-speculation, Micro-sandboxing, and Self-Correcting Assertions: Support for Self-Healing Software and Application Communities", PhD Thesis Proposal, Department of Computer Science, Columbia University, Dec. 5, 2005.
Microsoft Corp. Hyper-v server 2012 r2.www.microsoft.com/hyper-v-server/ en/us/overview.aspx, 2013.
N. Santos, K. P. Gummadi, and R. Rodrigues. Towards trusted cloud computing. In HOTCLOUD, 2009.
Nick L. Petroni and Jr. Timothy and Fraser Aaron and Walters William and A. Arbaugh, "An architecture for specification-based detection of semantic integrity violations in kernel dynamic data", Proceedings of the USENIX Security Symposium (2006), pp. 289-304.
Nick L. Petroni and Jr. Timothy and Fraser Jesus and Molina William and A. Arbaugh, "Copilot—a coprocessor-based kernel runtime integrity monitor", Proceedings of the 13th USENIX Security Symposium, 2004, pp. 179-194.
Oh et al., Control-Flow Checking by Software Signatures, IEEE, 2002.
OpenVZ. Container-based Virtualization for Linux, www.openvz.com, 2013.
Oracle Corp. Virtualbox. www.VirtualBox.org, Sep. 27, 2013.
R. Riley, X. Jiang, and D. Xu. Guest-transparent prevention of kernel rootkits with vmm-based memory shadowing. In the 11th international symposium on Recent Advances in Intrusion Detection, pp. 1-20, 2008.
S. Davidoff. Cleartext passwords in linux memory. www.philosecurity.org, 2008.
S. T. King, G. W. Dunlap, and P. M. Chen. Debugging operating systems with time-traveling virtual machines. pp. 1-15, 2005.
S. W. Smith and J. D. Tygar, "Security and Privacy for Partial Order Time", ISCA Seventh International Conference on Parallel and Distributed Computing Systems, (1994), pp. 70-79.
S. Weingart. Physical security for the µABYSS system. In Proceedings of the IEEE Computer Society Conference on Security and Privacy, pp. 38-51, 1987.
S. White, S. Weingart, W. Arnold, and E. Palmer. Introduction to the Citadel architecture: security in physically exposed environments. Technical Report RC16672, IBM Thomas J. Watson Research Center, Mar. 1991.
Sean W. Smith , Elaine R. Palmer , Steve Weingart, "Building a high-performance, programmable secure coprocessor", Computer Networks (1999).
Sean W. Smith, Vernon Austel, "Trusting Trusted Hardware: Towards a Formal Model for Programmable Secure Coprocessors" USENIX (1998).
Sean W. Smith et al., "Using a High Performance, Programmable Secure Coprocessor," 2nd International Conference on Financial Cryptography, Feb. 1998.
SETI©home. http://setiathome.ssl.berkeley.edu/, 2014.
slack. tools.suckless.org/slock, 2006-2013.
T. Garfinkel and M. Rosenblum. When virtual is harder than real: security challenges in virtual machine based computing environments. In Proceedings of the 10th conference on Hot Topics in Operating Systems, pp. 20-20, 2005.
T. Garfinkel, B. Pfaff, J. Chow, and M. Rosenblum. Data lifetime is a systems problem. In Proc. of ACM SIGOPS European workshop. ACM, 2004.
Tal Garfinkel , Mendel Rosenblum, "A Virtual Machine Introspection Based Architecture for Intrusion Detection" (2003), Proc. Network and Distributed Systems Security Symposium.
Tal Garfinkel and Ben Pfaff and Jim Chow and Mendel Rosenblum and Dan Boneh, "Terra: a virtual machine-based platform for trusted computing", ACM Press 2003, pp. 193-206.
TCPA. http://www.trustedcomputing.org/, 2014.
TPM Part 1 Design Principles Version 1.2 Revision 103, published Jul. 9, 2007.
TPM part 2 specification 1.2 Revision 103, published on Jul. 9, 2007.
TPM Part 3 Commands Version 1.2 Revision 116, published Feb. 2011.
J. Maheshwari, R. Vingralek, and W. Shapiro. How to build a trusted database system on untrusted storage. In Proceedings of the 4th USENIX Symposium on Operating Systems Design and Implementation, pp. 135-150, Oct. 2000.
Vivek Haldar, Deepak Chandra and Michael Franz, "Semantic Remote Attestation—A Virtual Machine directed approach to Trusted Computing", USENIX Virtual Machine Research and Technology Symposium, May 2004.
Vmware ace virtualization suite. www.vmware.com/products/ace, 2013.
VMware Inc. Vmware infrastructure. www.vmware.com/landing.sub.-pages/ discover.html, 2013.
VMware Inc. www.vmware.com, 2013.
VMware.Cloud computing.www.vmware.com/solutions/cloud-computing, Sep. 27, 2013.
William A. Arbaugh , David J. Farbert , Jonathan M. Smith, "A Secure and Reliable Bootstrap Architecture" (1997). Proceedings of the 1997 IEEE Symposium on Security and Privacy.
Xen. Xen cloud platform—advanced virtualization infrastructure for the clouds. www.xen.org/products/cloudxen.html, 2013.
Xfree86. www.xfree86.org/4.2.0/xwininfo.1.html, Aug. 12, 2016.
Xfree86. www.xfree86.org/current/xprop.1.html, Apr. 24, 2011.

\* cited by examiner

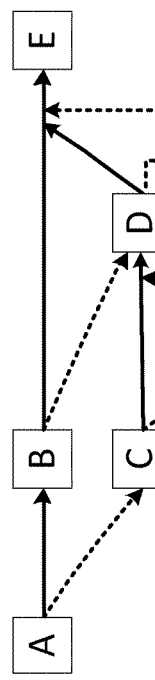
Figure 1. A single module example with 5 basic blocks
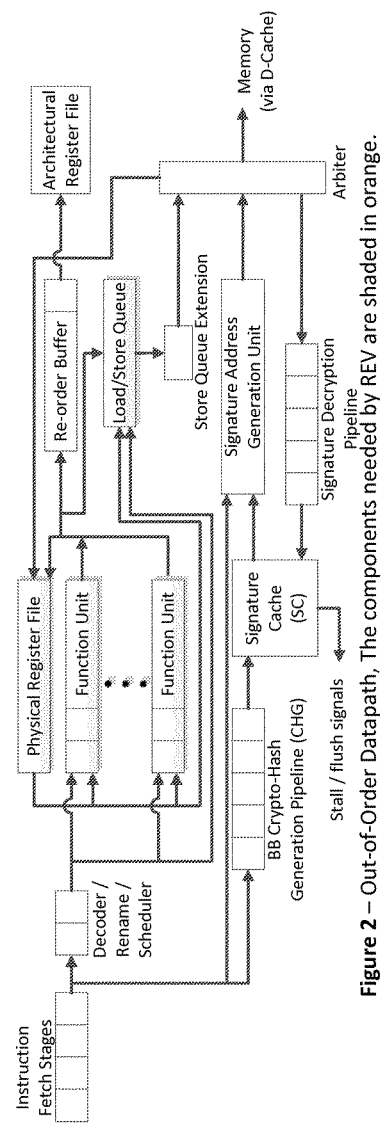
Figure 2 – Out-of-Order Datapath, The components needed by REV are shaded in orange.

CONTINUOUS RUN-TIME VALIDATION OF PROGRAM EXECUTION: A PRACTICAL APPROACH

CROSS REFERENCE TO RELATED APPLICATIONS

The present application is a Continuation of U.S. patent application Ser. No. 14/027,362, filed Sep. 16, 2013, (Allowed), and is a Continuation of U.S. patent application Ser. No. 14/027,352, filed Sep. 16, 2013, now U.S. Pat. No. 9,063,721, issued Jun. 23, 2015, which are each a nonprovisional of and claim benefit of priority from U.S. Provisional Patent Application No. 61/701,194, filed Sep. 14, 2012, the entirety of which are each expressly incorporated herein by reference.

BACKGROUND OF THE INVENTION

A central requirement for implementing trusted computing platforms is to validate whether a program executing on a potentially untrusted host is really the program the user thinks it is. In an untrusted environment/host, a program may be compromised in many ways: through static or dynamic replacement of part or all of the binaries, or in the process of static or dynamic linking to untrusted library functions, or through attacks that affect calls and returns. With any of these compromises, the program does not correctly perform its intended functions. The detection of such compromises requires the execution of the entire program to be validated at run time, including the validation of called functions in libraries, the kernel and utilities.

Validating program executions at run-time is a difficult process. Despite the use of non-executable pages [Pax 11a] and address layout randomization (ASLR) [Pax 11b], applications remain vulnerable and an attacker can alter the control flow to take control of the victim applications [Krah 11, Par 10, Sul 06, HHF 09, Bra 08] as they execute. Hund et al. show that run-time attacks can bypass existing mechanisms for assuring the integrity of kernel code and install a rootkit successfully on a windows based system [HHF 09]. Even without any code modification attackers might take control of the application by using jump and/or return oriented programming [BJF+11, CDD+10, BRS+08]. Once a kernel flaw is introduced, it is possible to disable the existing security mechanisms, gain the full control of the victim system and inject code to the kernel memory space [Bra 08]. Digital Rights Management (DRM) applications are also subject to run-time attacks. DRM systems often run as a daemon on the host machine and verify the DRM certificates of the media being accessed and deny access to the copyrighted media in case of the violation on the digital rights specified in the certificate. Rather than getting around the verification and protection mechanism, run-time object code modification might be used to disable the calls to the verification system [Sul 06].

One way to validate the execution of a program is to continuously monitor all attempted changes/updates to the various software components in the program and the rest of the system including the operating system and libraries. The only changes that are permitted are the ones that have been certified as legitimate. Unfortunately, this approach results in a fairly closed system and program execution can be slowed down dramatically if changes to software components that are made at run-time need to be certified as the program executes. Existing approaches to validating the execution of a program include the use of hardware support in the form of the Trusted Platform Module (TPM) [TPM 12] for certifying executables prior to their execution as well as many other techniques that use control flow signatures at run time (Section 2.1).

RELATED WORK

The most common technique in use today for certifying an execution as genuine relies on the use of the trusted platform module [TPM 12] or a similar facility including a stand-alone cryptoprocessor within a tamper-proof package such as [IBM 10] to authenticate binaries prior to their execution. These techniques fail to detect compromises that occur at run-time. The Cerium co-processor [ChMo 03] validates the signature of cache lines dynamically on cache misses using a context switch to a micro-kernel, thus introducing a serious performance bottleneck. Moreover, Cerium assumes that all of the trusted code will fit into the CPU cache, an impractical assumption for contemporary systems. The SP-architecture [LKM+05] can detect run-time code modifications for instructions but it does not verify the control flow is thus incapable of detecting control flow attacks, such as the return oriented programming attacks. The SP-architecture also requires compiler support and new instructions. The AEGIS co-processor [Su+07] removes the vulnerability of CPU-external authentication logic and authenticates the trusted parts of the kernel and protects the local memory contents when required using one-time pads but does not facilitate efficient, continuous authentication of executing programs.

Existing software mechanisms for validating program execution within a remote host are directed at detecting security breaches at a remote server that executes programs on behalf of a client. Unfortunately, all of the existing software techniques, such as the techniques of [AG 08, KJ 03, SLS+05, Ka 07] for authenticating remote execution are limited in how extensively they validate execution. Most of these do not perform continuous validation as the program executes and all have adverse performance implications. Implementing a software solution for validating remote execution is an open area of research and only a few practical solutions have been proposed to date. A plethora of software techniques, including the use of hardware support [ZZP 04], have been explored in obfuscating control flow in a program to thwart code modifications, including mechanisms to protect the kernel code. In contrast, the present mechanisms provide a full and uniform mechanism to detect tampering of trusted infrastructure code (such as kernel, libraries, utilities) as well as user-level applications.

Run-time Control Flow Authentication

Control flow authentication (CFA) has generally relied on validating control flow paths and/or validating the contents of basic blocks of instructions using cryptographic hashes for the basic blocks. Although these schemes are identical superficially in their use of basic block hashes [FL 04, GON+05, RP 06, ARR+06, MBS 07] the implementations differ significantly in terms of capabilities and implementation. Dynamic code certification has been proposed for software testing. In [SJ 87], compile time signatures are inserted in the binary and are verified by a coprocessor that examines blocks of fetched instructions; the work of [MBS 07] uses basic block signatures for the same purpose and are embedded into the literal fields of RISC instructions. In both schemes, the reference signatures are stored unencrypted, so the system can be easily compromised. In [GON+05], the authors propose the use of hash signatures on data and code blocks to authenticate the blocks as they are fetched using a FPGA-based coprocessor that holds the reference signatures. This scheme requires compiler support and new instructions for validation related functions. Also validation is based on register usage pattern and it is unclear if this check provides security against all types of control flow attacks. Context switches, interrupts and library functions, which are non-trivial, are not described in [GON+05].

Arora et al. [ARR+06] proposed a dynamic CFA mechanism for embedded systems using signature based control flow verification in embedded processors. The technique of [ARR+06], along with preceding work on run-time binary validation (such as [FL 04, RP 06, MBS 07]) and the control flow authentication mechanism as proposed and evaluated in this paper use signatures for basic blocks. Thus, at a superficial level, this mechanism appears similar to the present mechanism. However, there are fundamental differences that have to do with the storage and use of the reference signatures, scalability and applicability in general to an OOO pipeline. In [ARR+06] CAM-tables, pre-loaded by the linker/loader, are used to hold the reference signatures for basic blocks. This introduces two limitations: first, one cannot have large tables to hold all of the basic block signatures of binaries encountered in general-purpose systems; second, context switches require table updates that are very slow and practically hard in most contemporary embedded systems. These problems are solved by using signature caches that are dynamically managed. Such caches require appropriate changes to an OOO pipeline as addressed in the present solutions. The work of [ARR+06] also requires source code access to insert explicit control flow instructions to mark the end of a basic block. The work of [ARR+06] also does not prevent stores from an illicit basic block from modifying memory. Finally, the performance overhead of [ARR+06] makes their adaptation to a general-purpose OOO processor unattractive. REV does not have any of these limitations and has a negligible performance overhead, making its adoption viable.

REM [FL 04] and IMPRES [RP 06] are two techniques that use keyed hashes to authenticate basic blocks (BBs) at run time. Both techniques do not validate how control flowed into a basic block, both require instruction binaries to be re-written and both require basic block hashes to be regenerated when the hash key is changed. REM also requires an ISA extension. The present technique validates both control flow into a BB as well the authenticity of instructions in a BB, without requiring ISA extensions, binary modification or hash regenerations when the key is changed. A re-encryption of the pre-generated hash values is required with key changes. In a recent paper [KZK 10], the authors propose the use of unique signatures for code traces. To avoid a performance penalty, not all of the possible traces in the code are covered—a certain percentage of the traces— the traces that are less likely to execute—are not authenticated. The traces that are not authenticated are not explicitly identified. Consequently, this proposed scheme is therefore not secure—one can replace a branch within a frequently executed trace and also alter any code within the trace to make it appear as a trace whose authentication is not needed, thereby failing to detect any code tampering.

Argus [MBS 07] primarily targets reliability issues and embeds basic block signatures into binaries. To adopt Argus for authenticating executions dynamically, the signatures will have to be encrypted and the delay of decrypting the reference signatures will have to be somehow absorbed as much as possible. Argus also embeds the signatures into unused fields of RISC instructions. For CISC ISAs this is not simple and either boundary tags or post decode information has to be used to extract out the reference signatures. This again adds to hardware complexity or validation delays. Binary rewriting is also avoided. The Argus approach presumably relies on compiler support to transform the binaries to have no more than 5 successors of a BB thereby introducing another requirement not present according to the present scheme. It is also unclear how Argus will support returns from a frequently called function from several locations with this limitation.

Control Flow Integrity (CFI) [ABE+09] is a software technique for validating control flow. It relies on the generation of unique basic block ids and their insertion and run-time validation using a proprietary tool. CFI assumes the kernel and kernel components are trusted and legitimate; thus CFI is not intended and unable to detect attacks at the kernel level. Rootkits can reset the NX bit and thus defeat CFI. Furthermore CFI does not validate the instructions along the control flow path; the present technique does that as well. CFI also has a significant execution overhead.

In [CXH+10], a software technique for detecting return-oriented attacks was introduced. This technique assumes that call and return instructions occur in pairs and that the scope of jumps within a function are limited to the boundary of the function and a function has one entry point. In [KOA+12], the authors introduce a technique called branch regulation (BR) that makes identical assumptions and use the same technique as the earlier work of [CXH+10], to ensure that returns transfer control to the caller, indirect jumps do not transfer control outside a function's boundary or jump into the middle of another function. These are precisely the same as the goals of the technique of [CXH+10], which the authors of [KOA+12] were apparently not aware of. The contribution of the work of [KOA+12] thus appears to be in the use of some modest hardware additions for implementing the basic technique of [CXH+10]. The techniques of both [CXH+10 and KOA+12] do not deal with kernel code (where there are several instances where control can transfer into a function at different points. Both assume that call and returns occur in pairs (and real exceptions to this have been acknowledged in [CXH+10]. BR assumes the entry of a hardware shadow stack to validate returns—but fail to address how extensions of this stack in memory can be protected against attacks. In turn, this implies that BR and the technique of [CXH+10] rely on the kernel code from being uncompromised. Finally, both BR and the work of [CXH+10] require binary modification; BR relies on user-supplied annotations and (presumably) static code analysis. The work proposed here does not have the same limitations as BR or the technique of [CXH+10]; neither does it make the same (unrealistic) assumptions nor does it assume that the kernel code is safe. Both of these techniques only detect return-oriented attacks and instructions along the control flow path are not validated.

SUMMARY AND OBJECTS OF THE INVENTION

The construction of trustworthy systems demands that the execution of every piece of code is validated as genuine— that the executed codes do exactly what they are supposed to do. Most systems implement this requirement prior to execution by matching a cryptographic hash of the binary file against a reference hash value, leaving the code vulnerable to run time compromises, such as code injection, return and jump-oriented programming, and illegal linking of the code to compromised library functions. A mechanism called REV (for Run-time Execution Validator) is provided that can be easily integrated into a contemporary out-of-order processor to validate, as the program executes, the control flow path and instructions executed along the control flow path. REV does not require any binary modification or any extension to the instruction set and uses a signature cache integrated into the processor pipeline to perform the live validation of executions, independent of the binary size REV performs validations at basic block boundaries and ensures that changes to the program state are not made by the instructions within a basic block until the control flow path into the basic block and the instructions within the basic block are both validated. Evaluations using a detailed cycle-accurate microarchitectural simulator for an out-of-order pipeline implementing the X86 ISA demonstrate that the performance overhead of REV is limited to 1.93% on the average across the SPEC 2006 benchmarks, making it very attractive as a practical and complete mechanism for real-time validation of program executions.

Relatively simple hardware extensions to a mainstream style out-of-order superscalar processor that provides these capabilities may be provided to ensure trusted execution, with a tolerable performance overhead. This solution permits any kind of control flow compromise to be detected efficiently at run time in a timely fashion and prevents any adverse impact of any form. Specifically, this system and method not only validates that control is flowing along a legitimate path but also validates that the programs executed on the control flow path were the intended ones.

A simple hardware mechanism for an out-of-order (OOO) processor to validate the execution of a program continuously, as it executes in the face of any kind of control flow attack and any other compromises of the binaries, is provided.

A simple hardware mechanism that relies on the use of a signature cache for the continuous and complete validation of a program (and the library/kernel functions that it invokes) as the program executes is provided. ISA extensions, modifications to the binaries, source-code access, and compiler support are not required.

The system and methodology typically uses control flow information and a cryptographic hash of the instructions within a basic block to authenticate instructions. Alternately, a signature may be used that consists of just the control flow information or just the cryptographic hash of instructions within a basic block, to perform other types of validation, perhaps in conjunction with other information. Therefore, it is understood that these aspects of the technology are separate and discrete, and may be used together or independently, and may be used with other compatible technologies to provide security.

In a processor that uses a trace cache comprising instruction sequences that encompass one or more basic blocks, or information relating to decoded instructions, along a predicted control flow path, the cryptographic hash or the control flow information or both nay be stored from a prior execution of a trace as part of the trace cache entry, to avoid the need for regeneration of the signature information for a subsequent execution of the stored trace. The technique may be used in conjunction with a post-commit write queue that delays memory updates from a basic block pending the validation of execution of the basic block. This technique was evaluated using a detailed, cycle-accurate simulator for the X86-64 ISA and demonstrates that the performance penalty of the scheme is negligible in most cases and tolerable in the extreme instances within the SPEC 2006 benchmark suite.

It is therefore an object to provide a trustworthy processor for validation of code during runtime, comprising: an instruction pipeline configured to decode and execute instructions along a control flow path of a block; a signature generator configured to generate a signature of the control flow path and the instructions to be executed along the control flow path of the block; a signature cache configured to securely receive and store a set of valid signatures, including a signature of the instructions in the instruction pipeline; a validator configured to validate the signature of the control flow path and the instructions to be executed along the control flow path of the block against a signature from the signature cache corresponding to the instructions in the instruction pipeline; and a commit defer unit which ensures that changes to a program state are not made by the instructions executed along the control flow path of the block until the control flow path into the block and the instructions within the block are both validated.

It is also an object to provide a processor configured to validate code during runtime, comprising: an out-of-order instruction pipeline configured to decode and execute instructions along a control flow path of a block; a signature generator configured to generate a signature of both the control flow path and the instructions to be executed along the control flow path of the block concurrently with decoding of the respective instructions on the pipeline; a signature cache configured to securely receive and store a set of valid signatures, including a signature of the instructions in the instruction pipeline; a validator configured to validate the signature of the control flow path and the instructions to be executed along the control flow path of the block against a signature from the signature cache corresponding to the instructions in the instruction pipeline; and a commit defer unit which ensures that changes to a program state are not made by the instructions executed along the control flow path of the block until the control flow path into the block and the instructions within the block are both validated.

It is a further object to provide a method for trustworthy validation of code during runtime in a processor, comprising: decoding and executing instructions along a control flow path of a block in an instruction pipeline; generating a signature of the control flow path and the instructions to be executed along the control flow path of the block; securely receiving and storing a set of valid signatures in a signature cache, including a signature of the instructions in the instruction pipeline; validating the signature of the control flow path and the instructions to be executed along the control flow path of the block against a signature from the signature cache corresponding to the instructions in the instruction pipeline; and preventing changes to a program state by the instructions executed along the control flow path of the block until the control flow path into the block and the instructions within the block are both validated.

Another object provides a method of validating code in a processor during runtime, comprising: decoding and executing instructions along a control flow path of a block in an out-of-order instruction pipeline of the processor; generating a signature of both the control flow path and the instructions to be executed along the control flow path of the block concurrently with decoding of the respective instructions on the pipeline, with a signature generator; securely receiving and storing a set of valid signatures into a signature cache, including a signature of the instructions in the instruction pipeline; validating the signature of the control flow path and the instructions to be executed along the control flow path of the block against a signature from the signature cache corresponding to the instructions in the instruction pipeline; and ensuring that changes to a program state are not made by the instructions executed along the control flow path of the block until the control flow path into the block and the instructions within the block are both validated.

A module may be provided configured to compute a location of a respective valid signature based on an address of an instruction which commences the block, as determined by a set of instruction-fetching logical elements of the instruction pipeline.

The processor may further comprise at least one register configured to store information representing a location of at least a subset of executable modules used by an application, including libraries and operating system code, and a location of the set of valid signatures.

The processor may further comprise logic configured to determine an address of the set of valid signatures based on the contents of the at least one register, and an address of an instruction to be executed when a currently executing module transfers control to another module.

The processor may further comprise a hardware stack configured to store a set of return addresses for a sequence of call functions, wherein information stored in the hardware stack is used to validate the control flow path of the respective call functions. Logic may be provided to extend the hardware stack into random access memory accessible by the processor. The random access memory may be accessed by the processor through a cryptographic interface which is configured to ensure that information stored in the random access memory is not accessible or modifiable without detection absent secret information. The random access memory may be accessed by the processor through a memory fence interface. The hardware logic may be configured to dynamically expand and contract random access memory usage.

A memory write resulting from execution of a block may be stored in a buffer pending validation of the block, and then committed to memory after the block is validated.

The commit defer unit may defers changes to a program state until instructions and control flow paths of a plurality of consecutive blocks based on control flow branching information are validated.

The method may further comprise computing a location of a respective valid signature based on an address of an instruction which commences the block, as determined by a set of instruction-fetching logical elements of the instruction pipeline.

The method may further comprise storing information representing a location of at least a subset of executable modules used by an application in at least one register, including libraries and operating system code, and a location of the set of valid signatures.

The method may further comprise determining an address of the set of valid signatures based on the contents of the at least one register, and an address of an instruction to be executed when a currently executing module transfers control to another module.

The method may further comprise storing a set of return addresses for a sequence of call functions in a hardware stack, wherein information stored in the hardware stack is used to validate the control flow path of the respective call functions. The method may further comprise extending the hardware stack into random access memory accessible by the processor. The random access memory may be accessed through a cryptographic interface which ensures that information stored in the random access memory is not accessible or modifiable without detection absent secret information or through a memory fence interface. Random access memory usage for the stack may be dynamically expanded and contracted in dependence on an amount of information representing the stack.

A memory write resulting from execution of a block may be stored in a buffer pending validation of the block, and then committed to memory after the block is validated.

The method may further comprise deferring changes to a program state until instructions and control flow paths of a plurality of consecutive blocks based on control flow branching information are validated.

Another object provides a processor comprising: an instruction processing pipeline, having at least one pipeline phase between receipt of an instruction for processing and commitment of the instruction, being responsive to at least one control flow instruction; a signature generator, configured to generate a signature of at least one instruction cache line storing at least one instruction; a secure storage location configured to store a key adapted to decrypt an encrypted reference signature for the at least one instruction; verification logic configured to verify a decrypted reference signature against the signature; and authentication logic configured to permit commitment of the at least one instruction, selectively based on a signal from the verification logic. The processor may further comprise: a cache, having the cache line, configured to store instructions; the instruction processing pipeline being configured to receive a stored instruction from the cache for processing; a memory configured to store the encrypted reference signature corresponding to the at least one cache line stored; and decryption logic configured to decrypt the encrypted reference signature in dependence on the stored key, wherein the authorization logic is configured to selectively permit the instruction processing pipeline to contingently proceed with processing of the at least one instruction to a stage prior to commitment, in dependence on the signal from the verification logic, and only if the generated signature is successfully verified against the reference signature, authorizing commitment of the at least one instruction from the cache line.

The pipeline may have a latency between commencement of instruction processing and commitment of the instruction, and for at least one cache line content, the signature generator generates the signature of the at least one instruction in the cache line, the encrypted reference signature is decrypted, and the decrypted reference signature verified against the signature during the pipeline latency substantially without stalling the pipeline waiting for the signal from the verification logic.

The pipeline may have a latency between commencement of instruction processing and commitment of the instruction during which the instruction is decoded and prepared for commitment, further comprising logic configured to, if the verification logic fails to communicate a signal indicating permitted commitment of the at least one instruction, generate a fail signal, flush the pipeline of the at least one instruction from the cache line, and prevent the at least one instruction in the pipeline from commitment.

An instruction may be advanced through the instruction processing pipeline to a stage immediately prior to at least one of a decoding, a dispatch, and a commitment, and is thereafter contingently at least one of decoded, dispatched and committed, in dependence on the signal.

The at least one instruction may have an execution which is dependent on associated data present in the cache line, and the signature is dependent on the at least one instruction but not the data.

The authorization logic may selectively control the instruction processing pipeline to provide at least two alternate results of instruction commitment in dependence on the signal.

A table may be provided, configured to store a plurality of outputs of the verification logic for a plurality of different reference signatures.

The processor may further comprise: a second memory configured to store a second encrypted reference signature corresponding to at least one second instruction stored in the cache; and second verification logic configured to verify a decrypted second encrypted reference signature against a generated signature of the at least one second instruction stored in the cache, wherein the verification logic and the second verification logic are concurrently operative to verify the generated signature against the reference signature and the second generated reference signature against the second reference signature.

The processor may comprise a memory representing a defined state, and wherein selectively in dependence on the signal indicating a no permission for commitment of the at least one instruction, the processor assumes the defined state, and does not complete execution of the instruction.

The defined state may comprise a checkpoint state, wherein if the verification logic indicates a failure of verification of the decrypted reference signature against the generated signature, the processor rolls back to the defined checkpoint state.

The signature generator may compute a distinctive digest function of the cache line.

The signature generator may selectively generate the signature in dependence on at least a cache line virtual address and a cache line content.

The signature generator may produce a signature in which an incremental change in a cache line content results in a non-incremental change in the generated signature.

The signature generator may produce a signature in dependence on at least a cache line memory location content and an associated virtual address, wherein generated signatures for memory locations having identical content at sequential virtual addresses are generated by a secret algorithm configured to result in an a difficult to predict change in the generated signature, and wherein the generated signature has a digital size smaller than a size of the cache line from which it is derived.

The instruction processing pipeline may comprise at least branch prediction logic and speculative processing logic, wherein the signal corresponds to a branch misprediction, the processor being configured to initiate a rollback to a processor state prior to commencement of processing of an instruction whose verification failed.

The instruction processing pipeline may be configured to selectively commit an instruction independent of the output of the verification logic.

The instruction processing pipeline may be configured to selectively commit an instruction independent of the output of the verification logic, and subject to alternate instruction authentication logic.

The instruction processing pipeline may have a mode which selectively permits commitment of an instruction independent of a relation of the decrypted reference signature and the generated signature.

The processor may be further configured to store a state of at least one of the verification logic and the authentication logic in a storage location when a context is switched out, and to restore the state of the at least one of the verification logic and the authentication logic from the storage location when the context is resumed.

The instruction processing pipeline may be configured to process at least one instruction to compute a proposed change in state of an external memory, further comprising logic configured to signal a permitted change in the state of external memory selectively based on the signal from the verification logic.

A further object provides a processing method, comprising: generating a signature of at least one instruction cache line storing at least one instruction; storing a key adapted to decrypt an encrypted reference signature for the at least one instruction; verifying a decrypted reference signature against the signature; and selectively permit commitment of the at least one instruction in an instruction processing pipeline responsive to at least one control flow instruction and having a latency between receipt of an instruction for processing and commitment of the instruction, based on the verification. The method may further comprise storing an encrypted reference signature corresponding to the cache line; decrypting the encrypted reference signature in dependence on the stored key; and initiating processing of an instruction from the cache line, and thereafter permitting the instruction processing pipeline to proceed to a stage prior to commitment, and only if the generated distinctive signature is verified against the reference signature, authorizing commitment of the instruction. For at least one cache line content, the generated signature of the at least one instruction may be generated, the encrypted reference signature is decrypted, and the decrypted reference signature is verified against the signature, during the pipeline latency substantially without stalling the pipeline waiting for the verification. For at least one cache line content, the instruction processing pipeline may support an instruction processing pipeline stall if the verification is delayed.

The verification may permit commitment of the at least one instruction in the pipeline based on a partial match of the generated signature of the cache line with the decrypted reference signature.

The method may further comprise: storing a second encrypted reference signature corresponding to at least one second instruction stored in the cache; and verifying a decrypted second encrypted reference signature against a generated signature of the at least one second instruction stored in the cache memory, wherein the verifying of the instruction and the verifying of the second instruction proceed concurrently.

The method may further comprise storing a defined processor state, and selectively assuming the defined processor state, and preempting completion of execution of the at least one instruction in the instruction processing pipeline, in dependence on a result of the verifying.

The method may further comprise if the verifying fails to verify the decrypted reference signature against the generated signature, rolling back the processor state to a predefined checkpoint state.

The method may further comprise selectively generating the signature in dependence on a cache line virtual address and a cache line content.

The instruction processing pipeline may comprise branch prediction logic and speculative processing logic, wherein the verifying generates a signal corresponding to a branch misprediction, resulting in a rollback to a state prior to commencement of processing of an instruction whose verification failed.

The method may further comprise providing a mode in which the instruction processing pipeline selectively commits an instruction independent of the verifying.

The instruction processing pipeline may selectively commit an instruction independent of the verifying, and subject to alternate instruction authentication.

The method may further comprise storing a state of at least one of the verification logic and the authentication logic in a storage location when a context is switched out, and restoring the state of the at least one of the verification logic and the authentication logic from the storage location when the context is resumed.

The instruction processing pipeline may process at least one instruction to compute a proposed change in state of an external memory, and selectively permitting a change in the a of external memory based on the verification logic.

Another object provides a processor system comprising: a cache line signature generator, configured to generate a dynamic signature for a cache line of an instruction cache; verification logic configured to securely verify a reference signature for a respective cache line content against the dynamic signature; and an instruction processing pipeline having a plurality of sequential stages, configured to load an instruction from the cache line, speculatively execute the instruction in the plurality of stages prior to commitment, and selectively flush the pipeline in dependence on a signal prior to instruction commitment or permit instruction commitment, in dependence on a signal from the verification logic.

A further object provides a processor comprising: a cache memory, configured to store instructions; an instruction processing pipeline, configured to receive a stored instruction from the cache memory for processing, having a pipeline latency between commencement of instruction processing and commitment of execution of the instruction; a cache memory signature generator, configured to generate a distinctive signature of at least one cache line stored in the cache memory; a memory configured to store an encrypted reference signature corresponding to the at least one cache line stored in the cache memory; a secure storage location configured to store a key adapted to decrypt the encrypted reference signature; decryption logic configured to decrypt the encrypted reference signature in dependence on the stored key; verification logic configured to verify the decrypted reference signature against the generated distinctive signature; and authorization logic configured to selectively permit the instruction processing pipeline to contingently proceed with processing of the instruction to a stage prior to commitment, in dependence on an output of the verification logic, and only if the generated distinctive signature is verified against the reference signature, authorizing commitment of the instruction from the cache line.

The cache memory signature generator may generate a distinctive signature of at least one instruction stored in the cache memory during the pipeline latency.

The memory may be configured to store an encrypted reference signature corresponding to the at least one instruction stored in the cache memory, receives the encrypted reference signature before the commitment of the instruction.

The decryption logic may decrypt the encrypted reference signature during a period prior to at least one of decode, dispatch, or issue of the instruction.

Authorization logic may be provided, configured to selectively permit the instruction processing pipeline to contingently proceed in dependence on an output of the verification logic.

The verification logic may verify the decrypted reference signature against the generated distinctive signature prior to the commitment of the instruction.

An instruction may be allowed to commence advancement through the instruction processing pipeline before the generated distinctive signature of a cache line that contained the instruction is verified against a reference signature of the cache line.

An instruction may also be advanced through the instruction processing pipeline to a stage immediately prior to at least one of a decoding, a dispatch, and a commitment, and is thereafter contingently processed in dependence on the verification logic.

The processor may comprise an integrated circuit.

The secure storage location may be on a common integrated circuit with at least the instruction processing pipeline.

The secure storage location may be on a different integrated circuit from at least the decryption logic, further comprising logic configured to securely communicate information corresponding to the key to the decryption logic.

The authorization logic may selectively permit the instruction processing pipeline to contingently proceed only if the decrypted reference signature exactly matches the generated distinctive signature.

The authorization logic may selectively control the instruction processing pipeline to provide at least two alternate results in dependence on the verification logic.

The processor may further comprise a table configured to store a plurality of outputs of the verification logic for a plurality of different reference signatures.

The authorization logic may selectively suspend processing of an instruction in the instruction pipeline, prior to contingently proceeding, in dependence on an output of the verification logic.

The processor may further comprise decryption logic configured to decrypt instructions stored in the cache memory.

The processor may further comprise: a second memory configured to store a second encrypted reference signature corresponding to at least one second instruction stored in the cache memory; and second verification logic configured to verify a decrypted second encrypted reference signature against a generated distinctive signature of the at least one second instruction stored in the cache memory, wherein the verification logic and the second verification logic are concurrently operative to verify a generated distinctive signature against a reference signature.

The processor may further comprise an interface configured to receive at least the instructions and the encrypted reference signature from a memory external to the processor.

The authorization logic may be configured to initiate processing of an instruction, and to thereafter selectively permit the instruction processing pipeline to contingently proceed in dependence on an output of the verification logic.

The processor may comprise a memory representing a defined state, and wherein in dependence on an output of the verification logic, the processor assumes the defined state, and does not complete execution of the instruction.

If the verification logic indicates a failure of verification of the decrypted reference signature against the generated distinctive signature, the processor may roll back to a predefined checkpoint state.

The checkpoint state may be defined by hardware logic.

The checkpoint state may be defined by instruction codes whose execution has been previously verified.

The cache memory signature generator may compute a distinctive digest function of at least a portion of a cache line.

The cache memory signature generator may selectively generate the distinctive signature in dependence on a cache line virtual address and a cache line content.

The cache memory signature generator may produce a distinctive signature in which an incremental change in cache line content results in a non-incremental change in the generated distinctive signature.

The cache memory signature generator may produce a distinctive signature in dependence on a memory content and a memory virtual address, wherein generated distinctive signatures for memory locations having identical content at sequential virtual addresses results in an a difficult to predict change in the generated distinctive signature, and wherein the generated distinctive signature has a digital size smaller than a size of the cache line from which it is derived.

The instruction processing pipeline may comprise branch prediction logic and speculative processing logic, wherein the verification logic generates a signal corresponding to a branch misprediction with a rollback to a processor state prior to commencement of processing of an instruction whose verification failed.

The instruction processing pipeline may be configured to selectively commit execution of an instruction independent of the output of the verification logic.

The instruction processing pipeline may be configured to selectively commit execution of an instruction independent of the output of the verification logic, and subject to alternate instruction authentication logic.

It is a still further object to provide a processing method, comprising: receiving a stored instruction from a cache line in a cache memory for processing into an instruction processing pipeline, having a pipeline latency between commencement of instruction processing and commitment of execution of the instruction; generating a distinctive signature of the cache line; storing an encrypted reference signature corresponding to the cache line; securely storing a key adapted to decrypt the encrypted reference signature; decrypting the encrypted reference signature in dependence on the stored key; verifying the decrypted reference signature against the generated distinctive signature; and initiating processing of an instruction, and thereafter selectively permitting the instruction processing pipeline to contingently proceed to a stage prior to commitment, in dependence on the verifying, and only if the generated distinctive signature is verified against the reference signature, authorizing commitment of the instruction from the cache line.

The generated distinctive signature of at least one instruction may be generated during the pipeline latency.

An encrypted reference signature corresponding to the at least one instruction may be received during the pipeline latency.

The encrypted reference signature may be decrypted prior to at least one of decode, dispatch and issue of the instruction.

The instruction processing pipeline may contingently proceed in dependence on the verifying, and supports an instruction processing pipeline stall if the verifying is delayed.

The decrypting and verifying maybe capable of completion faster that the pipeline latency.

An instruction may be advanced through the instruction processing pipeline commencing before a generated distinctive signature of a cache line that contained the instruction is verified against a reference signature of the cache line.

An instruction may be advanced through the instruction processing pipeline to a stage immediately prior to at least one of a decoding, a dispatch, and a commitment, and is thereafter contingently processed in dependence on the verifying.

The instruction processing pipeline may contingently proceed with processing only if the decrypted reference signature exactly matches the generated distinctive signature.

The instruction processing pipeline may provide at least two alternate results in dependence on the verification.

The method may further comprise storing a plurality of verifying results in a table for a plurality of different instructions.

The method may further comprise suspending processing of an instruction in the instruction processing pipeline, prior to contingently proceeding, in dependence on the verifying.

The method may further comprise decrypting instructions stored in the cache memory.

The method may further comprise storing a second encrypted reference signature corresponding to at least one second instruction stored in the cache memory; and verifying a decrypted second encrypted reference signature against a generated distinctive signature of the at least one second instruction stored in the cache memory, wherein the verifying the instruction and verifying the second instruction proceed concurrently.

The method may further comprise initiating processing of an instruction, and thereafter selectively permitting the instruction processing pipeline to contingently proceed in dependence on the verifying.

The method may further comprise storing a defined state, and assuming the defined state, and preempting completion of execution of the instruction, selectively dependent on the verifying.

The method may further comprise, if the verifying fails to verify the decrypted reference signature against the generated distinctive signature, rolling back program execution to a predefined checkpoint state.

The checkpoint state may be defined by hardware logic.

The checkpoint state may be defined by instruction codes whose execution has been previously verified.

The distinctive signature may be generated based on a computed distinctive digest function of at least a portion of a cache line.

The distinctive signature may be selectively generated in dependence on a cache line virtual address and a cache line content.

The distinctive signature may be generated such that an incremental change in cache line content results in a non-incremental change in the generated distinctive signature.

The distinctive signature may be generated in dependence on a memory content and a memory virtual address, wherein distinctive signatures for memory locations having identical content at sequential virtual addresses results in an a difficult to predict difference in the generated distinctive signature, and wherein the generated distinctive signature has a digital size smaller than a size of the cache line from which it is derived.

The instruction processing pipeline may comprise branch prediction logic and speculative processing logic, wherein the verifying generates a signal corresponding to a branch misprediction, resulting in a rollback to a state prior to commencement of processing of an instruction whose verification failed.

The instruction processing pipeline may selectively commit execution of an instruction independent of the verifying.

The instruction processing pipeline may selectively commit execution of an instruction independent of the verifying, and subject to alternate instruction authentication.

It is another object to provide a processor comprising: an instruction processing pipeline, having at least one pipeline phase between receipt of an instruction for processing and commitment of execution of the instruction, being responsive to at least one flow control instruction; a signature generator, configured to generate a signature of at least one instruction; a secure storage location configured to store a key adapted to decrypt an encrypted reference signature for the at least one instruction; verification logic configured to verify a decrypted reference signature against the signature; and authorization logic configured to permit at least one of commitment of execution of the at least one instruction and flow control in response to the at least one instruction in the instruction processing pipeline, selectively based on a signal from the verification logic.

It is a still further object to provide a processing method, comprising: receiving a sequence of instructions for execution by a processor having an instruction processing pipeline, comprising a terminal flow control instruction; generating a hash associated with execution of the sequence of instructions; securely receiving a reference signature corresponding to a hash of a verified corresponding sequence of instructions; determining a correspondence between the hash and the reference signature; and selectively producing a signal, in dependence on a correspondence of the hash with the reference signature.

The reference signature may be encrypted, further comprising decrypting the encrypted reference signature with a secret key stored in a secure storage location.

The reference signature may be stored in a secure writable non-volatile memory on a circuit integrated with the instruction processing pipeline.

The sequence of instructions may comprise a sequence of instructions from an entry point to a next subsequent branch point.

The reference signature may correspond to a sequence of instructions between expected consecutive branch points substantially without unexpected flow control instructions.

The signal may selectively authorize commitment of the flow control instruction, and a correspondence between the hash and the reference signature is insufficient to authorize the commitment of execution of the flow control instruction if there is present in the sequence of instructions an unexpected flow control instruction between expected consecutive branch points.

A sequence of reference signatures may be stored in the memory for verifying consecutive segments of a program at runtime.

The reference signature may be generated by execution of a reference version of an executable program from which the sequence of instructions are derived.

Each legal flow path within a single execution module may be specified as a segment from an entry point or instruction that can change the flow of control to a next instruction that can change the flow of control, and wherein each segment has a predetermined reference signature.

The hash generator may compute a signature which is unique to the sequence of instructions.

The hash may comprise a hash of at least codes corresponding to instructions executed at the point when the last instruction in the sequence of instructions commits.

The hash may comprise a hash of at least codes corresponding to a behavior of the flow control instruction.

A plurality of reference signatures may be stored in encrypted form in a table. The table may have an entry for a plurality of flow control instruction in a program module that can change the flow of control, wherein the entry for each flow control instruction in the table stores one reference signature for each path that leads into the sequence of instructions which that instruction terminates.

The hash may be generated as a running hash over a sequence of instructions in the order committed, each sequence of instructions being terminated with a control flow instruction, and all of the instructions being in the control flow path, wherein the running hash is reset at the entry point of a software module or when a flow control instruction that terminates a sequence of instructions successfully commits.

A register may store an address of a last control transfer instruction, containing the address of the last committed control transfer instruction or the entry point into the sequence of instructions, if a control transfer instruction has not been encountered after commencing execution of the sequence of instructions.

The method may further comprise looking up an entry in a table for the respective sequence of instructions using an address of the flow control instruction that terminates the sequence, when the flow control instruction at the end of a sequence of instructions is committed.

The method may further comprise comparing a value in the register in parallel against a plurality of entries stored in the table.

The signal may be selectively generated if and only if exactly one of these addresses stored in the table matches the value stored in the register, and the verification logic compares a generated hash with a corresponding entry in the table, wherein the signal is selectively suppressed except when a single value in the table matches the value stored in the register.

The hash may be a function of a subset of each of a set of complete bit patterns representing individual instructions.

The method may further comprise prefetching a reference signature associated with a predicted flow control path.

The method may further comprise generating an interrupt, if the correspondence is insufficient, which invokes an appropriate handler that suspends further execution of the sequence of instructions, and restoring a known stable state or a previous checkpoint.

The method may further comprise logging execution details of the sequence of instructions into a secure memory if the correspondence is insufficient, without producing any updates to an architectural state.

The method may further comprise generating the hash in dependence on an accumulation of sequential flow control signatures in the course of executing a program.

The flow control instruction may correspond to a plurality of reference signatures, corresponding to a plurality of paths that lead into the sequence of instructions which the flow control instruction terminates.

The method may further comprise retrieving a reference signature based on an address of a flow control instruction, from a hash table storing a plurality of reference signatures indexed according to a flow control instruction address. The reference signatures may comprise at least one of: all or some of the bits in an address of flow control instruction; all or some of the bits in the address of the flow control instruction combined with information that indicates an outcome of an immediately preceding one or more flow control instruction; all or some of the bits in a computed flow control signature; all or some of the bits in the computed flow control signature combined with information that indicates the outcome of the immediately preceding one or more flow control instruction; a suitable combination of bits from the computed signature and the address of the flow control instruction; and a suitable combination of bits from the computed flow control signature and the address of the flow control instruction combined with information that indicates the outcome of the immediately preceding one or more flow control instruction.

The method may further comprise executing a program, and retrieving from a table of reference signatures of each legal flow control instruction in the program, the reference signature corresponding to the flow control instruction.

The hash may comprise a cryptographic produced in dependence on an input message and a secret key.

The method may further comprise receiving the reference signature in an encrypted form, storing a stored secret key, and determining the correspondence of the reference signature with the hash.

The method may further comprise selectively controlling the instruction processing pipeline in dependence on a mode, having a first mode in which the instruction processing pipeline processes the sequence of instructions dependent on the signal, and a second mode in which the instruction processing pipeline processes the sequence of instructions independent of the signal.

The method may further comprise producing an alternate signal representing an authorization of instruction execution independent of the signal, and controlling the instruction processing pipeline dependent on either the signal or the alternate signal.

The method may further comprise storing a state of at least one of the verification logic and the authentication logic in a storage location when a context is switched out, and restoring the state of the at least one of the verification logic and the authentication logic from the storage location when the context is resumed.

The method may further comprise processing with the instruction processing pipeline at least one instruction to compute a proposed change in state of an external memory, and signaling a permitted change in the state of external memory selectively based on the signal from the verification logic.

Another object provides a method comprising: receiving a sequence of instructions comprising a terminal flow control instruction for execution in a processor having an instruction processing pipeline; generating a signature associated with the sequence of instructions; securely receiving a reference signature for a verified corresponding sequence of instructions; determining a correspondence between the generated signature and the reference signature; and selectively controlling a processing of the sequence of instructions, in dependence on the correspondence of the generated signature with the reference signature.

A still further object provides a method for selectively controlling processing of a sequence of instructions having a flow control instruction in a processor having an instruction processing pipeline, the sequence of instructions having an associated reference signature dependent on the flow control instruction, comprising: generating a signature associated with the sequence of instructions proximately to and before to processing by the instruction processing pipeline; determining a correspondence between the generated signature and the reference signature to thereby authenticate the sequence of instructions; and controlling the instruction processing pipeline in dependence on the determined correspondence.

Another object provides a trustworthy processor for validation of code during runtime, comprising: an instruction pipeline configured to decode and execute instructions along a control flow path of a block; a signature generator configured to generate a signature of at least one of (a) the control flow path and (b) the instructions to be executed along the control flow path of the block; a signature cache configured to securely receive a valid signature of the instructions in the instruction pipeline; a validator configured to validate the signature against the valid signature from the signature cache; and a commit defer unit which ensures that changes to a program state are not made by the instructions executed along the control flow path of the block until the signature is validated.

A further object provides a processor configured to validate code during runtime, comprising: an out-of-order instruction pipeline configured to decode and execute instructions along a control flow path of a block; a signature generator configured to generate a signature of at least one of a trace cache storing a plurality of blocks, the control flow path of the block, and the instructions to be executed along the control flow path of the block, concurrently with decoding of the respective instructions on the pipeline; a signature cache configured to securely receive and store a set of valid signatures, including a signature associated with a content of the instruction pipeline or trace cache; a validator configured to validate the generated signature against a signature from the signature cache; and a commit defer unit which ensures that changes to a program state are not made by the instructions executed along the control flow path of the block until validation of the generated signature.

A still further object provides a method of validating code in a processor during runtime, comprising: decoding and executing instructions along a control flow path of a block in an out-of-order instruction pipeline of the processor; generating a signature of at least one of: a trace cache storing a plurality of blocks, the control flow path of the block, and the instructions to be executed along the control flow path of the block, concurrently with decoding of the respective instructions on the pipeline, with a signature generator; securely receiving and storing a set of valid signatures into a signature cache, including a signature of the instructions in the instruction pipeline; validating the generated signature against a signature from the signature cache; and ensuring that changes to a program state are not made by the instructions executed along the control flow path of the block until the generated signature is validated.

Another object provides a method for trustworthy validation of code during runtime in a processor, comprising: decoding and executing instructions along a control flow path of a block in an instruction pipeline; generating a signature representing a state of program elements prior to commitment of execution thereof by the instruction pipeline; securely receiving and storing a set of valid signatures in a signature cache; validating the signature of the state of program elements prior to commitment of execution thereof by the instruction pipeline against a corresponding signature from the signature cache; and preventing changes to a program state by the instructions executed along the control flow path of the block until the generated signature is validated.

It is also an object to provide a processor comprising: an instruction processing pipeline, having at least one pipeline phase between receipt of an instruction for processing and commitment of the instruction; a signature generator, configured to generate a signature of at least one instruction represented in at least one of the pipeline and a trace cache, prior to commitment of execution; a secure storage location configured to store a key adapted to decrypt an encrypted reference signature for the at least one instruction; verification logic configured to verify a decrypted reference signature against the signature; and authentication logic configured to permit commitment of the at least one instruction, selectively based on a signal from the verification logic.

An object also provides a processing method, comprising: generating a signature of at least a portion of an instruction cache; storing a key adapted to decrypt an encrypted reference signature for the at least a portion of the instruction cache; verifying a decrypted reference signature against the generated signature; and selectively committing at least one instruction of the at least a portion of the instruction cache, in an instruction processing pipeline having a latency between receipt of the at least one instruction for processing and commitment of the at least one instruction, based on said verification.

Requirements of Run-Time CFA for OOO Processors

Although architectural support run-time control flow authentication (CFA) has been proposed and evaluated in the past, the proposals have targeted embedded systems, where the overhead for such authentication is not crippling. This is not the case with out-of-order (OOO) processors and reducing the performance overhead of run-time CFA is critical in these CPUs. Furthermore, one cannot just extend the techniques devised for embedded systems, such as the techniques of [ARR+06, GON+05, ARR+06] to OOO CPUs in a simple way, as one has to take care of specific nuances of a typical OOO datapath. Specifically, one has to address the following requirements of a run-time CFA for an OOO CPU and for the technique in general:

R1. The technique should be scalable: arbitrarily large binaries and statically or dynamically linked libraries have to be handled. Thus, one cannot store reference signatures used for control flow validation in CPU-internal tables, as was done in [ARR+06].

R2. The technique should have as low a performance overhead as possible. In particular, the effect of following delays on overall performance should be minimized (i) generating the cryptographic hash of a BB, and comparing the target and source addresses should and, of (ii) fetching, decrypting and comparing the reference signature.

R3. The technique should be as transparent as possible to the executables. Most existing techniques require ISA extensions [FL 04, MBS 07, GON+05, ARR+06, RP 06] and some actually require the executables to be modified.

R4. The technique should support context switching, system calls as transparently as possible without imposing a large overhead. The techniques of [ARR+06, GON+05] do not meet this requirement: in [ARR+06], the processor internal table holding the reference signatures has to be reloaded on every context switch; a similar restriction applies to [GON+05].

R5. Changes to the permanent state of the system (committed registers, memory locations) made by instructions should be disallowed until the execution of these instructions are validated. All of the existing hardware-based CFA techniques fail to meet this requirement.

R6. Speculative instruction execution should be supported and instructions/authentications along a mispredicted path should be abortable. Existing CFA hardware do not address this requirement.

The present technology can be easily retrofitted to an existing OOO design, does not require any ISA extension and guarantees full binary compatibility of all executables, including the OS and libraries. Thus, Requirement R3 is met immediately.

BRIEF DESCRIPTION OF THE DRAWINGS

FIG. 1 depicts the basic blocks for a module; and
FIG. 2 depicts a typical out-of order execution datapath and it also shows the additional components needed for implementing a preferred embodiment;

DETAILED DESCRIPTION OF THE PREFERRED EMBODIMENT

REV: Validating Executions AT Run-Time—Overview

The proposed technique for control flow authentication and the authentication of instructions executed along the control flow path is called REV: Run-time execution Validator. In REV, the signature of each basic block of committed instructions is validated as the control flow instruction (branch, jump, return, exit etc.) terminating the basic block is committed. In addition to comparing the cryptographic hash function of the instructions in the basic block against a reference signature, that control flowed into the basic block along an expected path is validated by comparing the actual address of the target of branch instruction at the end of the current basic block.

FIG. 1 depicts a simple example, with the basic blocks for a module labeled as A, B, C. D and E. A is the block executed on entry into the module (which has a single entry point) and E is the exit block. The directed edges show the control flow paths. At the end of each basic block, conditional branch instructions as assumed, say, bA, bB, bC, bD and bE, respectively. The lower arrow coming out of each basic block shown in FIG. 1 corresponds to the branch at the end of the block being taken, while the upper arrow corresponds to the not-taken path. The run-time validation of the execution of this module requires the equivalent of the following information to be stored in the validation table: (i) the address of the successors (which are basic blocks themselves) of each basic block, (ii) the outcome of these branch (taken or not, or equivalent information as applicable)—this information, in some cases can be stored implicitly as the order in which the successors are listed and, (iii) the cryptographic hash of all instructions in a basic block, including the branch instruction at the end of each basic block. For example, the information needed for validating the execution of basic block D needs to hold two addresses for the branches bD, bE that lead the next basic block D or E as well as the cryptographic hash for the instructions within basic block D.

FIG. 2 depicts a typical OOO datapath and it also shows the additional components needed for implementing the present scheme. The reference signatures of the BBs and the source/destination address pairs are stored in the main memory, encrypted with a secret key. As instructions are fetched by the front-end stages, they are fed into a pipelined crypto hash generator (CHG), which operates in parallel with the rest of the pipeline. Because of speculative execution and potential flushing of instructions along the mispredicted path, it makes sense to only validate control flow along the path of committed instructions. This post-commit validation permits the delay of the crypto hash generation to be effectively overlapped with the steps of instruction decoding, renaming, dispatch, issue, execution, writeback and commitment, thus meeting the first part of requirement R2. The post commit validation also meets Requirement R6 naturally.

A small on-chip cache, called the signature cache (SC), is incorporated to hold reference signatures that are retrieved from memory. Because of the temporal locality of reference, the SC eliminates the need to fetch the same reference signatures repeatedly from the memory, thus improving the overall performance. As instructions are fetched by the front end, the predicted target address of a branch is used to retrieve the reference signature of the target BB from the main memory via normal memory interface (going through the L1 D-cache and the rest of the on-chip hierarchy).

The use of the SC enables the scalability requirement (Requirement R1) to be met: the SC will only hold the recently-used (and likely-to-be-used) reference signatures and signatures of any executing modules are loaded into the SC as the code executes, unaffected by the size or the number of code modules used. The SC fetches the reference signatures for a BB based on the address of the fetched instruction if the signature does not already exist in the SC and decrypts the reference signature using a secret key as it is fetched. In practice, the delay of this decryption is hidden because of SC hits, hits in the on-chip cache hierarchy and the delay from fetching the first instruction of a BB to the time of validating the signature of the BB. Thus the second part of Requirement R2 is met.

The SC permits context switches to be handled naturally, as it automatically fetches signatures for the executing code thus meeting Requirement R4.

The CHG generates the signature of the instruction stream forming a basic block as the instructions are fetched along the path predicted by the branch predictor for the pipeline. When the last instruction of the current basic block is ready to commit (which is a control flow instruction), the SC will be probed to verify the calculated crypto hash value of the current basic block against the reference control flow signature. On a SC hit at this time, followed by a match of the control flow signature for the basic block, execution continues as usual. On a SC miss, the corresponding reference signature is retrieved into the SC and until a match is performed, the pipeline is stalled. On a signature mismatch an exception is raised and appropriate handlers are invoked.

To meet Requirement R5, the ROB is extended beyond the normal commit stage and also extend the store queue similarly, as shown in FIG. 2 to prevent changes to the precise state unless a BB is validated. Since these extensions have a finite capacity, the very rare BBs that contain a long sequence of instructions are broken up artificially into multiple BBs, limiting the number of stores or the total number of instructions within a BB (whichever occurs earlier). The front-end of the pipeline is aware of these limits and triggers SC fetches at these artificial boundaries instead of waiting for a control flow instruction to be fetched.

A much stricter approach to meeting Requirement R5 is to defer all changes to the system state until the entire execution has been authenticated. One way to do this is to employ the concept of page shadowing [NG 09]. Initially, the original pages accessed by the program are mapped to a set of shadow pages with identical initial content. All memory updates are made on the shadow pages during execution and when the entire execution is authenticated, the shadow pages are mapped in as the program's original pages. Also, while execution is going on, no output operation (that is DMA) is allowed out of a shadow page.

Memory accesses for servicing SC misses have a priority lower than that of compulsory misses to the data caches, but a higher preference than instruction misses and prefetching requests. If a branch misprediction is discovered, memory accesses triggered by SC fetches along the mispredicted path are canceled and the appropriate pipeline stages in the CHG are also flushed. Interrupts are handled like branch mispredictions. Interrupts flush instructions and results of the earliest basic block in the pipeline (that has not been validated) and resumes from the beginning of the basic block if the interrupt was generated by the BB itself. External interrupts are handled after completing validation of the current BB. The context structure in the Operating System (OS) holds the base address of the signature table in the Random Access Memory (RAM). A signature base register is used to point to the starting (=base) address of the RAM-resident signature table of the executing module (Sec. 4.4).

Supporting Cross-Module Calls

A single program module may call functions within a number of other independently compiled modules. These modules include shared components as well as statically or dynamically linked libraries/modules. Each such module will have its own encrypted signature table. As execution switches from one module to another, the register pointing to the base of the signature table has to be switched from that of the calling module's to that of the callee's. The specific hardware support for cross module calls is part of the signature address generation unit (SAG) shown in FIG. 2 and consists of a set of B base registers that contain the base addresses of the RAM-resident signature tables for up to B called modules. Associated with each such base register is a pair of limit registers that record the starting and the last virtual addresses of the corresponding module. For statically-linked modules, these base registers and the associated limit register pair are filled in by the linker (which is trusted). For dynamically linked modules, the base and limit register pairs are initialized on the first call to the dynamically linked module, when the jump vectors for the functions within the called dynamically-linked module is initialized. The usual (and trusted) dynamic linking function is extended to handle the base and limit-register pairs. At every call or return instruction, the address of the target is associatively compared against the addresses stored in all of the B limit register pairs. The base register for signatures that is selected for use is the one whose limit register values enclose the called functions entry address (or the return address).

The cross-module call support meets any remaining part of Requirement R1 that is not met by the SC and its associated logic. The Silicon requirements for B base address and limit register pairs and their associated comparators are fairly modest for small values of B (16 to 32). When more than B modules are involved, an exception is generated when none of the limit register pairs enclose the called/return address and the exception handler is invoked to manage the base-limit registers.

Signature Cache (SC) Details

A basic block is identified using the address of the last instruction in the basic block (referred to hereafter as "basic block address"). The SC is a set-associative cache that is accessed using the basic block address. An entry in the SC contains the full address of up to N successors of this basic blocks and the actual outcomes that direct control to flow out of the block, the decrypted crypto hash of the instructions in the basic block and status information that indicates if the decrypted reference signature is present within the entry and if the basic block has more than N successors. For the successor field values in the SC entry, the address of the very first instruction in the successor BBs is used. N has a small value (e.g., 2 used in simulations). If a basic block has more than N successors, only the entries for the N most recently used branches are maintained within the SC entry. This requires the use of additional logic to handle replacements within an SC entry.

As instructions of a basic block are fetched along the speculated execution path, they are fed into the CHG pipeline to compute the cryptographic hash for the basic block. To permit flushing of entries in the CHG, the inputs are tagged with the identification (ID) of the successor basic block along the predicted path. Prior to this, using the predicted target address of the prior branch as the lookup key, the signature cache is probed to determine if the decrypted reference signature and the address of the successor basic block are available in the SC. If both are available, a SC hit occurs and no further actions are needed. Two situations arise on a SC miss: one is a partial miss that indicates the presence of a matching entry with a decrypted reference signature but with no address listed for the successor basic block encountered along the predicted path. The other situation is a complete miss, where no matching entry is found in the SC. In either of these SC miss scenarios, a memory access, going through the normal cache hierarchy, is triggered to fetch the missing information into the SC. The authentication check in REV is invoked when the last instruction in a basic block commits and uses the generated hash signature, address and outcome of the successor basic block for the authentication check against the SC entry.

The data for the encrypted control flow signatures stored in the RAM is stored as a hash-indexed table. Recall that the address of the last instruction in the basic block is used to identify a basic block. This address is used to hash into this structure, computing the index as basic block address mod P, where P is chosen to minimize the conflict in the hash table. Details of the entries in this hash-indexed table are given in Section 4.4. A separate field is available in the entry to point to other entries that are in collision on hashing into the table. The entries in collision are entries for other basic blocks that share the common table index or additional entries for a basic block that has more than two successor basic blocks. The contents of the hash table are all encrypted using a secret key on a trusted host following an analysis of the program binaries. Note that in the course of fetching a signature (or other relevant information into the SC) multiple memory accesses may be required. Such accesses have been modeled correctly in simulations discussed below. When the last instruction in a basic block is committed, the SC is probed to verify the signature of the basic block, as described in Section 4.1.

Basic blocks ending with a return instruction are validated in two steps, the first being the validation of the crypto hash when the return instruction is processed and the second to validate the return instruction as a legitimate predecessor of the BB entered on a return, during the validation of that BB (Section 4.2).

RAM-Resident Encrypted Reference Signature Table

Each executable module has its own memory-resident signature table. The contents of this table are encrypted (Section 4.1). The format of storing the encrypted reference signatures in the memory have the legal branch addresses with the crypto hash values of the each basic block and exploits the fact that most basic blocks (other than those computed branches and the return instructions) have no more than two successors.

A naive way of verifying execution is to store the address of a control transfer instruction and the addresses of the target instruction. The signature table entry for a conditional branch will include its two possible targets, while that for an unconditional jump or a call instruction will have a single target. However, for a computed jump, all potential target addresses need to be listed in the entry. Likewise for a function that is called from multiple locations, the signature table entry for the return instruction terminating such a function should list multiple targets.

For an efficient implementation for lookups to the signature table entries in the RAM following a SC miss, the entries located using the hash indices need to be uniform in size. If each entry located using a hash index is restricted to have at most two target addresses, then a linked list needs to be used for entries that should hold the remaining targets for control flow instructions that require more than two targets. Following such links to locate a matching target address requires indirection through memory locations and will be thus prolong the process of retrieving a matching entry for the memory resident signature table on a SC miss. To avoid this performance penalty for return instructions that terminate a popularly called function, a BB ending with a return is validated in two steps: (a) only the crypto hash of the signature of the BB terminated by the return instruction is validated, but address of the return instruction is saved in a special latch internal to the SC mechanism; (b) when the control flow instruction that terminates the first basic block (say, RB) entered in the calling function following a return instruction, say R, is validated, the execution of the RB is validated in the usual way and simultaneously the address of R is validated. The expected address of R is stored as part of the entry for RB.

In the memory resident signature table (which is stored in encrypted form), entries are classified into several different categories (e.g., 24 types), corresponding basic blocks of different types. Examples of entry types used include, but not limited to the following or their appropriate combination: BB terminated with a conditional branch, BB terminating with (unconditional) jump and a call instruction, BB terminating with a return and also ending with a return, other BB ending with a return, BB entered following a return, BB entered following a computed branch, artificially terminated BB (used to limit number of queued memory writes pending validation) etc. The generic structure on an entry in the memory resident table (decrypted) is as follows:

<type tag>, <BB crypto hash value>, <6-bit hash tag discriminator>, <successor1>, <successor 2>, <other>.

An entry has a type tag field indicating the entry type, the crypto hash of the BB, the address or equivalent information (such as a branch offset) to determine the address of the first instruction in up to two successor BBs. As an entry in the memory resident signature table is located using a hash indexing scheme, the BB crypto hash value and the 6-bit hash tag discriminator are together used to serve as the hash tag to permit the unambiguous identification of the correct table entry for two control flow instructions whose addresses generate the same hash index. Note that the crypto hash value is used as part of the "hash tag"; the 6 additional discrimination bits deal with the case when two control flow instructions share the same hash index and the same crypto hash value—a very unlikely situation. The "other" in the entry contains a pointer to a spill area that lists additional successors and/or the address of a preceding return instruction (the last applicable only to BBs entered on a return) and the next entry, if any, that shares the same hash index (link to the so-called collision chain). The last element in an array of spill values associated with a single table entry is identified using a special tag value.

The primary entry located using a hash index and the following the collision chain links are identical in size, and depending on the entry type, some of the fields are unused. Wherever possible, these unused areas are used to serve as a spill space. Other techniques are also used to minimize the space requirement of the entries, such as using offsets instead of full addresses, listing branch outcomes implicitly, etc.

The signature address generation unit generates a memory address for the required signature table entry on a SC miss, based on the signature table's base address in the RAM (obtained from the signature address register of the executing module (Sec. 4.1)) and the hash of the address of the control flow instruction that terminates a BB (obtained from the front-end stages). Once the entry is retrieved, the two target addresses listed in the entry are compared with the address of the actual target (as predicted by the branch predictor for a conditional branch instruction or as computed for a computed branch or call or return). On a mismatch, additional entries in the spill area are progressively looked up following the link listed in the entry. If no matching entry is located, control is presumably flowing on an illegal path and an exception is generated.

Handling Computed Branches

Computed/indirect branches are generated in many instances by the compiler. Computed branches are treated just like conditional branches, with a "taken" outcome on every possible jump path. To use REV with arbitrary computed branches, one has to determine all potential legal targets of the branch. Sometimes this can be done through a profiling run, for each such identified target the signature data for the basic block that starts with the target instruction can be specified. Targets of indirect branches can also be identified. There are two broad ways to extract the legitimate source-target pairs for the indirect branch addresses [Par 10]: extracting through static analysis [HP 00, Ste 96] or by performing a program profiling runs, as many model-based solutions have done [FHSL 96, GJM 04, ZZPL 05]. The signature generator component extracts the branch source-target pairs through the static analyzer component; it has the limitation of branch discovery. However, once the subset of the legitimate undiscoverable branch source-target pairs are supplied to the signature generator, the signatures and basic blocks will be generated for runtime verification. An alternative hardware mechanism [LSL 09] also uses such profiling runs to train a mechanism to just authenticate indirect branches. Profiling runs were used for some of the SPEC benchmarks to identify the targets of indirect branches.

Handling Legitimate Self-Modifying Code

REV relies on basic block signatures derived from a static analysis and as such it cannot directly handle intentional dynamic binary modifications (self-modifying code). It is useful to note that such modifications are a perpetual threat to system security, as noted in several recent and past literatures [Bla 11, SJW+11, HHW+06, YJP 04]. However, there are real scenarios where binary modification is used intentionally for reasons of efficiency, such as by OS boot loaders and by Java just-in-time compilers. In such scenarios, the functions that perform the intentional binary modifications are assumed to be trustworthy (and are validated dynamically using REV). Consequently, it is expected and assumed that the modified binaries that these trusted functions produce are trustworthy themselves and when such modified binaries are run, the REV mechanism can be momentarily disabled by the OS. Of course, to the extent that self-modifying code can be predicted, these presumptions may be replaced with predicted block signatures.

Timing And Other Implications

The REV crypto generator (CHG, in FIG. 2) starts generating the hash of a basic block as soon as instructions are fetched (along the predicted path). This crypto hash value is needed for validating the instructions in the basic block after the last instruction in the basic block is committed. To completely overlap the delay of crypto hash generation, say H, with normal pipeline operations, one must ensure that in the worst case that H=S, where S is the number of pipeline stages in-between the final instruction fetch stage and the commit stage. In a typical high-end X86 implementation, S ranges from 12 to 22. In reality, instruction commitment can be delayed by additional cycles in the reorder buffer. For simulations, it was assumed that S is 16 and assumed the worst-case value of H as 16. Some SHA-3 candidates, including the cube hash algorithm can meet the latency requirement described above. For instance, a cube hash implementation with 5 rounds can meet the 16 cycle latency goal with parallel pipelines [Cub 12, TFK+10]. For a 5-round cube hash algorithm, it was also found that the crypto hash generated for the basic blocks of the SPEC 2006 benchmarks were very unique, with the collision rate of maximum in gamess with 24 out of 433116 unique basic blocks equal to $5 \times 10^{-5}$ collision rate and an average collision rate out of all SPEC benchmarks at 68 collisions out of 2783086 unique basic blocks total which is equal to $2.4 \times 10^{-5}$ collision rate. Alternatives to the cube hash are also described in [Sa 08, GHN+10, TFK+10], that describe low-latency pipelined hash generators with a latency ranging from 14 to 21 cycles, particularly the designs presented in [TFK+10] for 180 nm implementations. These designs can be further refined for lower latencies in contemporary 32 nm technology and realize a CHG that will not hold up usual commitments on a SC hit, an assumption made in the simulations discussed below. If the latency H of the CHG is higher, dummy post-commit stages can be added to the pipeline to effectively increase S to equal H. On a SC miss, whether partial or full (Section 4.3), pipeline stalls occur and such stalls are actually modeled in full detail in the simulator.

Depending on the particular cryptographic hash functions used (as reported in [TFK+10]), the area of the hash function generator, extrapolated to 32 nm implementations, can consume about 4% to 5.5% of the die area of a modern out-of-order core implementing the X86 ISA. With the decryption hardware, the SCs, the crypto hash address generator and the CHG, the die area increase resulting from the inclusion of the proposed additions for REV is likely to be about 8% with 32 Kbyte SCs, based on a very rough estimation. This increase in die size is believed to be an acceptable area overhead for the REV mechanism for a contemporary out-of-order processor.

Security of the REV Mechanism

REV relies on the use of encrypted reference signatures for basic blocks to be stored in the RAM. This requires the use of secret keys for decrypting the reference signatures for each executable module. Such keys can be stored in secure key storage in the RAM that can be implemented using a TPM. The external TPM mechanism in contemporary system can be easily used [TPM 12]. An adversary may overwrite the memory locations for key storage—at best this will cause the validation effort to fail (Section 4.1) but this will never allow illicit code to be authenticated, as the secret key for decrypting the reference signature is held in secure locations. REV also requires two system calls. One of these is for loading the base addresses of the memory areas that contain the encrypted reference signatures into the special registers within the crypto hash address generation unit. The second system call is used to enable or disable the REV mechanism and this is only used when safe, self-modifying executables are run (Section 4.6). For REV to work properly, these two system calls must be secured as well.

This approach introduces a relatively simple hardware support for preventing any code injection attacks, either direct or indirect, any attack that could cause control flow misbehavior.

CONCLUSIONS

REV, a technique for control flow authentication that also validates instructions executed along the legal control flow paths in a modern out-of-order processing core is presented and evaluated. The technique addresses the practical needs of a contemporary system such as not requiring executables to be modified, the ability to support arbitrary executable sizes and to permit integration into existing OOO core designs. REV authenticates execution at the granularity of basic blocks and detects control flow compromises and binary compromises at run-time by validating the actual control flow path and instruction signatures at run time against reference information derived from a static analysis of the executables. REV thus validates both code integrity and control flow integrity simultaneously at run-time with a negligible performance overhead. REV also ensures that changes to the computation states are not made by the instructions in a basic block until the basic block and the control flow path into the basic block are simultaneously validated. To avoid any compromises in the validation, REV stores the reference information used for validation in an encrypted form in memory. REV thus offers a practical way to guarantee the authentication of any program execution, including applications, libraries and kernel code.

REV performs complete execution validation at run-time.

REV relies of the ability to derive a control flow graph of the program. For critical applications, it is possible to generate a CFG—perhaps even relying on the availability of the source code.

REV also limits run-time binary code modification to trusted functions (Section 4.6) and requires these functions to be validated as they execute. However, it is widely known that deliberate binary modifications in general makes a system vulnerable, so limiting binary modifications to trusted functions may not be a real impediment in security-conscious systems.

REV also requires additional memory space for holding the reference signature of the executables being verified. This is a reasonable price to pay for the continuous and complete validation of execution at run-time.

REFERENCES (Each of Which is Expressly Incorporated Herein in its Entirety)

[ABE+09] Abadi M., Budiu M., Erlingsson U., Ligatti J., "Control-flow integrity principles, implementations, and applications", ACM Transactions on Information and System Security (TISSEC), Vol. 13 Issue 1, 2009

[AG 08] Aktas, E., and Ghose, K., "DARE: A framework for dynamic authentication of remote executions", in Proc. of Annual Computer Security Applications Conference (AC-SAC), pages 453-462, IEEE Press, 2008.

[ARR+06] Arora D., Rav S., Raghunathan A., Jha N., Hardware-Assisted Run-Time Monitoring for Secure Program Execution on Embedded Processors, IEEE Trans. On VLSI, Dec 2006 and earlier version published in Proc. DATE.

[BJF+11] Bletsch T., Jiang, X., Freeh V. W., et al. "Jump oriented programming: a new class of code-reuse attack", in Proc. ASIACCS, 2011

[Bla 11] Blazakis D., "Interpreter Exploitation: Pointer Inference and JIT spraying", available on the web at www.semantiscope.com/research/BHDC2010/BHDC-2010Paper.pdf.

[Bra 08] Brad S., "On exploiting null ptr derefs, disabling SELinux, and silently fixed Linux vulnerabilities", Dailydave List; 2008. grsecurity.net/~spender/exploit.tgz.

[BRS+08] Buchanan E., Roemer R., Shacham H., et al. "When Good Instructions Go Bad: Generalizing Return-Oriented Programming to RISC", in 15th ACM CCS, 2008

[CDD+10] Checkoway S., Davi L., Dmitrienko A., et al. "Return-oriented programming without returns", in 17th ACM CCS, 2010

[ChMo 03] Chen, B. and Morris, R., "Certifying Program Execution with Secure Processors", HotOS Conf., 2003.

[CXH+10] Chen P., Xing X., Han H., Mao B., Xie L., "Efficient detection of the return-oriented programming malicious code", ICISS'10 Proceedings of the 6th International Conference on Information Systems Security, pages 140-155, 2010

[FHSL 96] Forrest S., Hofmeyr S., Somayajo A., Longstaff T. "A sense of self for unix processes", in Proceedings of the 2000 IEEE Symposium on Security and Privacy, 1996.

[FL 04] Fiskiran A., Lee R., "Runtime Execution Monitoring (REM) to Detect and Prevent Malicious Code Execution.", in Proc. of the IEEE Int'l Conf. on Computer Design, 2004.

[GHN+10] Guo, X., et al, "Fair and Comprehensive Performance Evaluation of 14 Second Round SHA-3 ASIC Implementations", in Proc. the $2^{nd}$. SHA-3 Candidate Conference, organized by NIST, 2010, available at: csrc.nist-.gov/groups/ST/hash/sha3/Round2/Aug2010/documents/papers/SCHAUMONT_SHA3.pdf.

[GJM 04] Giffin J., Jha S., Miller B., "Efficient context-sensitive intrusion detection", in Proc. $11^{th}$ NDSS, 2004.

[GON+05] Gelbart, I., Ott P., Narahari, B. et al, "Codesseal: Compiler/FPGA approach to secure applications", in Proc. of IEEE International Conference on Intelligence and Security Informatics, Atlanta, Ga., 2005, pp. 530-536.

[HHF 09] Hund R., Holz T., Freiling F, "Return oriented rootkits: Bypassing kernel code integrity protection mechanisms", in Proc. of Usenix Security Symposium, 2009.

[HHW+06] Hu W., Hiser J., Williams D, et al., "Secure and Practical Defense Against Code-injection Attacks using Software Dynamic Translation", in ACM Conference on Virtual Execution Environments, 2006.

[HP 00] Hind M., Pioli A. "Which pointer analysis should I use?", in Proc. of the International Symposium on Software Testing and Analysis, 2000.

[IBM 10] IBM Corporation, IBM 480X series PCIe Cryptographic Coprocessor product overview, available at: www03.ibm.com/security/cryptocards/pciecc/overview-.shtml.

[Ka 07] Kauer, B., "OSLO: Improving the Security of Trusted Computing", in Proc. USENIX Security Symp. 2007.

[KJ 03] Kennell R., and Jamieson, L. H., "Establishing the genuinity of remote computer systems", in Proc. $12^{th}$ USENIX Security Symposium, USENIX Association, 2003.

[KOA+12] Kayaalp M., Ozsoy M., Abu-Ghazaleh N., Ponomarev D., "Branch Regulation: Low Overhead Protection From Code Reuse Attacks", 39th International Symposium on Computer Architecture (ISCA), 2012.

[Krah 11] x86-64 buffer overflow exploits described at: www.suse.de/~krahmer/no-nx.pdf

[Krah2 11] Buffer overflow exploit code at: www.suse.de/~krahmer/bccet.tgz

[KZK 10] Kanuparthi, A. K., et al, "Feasibility Study of Dynamic Platform Module", in Proc. ICCD 2010.

[LKM+05] Lee R., Kwan P., McGregor J., Dwoskin J., Wang Z., "Architecture for Protecting Critical Secrets in Microprocessors", in Proc. of the 32nd Annual International Symposium on Computer Architecture, 2005.

[LSL 09] Lee G., et al, "Indirect Branch Validation Unit", in Microprocessors and Microsystems, Vol. 33, No. 7-8, pp. 461 468, 2009.

[MBS 07] Meixner A., Bauer M. E., Sorin D., "Argus: Low Cost, Comprehensive Error Detection in Simple Cores", Proc. MICRO 40, 2007

[NG 09] Nagarajan V., Gupta R., "Architectural Support for Shadow Memory in Multiprocessors", in Proc. ACM int'l Conf. on Virtual Execution environments (VEE), pp. 1-10, 2009.

[Par 10] Park Y., "Efficient Validation of Control Flow Integrity for Enhancing Computer System Security", PhD thesis, Iowa State University, 2010.

[Pax 11a] PaX webpages at: pax.grsecurity.net/

[Pax 11b] ASLR description on web pages at: pax.grsecurity.net/docs/aslr.txt.

[PTL 10] PTLsim X86 Simulator Distribution pages at: www.ptlsim.org.

[RP 06] Ragel R., Parameswaran S., "Impres: integrated monitoring for processor reliability and security", In $43^{rd}$ ACM/IEEE Design Automation Conference, 2006.

[Sa 08] Satoh, A., "ASIC Hardware Implementations for 512 bit Hash Function Whirlpool", in Proc. of the Int. Conf. on Circuits and Systems, pages 2917. 2920, May 2008.

[SJ 87] Schuette, M. and Shen, J., "Processor Control Flow Monitoring Using Signatured Instruction Streams", in, IEEE Transactions on Computers, Vol. G-36 No: 3, March 1987.

[SJW+11]Salamat B., Jackson T., Wagner G., Wimmer C., Franz M., "Runtime Defense against Code Injection Attacks Using Replicated Execution", in IEEE Trans, on Dependable and Secure Computing, Vol. 8 No:4, 2011.

[SLS+05] Seshadri, A., Luk, M., Shi, E. et al, "Pioneer: Verifying Code Integrity and Enforcing Untampered Code Execution on Legacy Systems", in ACM Symp. on Operating Systems Principles, 2005.

[Ste 96] Steensgaard B., "Points-to analysis in almost linear time", in Proc. POPL, 1996.

[Su+07] Suh, E.G., O'Donnell. C. W., and Devadas, S., "Aegis: A Single-Chip Secure Processor", IEEE Design and Test of Computers, vol. 24, no. 6, pp. 570-580, Nov.-Dec. 2007.

[Sul 06] Floating License Management, A Review of Flexlm available at: wob.iai.uni-bonn.de/Wob/images/36311141.pdf, 2006.

[TFK+10] Tillich, S., Feldhofer, M., Kirschbaum, M., et al., "Uniform Evaluation of Hardware Implementations of the Round Two SHA-3 Candidates", in Proc. the $2^{nd}$. SHA-3 Candidate Conference, organized by NIST, 2010, available at: csrc.nist.gov/groups/ST/hash/sha3/Round2/Aug2010/documents/papers/TILLICH_sha3hw.pdf.

[TPM 12] Trusted Platform Module spec. at: www.trustedcomputinggroup.org/.

[YJP 04] Younan Y., Joosen W., Piessens F, "Code Injection in C and C++: A Survey of Vulnerabilities and Countermeasures", Technical Report, Katholieke Universiteit Leuven Dept. of Computer Science, Belgium 2004.

[ZZP 04] Zhuang, X., Zhang, T., and, Pande, S., "Hardware Assisted Control Flow Obfuscation for Embedded Processors", in Proc. Intl. Conf. on Compilers, Architecture and Synthesis for Embedded Systems (CASES) 2004.

[ZZPL 05] Zhang T., Zhuang X., Pande S., Lee W., Anomalous path detection with hardware support.", in Proc. of Int'l Conf. on Compilers, Architectures and Synthesis for Embedded Processors, 2005.

What is claimed is:

1. A processor system comprising:
 a cache line signature generator, configured to generate a dynamic signature of a cache line of an instruction cache holding instructions of a program;
 hardware verification logic configured to securely verify a reference signature for a respective cache line content against the dynamic signature and produce a verification signal in dependence thereon; and
 a hardware instruction processing pipeline comprising a plurality of stages, configured to:
  load instructions from the cache line,
  speculatively execute the instructions in the plurality of stages prior to commitment, and
  in selective dependence on the verification signal, one of:
   (i) flush the hardware instruction processing pipeline prior to commitment of the instructions, and
   (ii) permit commitment of the instructions;
 the hardware instruction processing pipeline comprising:
 a hardware commit defer unit, configured to allow reversible partial execution of the instructions prior to commitment of the instructions, while preventing irreversible changes to a program state of the program, dependent on the verification signal;
 a hardware buffer configured to buffer a write resulting from the partial execution of the instructions prior to commitment of the instructions; and
 hardware control logic configured to write the buffered write to a memory, contingent on the verification signal.

2. The processor system according to claim 1, further comprising decryption logic configured to decrypt an encrypted reference signature in dependence on a decryption stored key, wherein the verification logic is further configured to verify an available decrypted reference signature against the dynamic signature during a pipeline latency of the hardware instruction processing pipeline, substantially without stalling the hardware instruction processing pipeline waiting for the verification.

3. The processor system according to claim 1, wherein the verification logic is further configured to permit commitment of the instructions executed within in the hardware instruction processing pipeline based on at least a partial match of the dynamic signature of the cache line with the decrypted reference signature.

4. The processor system according to claim 1, further comprising checkpoint logic configured to define a checkpoint state prior to execution of instructions by the hardware instruction processing pipeline stored within the cache line, and to roll back a state of the processor system to the checkpoint state if the verification logic fails to verify the decrypted reference signature against the generated signature.

5. The processor system according to claim 1, wherein the hardware instruction processing pipeline further comprises branch prediction logic and speculative processing logic, wherein the verification logic is configured to generate a signal corresponding to a branch misprediction, resulting in the speculative processing logic causing at least a rollback to a state prior to commencement of processing of the instructions whose verification failed.

6. The processor system according to claim 1, wherein the cache line signature generator is further configured to generate a signature of both a control flow path and instructions along the control flow path.

7. The processor system according to claim 1, wherein the cache line signature generator is further configured to dynamically generate the dynamic signature of the cache line of the instruction cache as respective instructions of the plurality of instructions enter the cache line.

8. The processor system according to claim 1, wherein the cache line signature generator is further configured to generate the dynamic signature of the cache line of the instruction cache on the plurality of instructions stored in the cache line.

9. The processor system according to claim 1, further comprising:
a communication port configured to receive encrypted information representing at least one reference signature; and
a memory configured to securely receive and store a secret key configured to decrypt the information representing the at least one reference signature.

10. The processor system according to claim 1, wherein the cache line signature generator is further configured to generate the dynamic signature of the cache line of the instruction cache concurrently with decoding of the instructions from the cache line.

11. A processing method, comprising:
generating a dynamic signature of a cache line of an instruction cache holding instructions of a program, with a cache line signature generator;
securely verifying a reference signature for a respective cache line content against the dynamic signature with hardware verification logic, and producing a verification signal in dependence thereon;
loading instructions from the cache line into a hardware instruction processing pipeline having a plurality of stages; and
speculatively and reversibly executing the instructions in the plurality of stages of the hardware instruction processing pipeline, to a stage prior to commitment of at least one speculatively executed instruction, while preventing irreversible changes to a program state of the program, until the verification signal indicates verification of the dynamic signature with respect to the reference signature;
buffering an external write resulting from the speculative and reversible execution of the instructions prior to commitment of the instructions with a hardware buffer; and
externally write the buffered external write with hardware control logic, to commit execution of the instructions, contingent on the verification signal.

12. The method according to claim 11, further comprising:
producing a signal by the verification logic selectively in dependence on said securely verifying; and
selectively in dependence on a state of the signal from the verification logic, one of:
flushing the hardware instruction processing pipeline in dependence on a signal prior to commitment of the instructions, and
committing execution of the instructions.

13. The method according to claim 11, further comprising flushing the hardware instruction processing pipeline in dependence on a signal selectively in dependence on said securely verifying, prior to commitment of the instructions.

14. The method according to claim 11, further comprising committing execution of the speculatively executed instructions in the hardware instruction processing pipeline in dependence on said securely verifying, prior to commitment of the instructions selectively.

15. The method according to claim 11, further comprising:
decrypting an encrypted reference signature in dependence on a decryption stored key;
wherein said verifying further comprises verifying an available decrypted reference signature against the dynamic signature during a pipeline latency of the hardware instruction processing pipeline, substantially without stalling the hardware instruction processing pipeline waiting for the verification.

16. The method according to claim 11, further comprising wherein the verification logic is configured to permit commitment of the instructions executed within in the hardware instruction processing pipeline based on at least a partial match of the dynamic signature of the cache line with the decrypted reference signature.

17. The method according to claim 11, further comprising:
defining a checkpoint state prior to execution of instructions by the hardware instruction processing pipeline stored within the cache line; and
rolling back a state of the processor system to the defined checkpoint state selectively in dependence on a failure of the verification logic to verify the decrypted reference signature against the generated signature.

18. The method according to claim 11, wherein the hardware instruction processing pipeline comprises branch prediction logic which produces a branch misprediction signal, and speculative processing logic, further comprising:
generating a signal from the verification logic corresponding to a branch misprediction signal, resulting in the speculative processing logic causing at least a rollback to a state prior to commencement of processing of the instructions whose verification failed.

19. A processor system, comprising:
a hardware cache line signature generator, configured to dynamically generate a signature of a cache line contents of an instruction cache comprising a plurality of instructions;
hardware verification logic configured to verify a reference signature associated with authentic cache line contents against the dynamically generated signature of the cache line contents, to produce a verification signal selectively in dependence on the verification; and
a hardware instruction processing pipeline comprising a plurality of stages, configured to:
load the cache line contents from the cache line of the instruction cache,
speculatively execute the plurality of instructions in the plurality of stages to a stage prior to commitment of the speculatively executed instructions,
allow reversible partial execution of the cache line contents from the cache line of the instruction cache with a hardware commit defer unit, while preventing irreversible changes to a program state of a program comprising the cache line contents, until at least the verification signal from the hardware verification logic is available, buffer a memory write in a hardware buffer, prior to commitment of the speculatively executed plurality of instructions, flush the hardware instruction processing pipeline in dependence prior to commitment of the speculatively executed instructions contingent on a first state of the verification signal, and commit execution of the plurality of instructions contingent on a second state of the verification signal, comprising an external write of the buffered memory.

20. The processor system according to claim 19, wherein the hardware instruction processing pipeline further comprises branch prediction logic configured to produce a branch misprediction signal, wherein the hardware verification logic is configured to generate a signal corresponding to the branch misprediction signal, resulting in the speculative processing logic causing at least a rollback to a state prior to commencement of processing of the instructions whose verification failed.

* * * * *